(12) United States Patent
Cohen et al.

(10) Patent No.: US 9,134,961 B1
(45) Date of Patent: Sep. 15, 2015

(54) SELECTING A TEST BASED ON CONNECTIONS BETWEEN CLUSTERS OF CONFIGURATION CHANGES AND CLUSTERS OF TEST SCENARIO RUNS

(71) Applicant: Panaya Ltd., Raanana (IL)

(72) Inventors: Yossi Cohen, Raanana (IL); Mati Cohen, Raanana (IL); Nurit Dor, Raanana (IL); Dror Weiss, Raanana (IL)

(73) Assignee: Panaya Ltd., Raanana (IL)

( * ) Notice: Subject to any disclaimer, the term of this patent is extended or adjusted under 35 U.S.C. 154(b) by 0 days.

(21) Appl. No.: 14/142,771

(22) Filed: Dec. 28, 2013

Related U.S. Application Data

(63) Continuation-in-part of application No. 13/103,078, filed on May 8, 2011, now Pat. No. 8,739,128.

(60) Provisional application No. 61/747,313, filed on Dec. 30, 2012, provisional application No. 61/814,305, filed on Apr. 21, 2013, provisional application No. 61/919,773, filed on Dec. 22, 2013.

(51) Int. Cl.
*G06F 9/44* (2006.01)

(52) U.S. Cl.
CPC .................................. *G06F 8/20* (2013.01)

(58) Field of Classification Search
None
See application file for complete search history.

(56) References Cited

U.S. PATENT DOCUMENTS

| | | | | |
|---|---|---|---|---|
| 5,544,310 | A * | 8/1996 | Forman et al. | 714/31 |
| 5,629,878 | A | 5/1997 | Kobrosly | |
| 5,781,720 | A * | 7/1998 | Parker et al. | 714/38.11 |
| 5,905,856 | A * | 5/1999 | Ottensooser | 714/38.1 |
| 6,360,332 | B1 * | 3/2002 | Weinberg et al. | 714/4.1 |
| 6,546,523 | B1 * | 4/2003 | Boorananut et al. | 716/56 |
| 6,810,494 | B2 | 10/2004 | Weinberg et al. | |
| 6,865,692 | B2 | 3/2005 | Friedman et al. | |
| 6,898,784 | B1 | 5/2005 | Kossatchev et al. | |
| 7,032,212 | B2 * | 4/2006 | Amir et al. | 717/124 |
| 7,191,435 | B2 * | 3/2007 | Lau et al. | 717/168 |
| 7,475,289 | B2 * | 1/2009 | Rosaria et al. | 714/38.1 |
| 7,490,319 | B2 * | 2/2009 | Blackwell et al. | 717/124 |
| 7,506,211 | B2 * | 3/2009 | Apostoloiu et al. | 714/38.14 |
| 7,512,839 | B2 * | 3/2009 | Coulter et al. | 714/30 |

(Continued)

OTHER PUBLICATIONS

Sreedevi Sampath, A Scalable Approach to User-session based Testing of Web Applications through Concept Analysis, 2004.

(Continued)

*Primary Examiner* — Isaac T Tecklu
(74) *Attorney, Agent, or Firm* — Active Knowledge Ltd.

(57) ABSTRACT

Selecting a test scenario template relevant to a configuration change involves executing the following: receiving data indicative of configuration changes made to software systems; clustering the configuration changes into clusters of similar configuration changes; identifying runs of test scenarios run by users belonging to different organizations; clustering the runs to clusters of similar runs; generating connections between the clusters of similar configuration changes and the clusters of similar runs; weighting the connections based on the number of different organizations associated with the connections; receiving a certain configuration change of a certain software system; selecting a certain connection, weighted above a threshold, between a cluster of similar configuration changes, to which the certain configuration change corresponds, and a certain cluster of similar runs; and selecting a test scenario template representing the certain cluster of similar runs.

20 Claims, 16 Drawing Sheets

(56) References Cited

U.S. PATENT DOCUMENTS

| | | | |
|---|---|---|---|
| 7,516,440 B2* | 4/2009 | Upton | 717/106 |
| 7,526,680 B2* | 4/2009 | Mathew et al. | 714/37 |
| 7,581,212 B2 | 8/2009 | West et al. | |
| 7,596,731 B1* | 9/2009 | Sharma | 714/724 |
| 7,809,525 B2 | 10/2010 | Chagoly et al. | |
| 7,849,447 B1 | 12/2010 | Karis et al. | |
| 8,001,527 B1* | 8/2011 | Qureshi et al. | 717/120 |
| 8,205,191 B1* | 6/2012 | Kolawa et al. | 717/124 |
| 8,266,592 B2* | 9/2012 | Beto et al. | 717/124 |
| 8,276,123 B1* | 9/2012 | Deng et al. | 717/125 |
| 8,411,579 B2* | 4/2013 | Ngo et al. | 370/248 |
| 2002/0138226 A1* | 9/2002 | Doane | 702/119 |
| 2003/0131290 A1* | 7/2003 | Weinberg et al. | 714/46 |
| 2004/0107415 A1* | 6/2004 | Melamed et al. | 717/124 |
| 2004/0123272 A1* | 6/2004 | Bailey et al. | 717/125 |
| 2005/0071818 A1* | 3/2005 | Reissman et al. | 717/127 |
| 2005/0081104 A1* | 4/2005 | Nikolik | 714/38 |
| 2005/0166094 A1* | 7/2005 | Blackwell et al. | 714/38 |
| 2006/0129994 A1* | 6/2006 | Srivastava et al. | 717/124 |
| 2006/0168565 A1* | 7/2006 | Gamma et al. | 717/122 |
| 2006/0200803 A1* | 9/2006 | Neumann et al. | 717/120 |
| 2007/0038908 A1* | 2/2007 | Hirano et al. | 714/724 |
| 2007/0043980 A1* | 2/2007 | Ohashi et al. | 714/45 |
| 2007/0055911 A1* | 3/2007 | Boehm et al. | 714/31 |
| 2007/0220341 A1* | 9/2007 | Apostoloiu et al. | 714/33 |
| 2007/0226543 A1* | 9/2007 | Young et al. | 714/43 |
| 2008/0010537 A1* | 1/2008 | Hayutin et al. | 714/38 |
| 2008/0065687 A1* | 3/2008 | Coulter et al. | 707/102 |
| 2008/0086348 A1 | 4/2008 | Rao et al. | |
| 2008/0086499 A1* | 4/2008 | Wefers et al. | 707/102 |
| 2008/0098361 A1* | 4/2008 | Kumar et al. | 717/128 |
| 2008/0127095 A1* | 5/2008 | Brennan et al. | 717/124 |
| 2008/0141221 A1* | 6/2008 | Benesovska et al. | 717/124 |
| 2008/0184206 A1* | 7/2008 | Vikutan | 717/127 |
| 2008/0228805 A1* | 9/2008 | Bruck et al. | 707/102 |
| 2008/0263505 A1* | 10/2008 | StClair et al. | 717/101 |
| 2009/0019427 A1* | 1/2009 | Li et al. | 717/126 |
| 2009/0037885 A1* | 2/2009 | Edwards et al. | 717/128 |
| 2009/0106262 A1 | 4/2009 | Fallen et al. | |
| 2009/0138855 A1* | 5/2009 | Huene et al. | 717/125 |
| 2009/0144010 A1* | 6/2009 | Witter et al. | 702/115 |
| 2009/0183143 A1 | 7/2009 | Li et al. | |
| 2009/0187894 A1* | 7/2009 | Bell et al. | 717/127 |
| 2009/0204591 A1* | 8/2009 | Kaksonen | 707/3 |
| 2009/0259992 A1* | 10/2009 | Cormier et al. | 717/126 |
| 2009/0307650 A1* | 12/2009 | Saraf et al. | 717/101 |
| 2010/0064282 A1* | 3/2010 | Triou et al. | 717/125 |
| 2010/0146490 A1* | 6/2010 | Grosse et al. | 717/131 |
| 2010/0192220 A1 | 7/2010 | Heizmann et al. | |
| 2010/0287534 A1* | 11/2010 | Vangala et al. | 717/124 |
| 2010/0332535 A1* | 12/2010 | Weizman et al. | 707/770 |
| 2011/0145788 A1* | 6/2011 | Xu et al. | 717/121 |
| 2012/0197626 A1* | 8/2012 | Kejariwal et al. | 703/22 |
| 2012/0216176 A1* | 8/2012 | Gaikwad et al. | 717/124 |
| 2013/0014084 A1* | 1/2013 | Sahibzada et al. | 717/124 |
| 2014/0019939 A1* | 1/2014 | Wiggers et al. | 717/124 |
| 2014/0115565 A1* | 4/2014 | Abraham et al. | 717/128 |
| 2014/0237450 A1* | 8/2014 | Levy et al. | 717/124 |

OTHER PUBLICATIONS

Jinhua Li, Clustering User Session Data for Web Applications Test, 2011, Journal of Computational Information Systems.

G. Ruffo, R. Schifanella, and M. Sereno, WALTy: A User Behavior Tailored Tool for Evaluating Web Application Performance, 2004, Proceedings of the Third IEEE International Symposium on Network Computing and Applications.

Sanaa Alsmadi, Generation of Test Cases From Websites User Sessions, 2011, The 5th International Conference on Information Technology.

* cited by examiner

SELECTING A TEST BASED ON CONNECTIONS BETWEEN CLUSTERS OF CONFIGURATION CHANGES AND CLUSTERS OF TEST SCENARIO RUNS

CROSS-REFERENCE TO RELATED APPLICATIONS

This application is a Continuation-In-Part of application Ser. No. 13/103,078, filed May 8, 2011. This application claims the benefit of U.S. Provisional Patent Application No. 61/747,313, filed Dec. 30, 2012, and U.S. Provisional Patent Application No. 61/814,305, filed Apr. 21, 2013. This application also claims the benefit of U.S. Provisional Patent Application No. 61/919,773, filed Dec. 22, 2013, the entire contents of which is herein incorporated by reference in its entirety for all that it teaches without exclusion of any part thereof.

The following U.S. patent applications, filed on Dec. 27, 2013: Ser. Nos. 14/141,514; 14/141,564; 14/141,588; 14/141,623; 14/141,655; 14/141,676; 14/141,726; 14/141,859; 14/141,887; 14/141,925; 14/141,974, and the following U.S. patent applications, filed on Dec. 28, 2013: Ser. Nos. 14/142,768; 14/142,769; 14/142,770; 14/142,772; 14/142,774; 14/142,781; 14/142,783; 14/142,784, may include related subject matter.

BACKGROUND

Testing software systems belonging to organizations is often a time consuming and expensive process. This is especially true when involving complex software systems such as Enterprise Resource Planning (ERP) systems, which have become the computational backbone of many business organizations. Such software systems often include a large number of software modules that need to be frequently validated to ensure that the software systems are operating as expected. Implementing configuration changes to software systems are often considered be risky and require regression testing to validate affected configuration elements (e.g., business processes impacted by the changes). The cost and time of a full regression test may be too high.

Deciding which tests to run (and what those tests should involve) in order to validate a configuration change is not a trivial task. Often, configuration changes may have unintended and/or unexpected side effects, which a tester may not be aware of. Since tests are usually designed and run by each organization separately on the organization's systems, this means that each organization must build up the necessary knowledge, and independently discover important aspects that should be tested when validating different configuration changes. Gaining this knowledge may require much effort and experience; in the meantime, testing the software systems may be a less effective and prolonged process. However, organizations that are able to utilize each other's testing-related knowledge, which is in a sense a wisdom of the crowd (of testers), may be able to come up with a more effective and efficient testing plan.

Collecting testing data from multiple organizations may not be that helpful if there is no way to sift through the massive amounts of data that can be collected and select appropriate tests for the task at hand. Additionally, not all tests are equal. While some organizations may have knowledge of how to test certain aspects of a software module (e.g., effective tests for testing a certain configuration change), others may have devised erroneous, ineffective, and/or irrelevant tests.

BRIEF SUMMARY

Some aspects of this disclosure involve methods, systems, and/or non-transitory computer-readable medium, which enable generation and/or selection of test scenario templates that are relevant to validating a software system. Optionally, the templates are generated based on data collected from crowd users (e.g., testers from other organizations), tasked with testing similar software systems. Optionally, given a configuration change to the software system, which needs to be tested by a certain organization, some embodiments offer a way to suggest to the organization which tests may be relevant and/or effective for testing the configuration change.

In one embodiment, a test scenario template is a model according to which a test scenario may be structured. A test scenario template may include one or more test steps, which instruct a user on an action to be performed as part of the test, such as where to enter a value, what button to push, what screen to select, or what transaction to run. Optionally, a test scenario template may include one or more default values used for running an instantiation of the test scenario template (e.g., default values for certain fields in a screen).

One aspect of this disclosure involves identifying runs of test scenarios run by users belonging to different organizations on software systems belonging to the different organizations. Optionally, running at least some of the test scenarios is useful for testing configuration changes of the software systems. Additionally, at least some of the runs are clustered into clusters that include similar runs of test scenarios.

Another aspect of this disclosure involves generating connections between clusters of configuration changes and clusters of runs which may include runs of test scenarios that were run to test at least some of the configuration changes. Additionally, the connections may be weighted according to the number of different organizations associated with the connections. Optionally, an organization is associated with a connection between a cluster of similar configuration changes and a cluster of similar runs if a run of test scenarios, if a run from the cluster of similar runs is run by a user belonging to the organization to test a configuration change from the cluster of similar configurations changes.

Another aspect of this disclosure involves receiving certain configuration change, associated with a certain software system, which is to be tested by a certain user, and to select a certain connection, weighted above a threshold, between a cluster of similar configuration changes, to which the certain configuration change corresponds, and a certain cluster of similar runs of test scenarios. Optionally, the certain cluster of runs includes runs of test scenarios that were runs in order to test configuration changes belonging to the cluster of configuration changes. Additionally, a test scenario template, representing the certain cluster, may be selected and/or suggested to the certain user. Optionally, the template may be suggested to the certain user to run in order to test the certain configuration change.

One aspect of this disclosure involves a computer system that is configured to select a test scenario template relevant for testing a configuration change. The computer system includes an interface that is configured to receive data indicative of configuration changes made to software systems of different organizations. Additionally, the computer system includes and a first clustering module that is configured to cluster the configuration changes into clusters of similar configuration changes. The computer system also includes a test identifier that is configured to identify runs of test scenarios run by users belonging to the different organizations on the software systems belonging to the different organizations. Optionally, running the test scenarios is useful for testing at least some of the configuration changes. Additionally, a second clustering module, belonging to the computer system, is used to cluster the runs to clusters that include similar runs. The computer system utilizes a connection generator to generate connections between the clusters of similar configuration changes and the clusters of similar runs, and a weighting module to weight the connections based on number of different organizations associated with each of the connections. Optionally, an organization may be considered associated with a connection between a cluster of similar configuration changes and a cluster of similar runs, if a run of a test scenario, from the cluster of similar runs, is run by a user belonging to the organization to test a configuration change from the cluster of similar configurations changes. A connection selector and template selector are also used by the computer system. The connection selector is configured to receive a certain configuration change of a certain software system, which is to be tested by a certain user. The connection selector is also configured to select a certain connection, weighted above a threshold, between a cluster of similar configuration changes, to which the certain configuration change corresponds, and a certain cluster of similar runs of test scenarios. The template selector is configured to select for the certain user a test scenario template representing the certain cluster of similar runs.

In one embodiment, the computer system may optionally include a monitoring module configured to monitor the users running the test scenarios on the software systems that belong to the different organizations and to provide data obtained from the monitoring to the test identifier. In another embodiment, the computer system may optionally include a user interface that is configured to suggest to a user to run an instantiation of the test scenario template. In one embodiment, the computer system may optionally include a template generator configured to generate the test scenario template after clustering the runs of the test scenarios into the clusters of similar runs.

Another aspect of this disclosure involves a computer implemented method for selecting a test scenario template relevant to a configuration change. Executing the method may involve performing the following: Receiving data indicative of configuration changes made to software systems of different organizations. Clustering the configuration changes into clusters of similar configuration changes. Identifying runs of test scenarios run by users belonging to the different organizations on the software systems belonging to the different organizations. Optionally, running the test scenarios is useful for testing at least some of the configuration changes. Clustering the runs to clusters that include similar runs. Generating connections between the clusters of similar configuration changes and the clusters of similar runs. Weighting the connections based on number of different organizations associated with each of the connections. Optionally, an organization may be considered associated with a connection between a cluster of similar configuration changes and a cluster of similar runs if a run of a test scenario, from the cluster of similar runs, is run by a user belonging to the organization to test a configuration change from the cluster of similar configurations changes. Receiving a certain configuration change of a certain software system to be tested by a certain user. Selecting a certain connection, weighted above a threshold, between a cluster of similar configuration changes, to which the certain configuration change corresponds, and a certain cluster of similar runs of test scenarios. And selecting for the certain user a test scenario template representing the certain cluster of similar runs.

In one embodiment, executing the method may optionally involve monitoring the users belonging to the different organization running the test scenarios on the software systems that belong to the different organizations and providing data obtained from the monitoring to be used for the identifying of the runs. In another embodiment, executing the method may optionally involve suggesting to the certain user to run an instantiation of the test scenario template representing the certain cluster of similar runs. In yet another embodiment, executing the method may optionally involve generating the test scenario template representing the certain cluster of similar runs based on one or more runs of test scenarios belonging to the certain cluster of similar runs.

Yet another aspect of this disclosure involves a non-transitory computer-readable medium for use in a computer to select a test scenario template relevant to a configuration change. The computer includes a processor, and the non-transitory computer-readable medium includes the following program code: Program code for receiving data indicative of configuration changes made to software systems of different organizations. Program code for clustering the configuration changes into clusters of similar configuration changes. Program code for identifying runs of test scenarios run by users belonging to the different organizations on the software systems belonging to the different organizations. Optionally, running the test scenarios is useful for testing at least some of the configuration changes. Program code for clustering the runs to clusters comprising similar runs. Program code for generating connections between the clusters of similar configuration changes and the clusters of similar runs. Program code for weighting the connections based on number of different organizations associated with each of the connections. An organization is associated with a connection between a cluster of similar configuration changes and a cluster of similar runs if a run of a test scenario, from the cluster of similar runs, is run by a user belonging to the organization to test a configuration change from the cluster of similar configurations changes. Program code for receiving a certain configuration change of a certain software system to be tested by a certain user. Program code for selecting a certain connection, weighted above a threshold, between a cluster of similar configuration changes, to which the certain configuration change corresponds, and a certain cluster of similar runs of test scenarios. Optionally, the certain cluster of similar runs includes a first run associated with a first organization belonging to the different organizations and a second run associated with a second organization belonging to the different organizations. In addition, the first organization is not the second organization. And program code for selecting for the certain user a test scenario template representing the certain cluster of similar runs.

In one embodiment, the non-transitory computer-readable medium optionally stores program code for providing the certain user an indication of the number of users belonging to different organizations who acted according to the certain connection; the more users acted according to the certain connection, the higher the likelihood that the certain connection is relevant to the certain user. In one embodiment, the non-transitory computer-readable medium optionally stores program code for monitoring the users belonging to the different organization running the test scenarios on the software systems that belong to the different organizations and providing data obtained from the monitoring to be used for the identifying of the runs. In one embodiment, the non-transitory computer-readable medium optionally stores program code for suggesting to the certain user to run an instantiation of the test scenario template representing the certain cluster of similar runs. In one embodiment, the non-transitory computer-readable medium optionally stores program code for generating the test scenario template representing the certain cluster of similar runs based on one or more runs of test scenarios belonging to the certain cluster of similar runs.

BRIEF DESCRIPTION OF THE DRAWINGS

The embodiments are herein described, by way of example only, with reference to the accompanying drawings. In the drawings.

DETAILED DESCRIPTION

Figure 1:
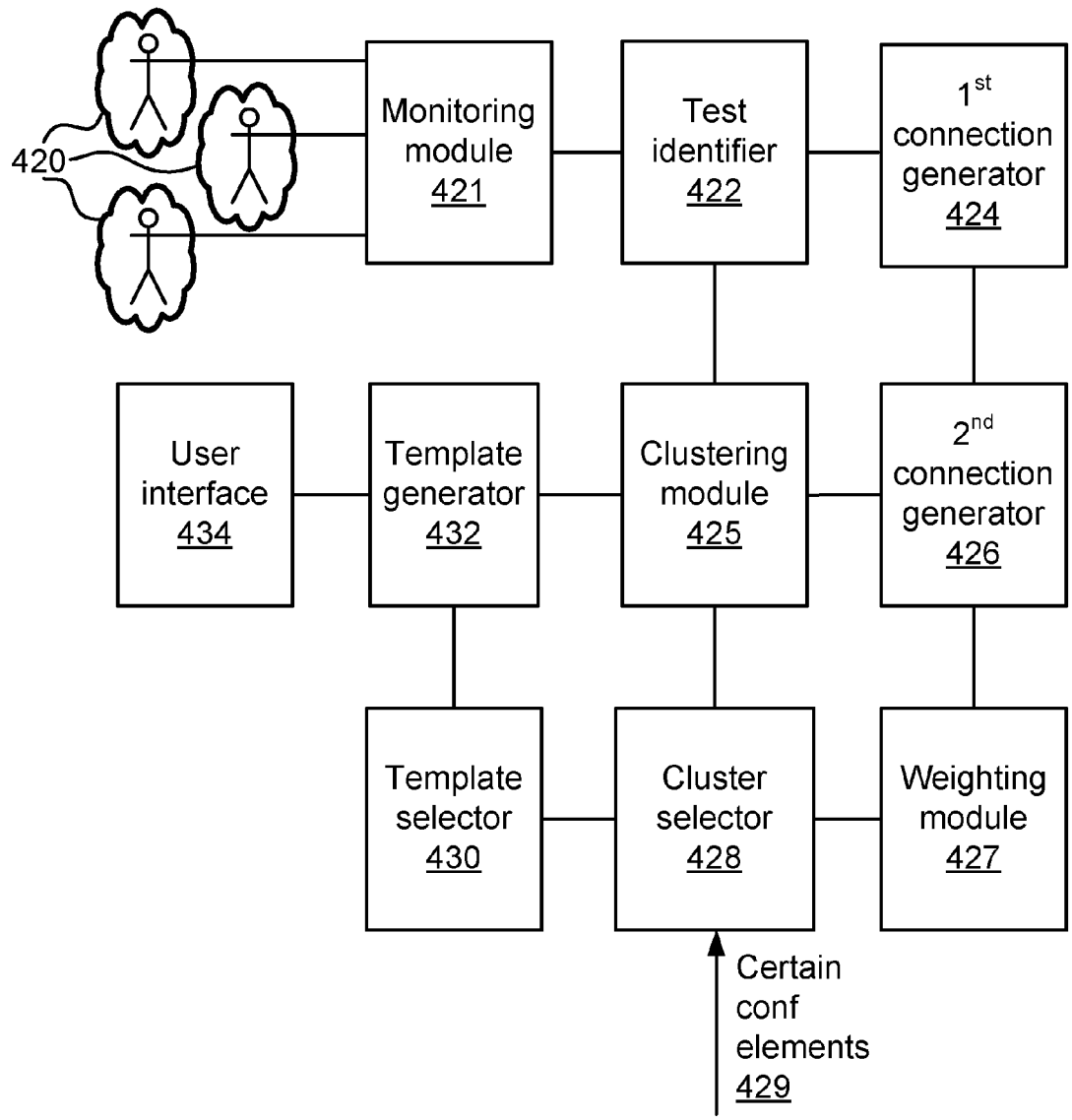
FIG. 1 illustrates one embodiment of a computer system configured utilize data collected from users belonging to different organizations to select a test scenario template relevant for testing configuration elements.

The term "transaction" is defined as a computer program, such as SAP ERP transaction or Oracle Application Form. In one example, a transaction may enable a user to access a certain functionality and/or may be called by filling its code in a box in a screen and/or by selecting it from a menu. In another example, a transaction is a logical portion of work, performed by a processor, involving the execution of one or more SQL statements.

The term "test step" refers to one or more actions performed via a User Interface (UI) as part of running a test scenario. In some cases, performing actions via a user interface may be achieved by interacting with the user interface, and/or by interacting with an Application Program Interface (API) related to the user interface.

The terms "a description of a run of a test scenario", also referred to as "a run of a test scenario", refer to data pertaining to running a test scenario on a software system (e.g., inputs, outputs, and/or intermediate data generated prior to running the test scenario, data generated during its run, and/or data generated as a result of running the test scenario). In one example, a run of test scenario may be obtained from monitoring a user running the test scenario on a software system. In the interest of brevity, in this disclosure, a term like "run of a test scenario" may be replaced with the shorter "run", where it is clear from the context. A run of a test scenario may be referred to as being "run by a user". This means that data included in the run of the test scenario is related to, or generated from, activity of the user on a software system, in which test steps of the test scenario were executed. Optionally, at least some of the data included in the run of the test scenario is derived from monitoring the activity of the user, which is related to execution of the test steps. Additionally, a run of a test scenario may be referred to as being associated with an organization, meaning that the run of the test scenario was run by a user belonging to the organization. Optionally, the user belonging to the organization ran the test scenario, at least in part, on a software system that belongs to the organization. Moreover, if it is mentioned, for example, that runs of test scenarios are received or clustered, it is meant that the objects being received may be processed descriptions of the runs of test scenarios (e.g., describing various attributes of the runs of the test scenarios), and not necessarily the actual raw recorded data that was initially obtained from monitoring users running the test scenarios.

A run of a test scenario may be considered an instantiation of the test scenario. That is, a certain test scenario may be run several times. For example, a test scenario may be run by different users, run on different systems, and/or run by the same user on the same system at different times. Each time the test scenario is run, that may be considered an event of instantiating the test scenario, and each run of the test scenario may be considered an instantiation of the test scenario.

In some embodiments, runs of test scenarios are identified from data obtained from monitoring users. Optionally, monitoring users may involve detecting, recording, and/or analyzing information entered by the users to computer systems and/or information presented to the users by the computer systems. Additionally or alternatively, monitoring may involve logging programs that were executed by the users, values utilized by the programs, memory content of programs and/or network traffic related to activities taken by the users. Optionally, a run of a test scenario may include data obtained from monitoring that underwent processing, summarization and/or analysis. Thus, a run of a test scenario need not necessarily include all data obtained from monitoring the running of the test scenario, and/or include data obtained from the monitoring in the same form as it was originally collected in.

A run of a test scenario may include descriptions of various aspects of running the test scenario such as: (i) the identity and/or composition (e.g., field types and/or identifiers) of a user interface (UI) screens the user manipulated and/or was exposed to while running the test scenario; (ii) user interactions with a system (e.g., actions performed by the user) (iii) transactions executed; (iii) behavior of the system during the test scenario (e.g., content of network transmissions, procedure calls, requests made to components of the system); and/or (iv) representations of the state of the system at various stages before, during, and/or after the test scenario is run. Additionally, a run of a test scenario may include data extracted from the test scenario and/or template of which the run is an instantiation. For example, the run may include values taken from a script according to which the run is executed and/or default values that appeared in template of which the run is an instantiation. The run may even include portions, or the entire scope, of the test scenario and/or the template of which the run is an instantiation.

A test scenario that is run by a user may be characterized according to its degree of automation, depending on type of involvement required of the user. In cases where the user is required to enter most of the values (e.g., field values on a screen), the run of the test scenario may be considered to be a manual run. In other cases, where the system provides some of the values (e.g., automatically fills values in no more than 95% of the fields on a screen/transaction/business process), but the user is still required to provide other values (e.g. enter values to fields that remain without values in the screen/transaction/business process), the run of the test scenario may be considered to be a semiautomatic run. In cases where little to no user intervention is needed (e.g., the script for running a test includes more than 95% of the values to be entered to the UI for the test, and is read by the system), the run of the test scenario may be considered to be an automatic run.

The term "test scenario template" refers to a model according to which a test scenario may be structured. A test scenario template may include one or more test steps, which instruct a user on an action to perform as part of the test, such as where to enter a value, what button to push, what screen to select, or what transaction to run. Optionally, a test scenario template may include one or more default values used for running an instantiation of the test scenario template (e.g., default values for certain fields in a screen). Additionally or alternatively, a test scenario template may be missing one or more values that are required for running an instantiation of the test scenario template; in such a case, a user running the instantiation of a template may provide the one or more missing values. In the interest of brevity, in this disclosure, a term like "test scenario template" may be replaced with the shorter "template", where it is clear from the context.

A run of a test scenario based on a test scenario template may be considered an instantiation of the test scenario template. For example, different users may run test scenarios based on a certain template; each time one of the users runs a test scenario based on the certain template, the corresponding run of that test scenario is considered an instantiation of the certain template. Similarly, if a user runs multiple test scenarios based on a template, where each time a test scenario was run it was run on a same software system, each of the runs of the test scenarios is considered a separate instantiation of the certain template. Optionally, a test scenario template may be considered associated with an organization if a user belonging to the organization ran an instantiation of the template and/or is intended to run an instantiation of the template. Additionally or alternatively, a test scenario template may be considered associated with an organization if the template was generated based on one or more runs of test scenarios that are associated with the organization.

As used herein, the term "software system" refers to a computer system that has software components (e.g., software modules that include programs). A software system may involve hardware (e.g., servers with processors) on which the software may run. The hardware may be dedicated hardware for the software system (e.g., servers sitting at an organization to which the software systems belong). Additionally or alternatively, hardware involved in a software system may be allocated on demand (e.g., cloud-based servers that are utilized by the software system as needed by it).

FIG. 1 illustrates one embodiment of a computer system configured utilize data collected from users belonging to different organizations to select a test scenario template relevant for testing configuration elements. The illustrated embodiment includes at least a test identifier 422, a first connection generator 424, a clustering module 425, a second connection generator 426, a weighting module 427, a cluster selector 428, and a template selector 430.

The test identifier 422 is configured to identify runs of test scenarios by users 420 belonging to different organizations on software systems belonging to the different organizations. Optionally, running the test scenarios is useful for testing configuration elements of the software systems. For example, following a system update, many configuration elements may undergo a change of value. To test the influence of the update, users may run test scenarios in order that test various aspects of the many configuration elements.

The first connection generator 424 is configured to generate first connections between the configuration elements and the runs of the test scenarios identified by the test identifier 422. Optionally, a connection between a configuration element and a run of a test scenario indicates that running the test scenario may have been useful for testing the configuration element.

In one embodiment, the first connection generator 424 receives information indicating, for some of the configuration elements, which runs of test scenarios are related to the configuration elements. In one example, runs of test scenarios may include data fields indicating which configuration elements they are intended to test. Optionally, the data fields are added by a designer of the test scenario. In another example, the first connection generator 424 receives a table that lists identifiers of runs of test scenarios that were run to test each configuration element.

In another embodiment, the first connection generator 424 analyzes runs of test scenarios, and from the analysis the connection generator 424 is able to learn of one or more configuration elements that may have been involved and/or affected the system during the running of the test scenarios. These identified elements may be connected, by first connections, to the runs in which they were found.

In one example, the first connection generator 424 utilizes text analysis of a run of a test scenario, such as analyzing code belonging to a test scenario being run, input provided for running the test scenario, and/or output files, such as log files, generated when running the test scenario. The text analysis searches for certain names and/or values that are part of configuration elements (e.g., file paths, business process names). If such names and/or values are found, the corresponding configuration elements may be connected with the run of the test scenario with first connections.

In another example, the first connection generator 424 utilizes static analysis of code utilized for running a test scenario in order to identify one or more configuration elements that may be tested by running the test scenario. The static analysis may reveal if certain business processes, programs, and/or transactions are to be executed in various control flows of the code. If the certain business processes, programs, and/or transactions are linked to the one or more configuration elements, then the one or more configuration elements may be linked to runs of the test scenario with first connections. For example, a configuration element may indicate that a certain transaction should be performed if updating a database fails; if static analysis reveals that a test scenario may perform the certain transaction under certain conditions, a first connection may be made between the configuration element and a run of the test scenario.

In yet another example, the first connection generator 424 utilizes dynamic analysis of performed while running a test scenario in order to identify one or more configuration elements that may be tested by running the test scenario. Optionally, a run of the test scenario includes data collected while the dynamic analysis was performed. Analyzing the dynamic analysis data may reveal which transactions, business processes, and/or system resources were involved in the run of the test scenario. If the transactions, business processes, and/or system resources correspond to specific configuration elements, the specific configuration elements are connected to the run of the test scenario via first connections.

The clustering module 425 is configured to cluster the runs of test scenarios identified by the test identifier 422 into clusters comprising similar runs of test scenarios. Optionally, the clustering is based on similarity between the runs of the test scenarios. Optionally, the clustering is based on similarity between configuration elements associated with the runs of the test scenarios. For example, the clustering may utilize similarities between configuration files of systems on which the test scenarios were run, in order to help determine a placement of runs into clusters.

The second connection generator 426 is configured to generate, based on the first connections, second connections between the configuration elements and the clusters. For example, if a first connection exists between a certain configuration element and a certain run, and in addition, the certain run belongs to a certain cluster, then the second connection generator 426 may generate a second connection between the certain configuration element and the certain cluster.

Figure 3:
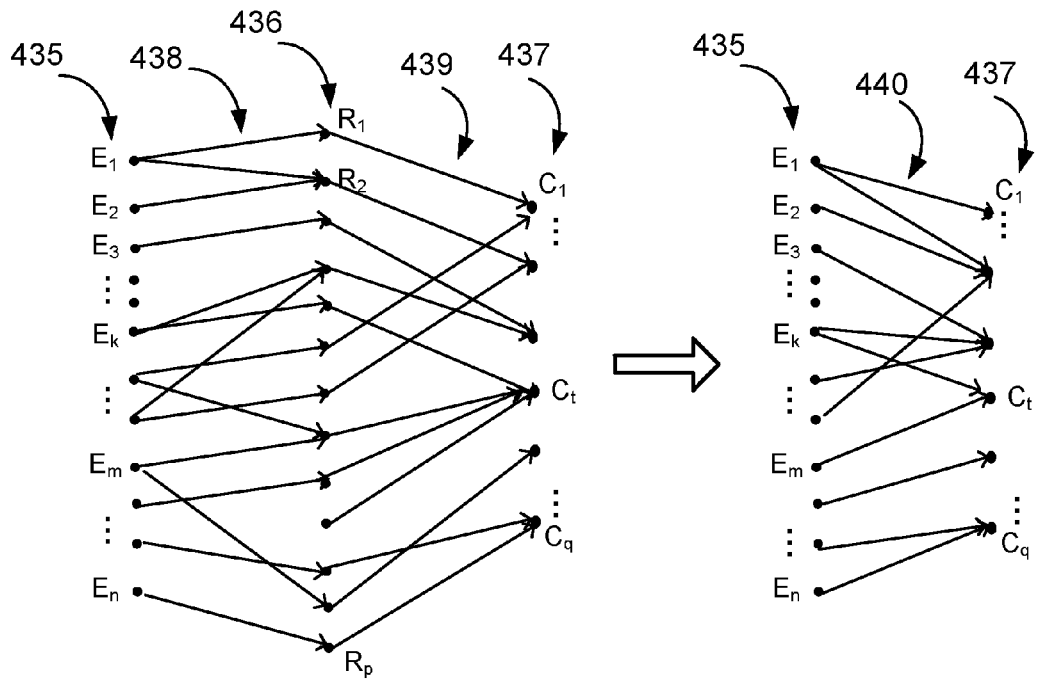
FIG. 3 illustrates a process in which second connections are generated from first connections and results of clustering.

FIG. 3 illustrates a process in which second connections are generated by the second connection generator from first connections and results of clustering. The first connection generator generates first connections 438 between n configuration elements 435 ($E_1, \ldots, E_n$) and p runs of test scenarios 436 ($R_1, \ldots, R_p$). Additionally, clustering the runs 436 yields q clusters 437 ($C_1, \ldots, C_q$). In the figure, the assignments of runs to clusters are denoted by arrows 439. Thus, the runs 436 serve as linkers between the configuration elements 435 and the clusters 437. The second connection generator removes these linker, and makes direct second connections 440 between the configuration elements 435 and the clusters 437.

In one embodiment, a second connection is made between a configuration element and a cluster, if there exists at least one first connection between the configuration element and a certain run, and certain run belongs to the cluster. For example, in FIG. 3, a second connection may be made between a configuration element of the elements 436 and a cluster from the clusters 437 if there is an arrow between the configuration element and a certain run from the runs 436, and another arrow between the certain run and the cluster.

In one embodiment, in order to form a second connection between a configuration element and a cluster, the configuration element needs to be linked to the cluster via a number of different runs that reaches a threshold. For example, in FIG. 3, a second connection may be made between a configuration element of the elements 436 and a cluster from the clusters 437 if the number of runs in the set 436 that have both arrows from the element to them, and arrows from them to the cluster, reaches the threshold. Optionally, the threshold depends on the size of the cluster, e.g., the larger the size of the cluster, the higher the threshold.

In one embodiment, the weighting module 427 is configured to weight the second connections based on number of different users that acted according to each second connection. As used herein, a user is said to act according to a second connection, between a configuration element and a cluster, if there is a run of a test scenario that links between the configuration element and the cluster. A run is considered to link between a certain configuration element and a certain cluster if the certain configuration element is connected to the run via a first connection, and the run belongs to the certain cluster.

Additionally or alternatively, for the purpose of weighting, the weighting module 427 may take into account the number of organizations that are associated with a second connection. An organization may be considered associated with a second connection between a configuration element and a cluster, if a user that belonging to the organization ran a test scenario that produced a run that links between the configuration element and the cluster.

In one embodiment, the weighting module 427 is configured to weight the second connections according to an increasing weight scale that depended on the number of users that acted according to each second connection. Herein, it is said that a user acts according to a second connection, if the second connection is between a certain configuration element and a certain cluster, and the user ran a test scenario that links between the certain configuration element and the certain cluster. Optionally, the weighting module 427 assigns a first instance of a second connection, with a number of users that acted according to it that is greater than number of users that acted according to a second instance of a second connection, a weight that is not lower than weight assigned to the second instance of a second connection. The higher the weight of a second connection between a configuration element and a cluster, the higher likelihood that the cluster contains a run relevant for testing the certain configuration element.

The cluster selector 428 is configured to receive certain configuration elements 429 associated with a certain software system, which are to be tested by a certain user. For example, the certain user needs to run test scenarios to evaluate the effect of the certain configuration elements 429 on the certain software elements. In one example, the certain configuration element involves 429 a change to a certain value, and the test scenarios are to be run in order to verify that there are not adverse effects due to the change. Optionally, the certain software system is associated with a certain organization that does not belong to the different organizations.

In one embodiment, the certain configuration elements 429 are selected from the configuration elements for which second connections were generated. Optionally, the certain configuration elements 429 include all the configuration elements for which second connections were generated. Optionally, the certain configuration elements 429 include at least one configuration element for which a second connection was generated, i.e., there is at least one second connection linking an element from the certain elements with a cluster.

The cluster selector 428 is configured to select a certain cluster of runs of test scenarios, based on a subset of the certain configuration elements 429 and the second connections.

The size of the subset of the certain configuration elements 429 may vary. In one example, the size of the subset is one, i.e., the subset contains a single configuration element. In another example, the subset contains all of the certain configuration elements 429. In yet another example, the subset includes some of the certain configuration elements 429, but not all of them.

Selecting the certain cluster based on a subset of multiple elements may have advantages in some embodiments. For example, configuration elements and/or values of elements are often related, correlated, and/or typically used together. Thus, being able to select a cluster based on multiple elements belonging to the subset, may enable a selection of a cluster that has runs that address combinations of elements as they may be typically used. Another advantage of selecting the certain cluster according to a subset that includes multiple elements is a reduction in the work and time required for testing. In one example, a cluster selected according to a subset may be assumed to test some aspects of all elements in the subset; thus, each instantiation of a template representing that cluster may simultaneously test multiple configuration elements. This can help reduce the number of test scenarios that need to be run in order to test the certain configuration elements.

In one embodiment, it is required for there to be one or more second connections between elements belonging to the subset of the certain configuration elements 429 and the certain cluster, for the cluster selector 428 to be able to select the certain cluster. Additionally, each element belonging to the subset should be connected to the certain cluster by at least one second connection. Alternatively, in another embodiment, there needs to be at least one second connection between one of the elements belonging to the subset and the certain cluster.

In one embodiment, the subset of certain configuration elements includes an element whose value has changed, and there is at least one second connections between the element whose value has changed and the certain cluster. For example, the certain cluster contains a run of a test scenario that was utilized to test effects the element whose value has changed on performance of a computer system.

In one embodiment, selecting the certain cluster by the cluster selector 428 involves determining that second connections between the elements belonging to the subset and the certain cluster meet a certain criterion. Optionally, if the subset contains a single element, the connections between the elements belonging to the subset and the certain cluster may consist of a single second connection.

The criterion may be derived from various factors such the size of the certain cluster, the number of elements in the subset, the number of second connections between elements in the subset and the certain cluster, and/or the weight of the second connections between elements in the subset and the certain cluster.

In one embodiment, the certain cluster is selected if the sum of weights second connections, connecting between elements in the subset and the certain cluster, reaches a threshold. Optionally, the threshold is a predetermined threshold, e.g., the value of the threshold and/or logic used to compute the threshold is known a priori. Optionally, the value of the threshold depends on the size of the certain cluster; for example, the larger the cluster, the higher is the threshold. Optionally, the value of the threshold may depend on the size of the subset; for example, the larger the subset, the higher is the threshold.

In one embodiment, the threshold represents at least two different users that acted according to at least one of the second connections connecting between elements in the subset and the certain cluster. That is, for the purpose of computing the sum of the weights of second connections connecting between elements in the subset and the certain cluster, each user is counted only once. Thus, there needs to be among second connections connecting between elements in the subset and the certain cluster, at least a first instance of a second connection which a first user acted upon, and at least a second instance of a second connection that a second user acted upon. Note that the first instance may be the same second connection as the second instance, but the first user is not the second user.

In another embodiment, the threshold represents at least two different users, associated with at least two different organizations, that acted according to at least one of the second connections connecting between elements in the subset and the certain cluster. That is, for the purpose of computing the sum of the weights of the second connections connecting between elements in the subset and the certain cluster, each user is counted only once, and each organization is counted only once. Thus, there needs to be among the second connections connecting between elements in the subset and the certain cluster, at least a first instance of a second connection which a first user, belonging to a first organization, acted upon, and at least a second instance of a second connection that a second user, belonging to a second organization, acted upon. Note that the first instance may be the same second connection as the second instance, but the first user is not the second user, and the first organization is not the second organization.

One advantage of having the sum of weights of the second connections connecting between elements in the subset and the certain cluster reach the threshold is that reaching the threshold may indicate a desired level of usage. A high weight of a second connection between an element and a cluster may be indicative, in some embodiments, of a large number of users and/or large number of users from different organizations, which utilize runs in the cluster to test the connection. Thus, high weights of second connections between a subset and a cluster may be indicative of the fact that the cluster is widely used to test elements in the subset. This may be indicative of the general usefulness of the cluster; such a cluster is likely to be useful for other organizations too.

In another embodiment, the certain cluster is selected according to other criteria that involve weights of second connections between elements in the subset and the certain cluster. In one example, there is threshold regarding a minimal weight that all second connections between elements in the subset and the certain connection need to exceed.

While performing its selection, the cluster selector 428 may utilize an objective function that evaluates a subset of the certain configuration elements with respect to a cluster. For example, the objective function may be the sum of weights of second connections that exist between Optionally, the certain cluster that is selected is one for which a subset exists, such that the objective function for the subset and the certain cluster is maximal compared to objective function values obtained when using other subsets and/or other clusters. Optionally, the certain cluster that is selected is one for which a subset exists, such that the objective function for the subset and the certain cluster exceeds a certain threshold.

Figure 4:
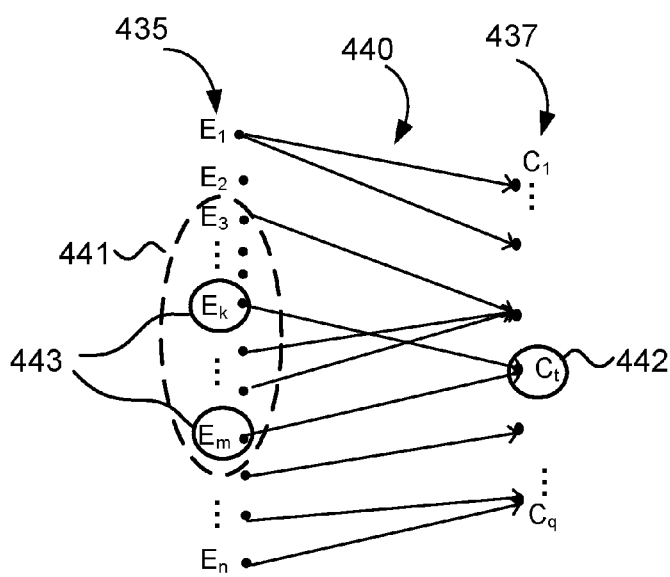
FIG. 4 illustrates a selection of the certain cluster.

FIG. 4 illustrates a selection of the certain cluster. The certain configuration elements 441 include multiple configuration elements (including the subset 443 that includes the elements $E_k$ and $E_m$. The second connection 440 connect between configuration elements 435 (that include the certain configuration elements 441), and the clusters 437. A certain cluster $C_t$ 442 is found such that the subset 443 that contains the elements $E_k$ and $E_m$, has connections between the elements of the subset 443 and the certain cluster 442 for which the sum of weights reaches a threshold. As illustrated in FIG. 4, the sum of the weight of the connection between element $E_k$ and the certain cluster $C_t$ and the weight of the connection between element $E_m$ and the certain cluster $C_t$, reaches the threshold.

In one embodiment, there may be a specific element belonging to the certain configuration elements 429 for which there is no second connection that connects between the specific element and any cluster. Optionally, the specific element may be marked as lacking a cluster from which a template may be suggested.

In another embodiment, there is a specific second connection between a specific object an the certain cluster; however, no subset of the certain configuration elements 429 may be found that both includes the specific element, and the sum of weights of the specific second connection and possibly one or more other second connections, connecting between elements in the subset and the certain cluster, reaches the threshold. Optionally, the specific element may be marked as being non-associated or "not covered" by the certain cluster.

Selecting the certain cluster may involve a search that needs to be performed among the clusters, among the possible subsets of the certain configuration elements 429, and/or in the space of possible pairs that include a subset and a cluster. Optionally, the search utilizes an objective function whose value depends on a subset and cluster being evaluated. Optionally, the search is guided by an attempt to find a cluster and subset that together maximize the objective function value. Those skilled in the art may recognize, that there are various algorithmic approaches that may be used in this optimization problem, such as, exhaustive search, forward or backward selection algorithms, genetic algorithms, simulated annealing, branch-and-bound searches, integer programming, or other convex optimization approaches.

In one embodiment, the cluster selector 428 selects the certain cluster to achieve a desired coverage of tests related to the certain configuration elements 429. For example, each element of the certain configuration elements 429 may require a certain number and/or combination of test scenarios to be run in order to verify the effects of the element on the system. Thus, the selection of the certain cluster may be guided by the desire to run the required test scenarios for as many elements. In one example, the cluster selector is more likely to select a subset that includes elements for which a requirement of test scenarios has not been met. Additionally or alternatively, once the requirement of test scenarios has been met for an element, it is less likely to be part of the subset considered by the cluster selector when selecting the certain cluster. Optionally, details regarding extent at which testing requirements of elements have been met are factored in to an objective function that is used by the cluster selector 428 to evaluate subsets and clusters when selecting the certain cluster.

In one embodiment, the certain cluster includes runs associated with different organization. For example, the certain cluster includes a first run associated with a first organization belonging to the different organizations and a second run associated with a second organization belonging to the different organizations. Additionally, the first organization is not the second organization. Optionally, having runs from multiple organizations is indicative of wide use of the cluster, and high likelihood that a template representing the cluster may be useful for other organizations. Additionally, having runs associated with multiple organizations may assist in selecting default values for a template generated based on the runs in the cluster, and/or it may assist in detecting and/or removing proprietary data from the template.

The template selector 430 is configured to select for the certain user a test scenario template representing the certain cluster. Optionally, usage information received by the template selector indicates numbers of users and/or organizations that utilized templates representing the certain cluster; thus, the template selector 430 may be able to select a template known to be utilized by a large number of users and/or organizations. Optionally, the template selector 430 may receive a profile of the certain user and select an appropriate template based on the profile.

In one embodiment, selecting the test scenario template for the certain user is guided by impact of elements in the subset of the certain configuration elements 429 on runs of test scenarios belonging to the certain cluster. Optionally, impact of elements in the subset is determined by ability influence of the elements on an outcome of running test scenarios. For example, changing a value of a certain configuration element may alter the control flow of the execution (e.g., cause different transaction to be executed). In another example, a new configuration element may cause a system error, which may dramatically change the outcome of a run. Optionally, the impact may be determined by static analysis of the test scenarios and/or runs of test scenarios that belong to the certain cluster. For example, static analysis may help determine if there are transactions in the test scenarios that depend on the configuration elements in the subset and/or the extent of the dependence. Optionally, the impact may be determined by dynamic analysis of runs of the test scenarios belonging to the certain cluster. For example, the control flow and/or data flow of the runs may be examined to generate a list of system components, transactions, and/or programs that are involved in each run; by comparing the list with the subset, it may be determined which runs are impacted by which elements belonging to the subset.

In one embodiment, the template selector 430 receives information regarding which runs of test scenarios were utilized to generate templates representing the certain cluster. Based on this information, along with information regarding impact of elements from the subset on runs belonging to the certain cluster, a template representing the certain cluster that is likely to be impacted by elements in the subset is selected.

In one embodiment, the computer system optionally includes a template generator 432 that is configured to generate the test scenario template based on one or more runs of test scenarios belonging to the certain cluster. Optionally, the template selector 430 selects the test scenario template for the certain user from among templates generated by the template generator 432. Optionally, the template selector 430 and the template generator 432 are implemented, in least in part, by the same software component. Optionally, the template generator 432 relies on information obtained from the template selector 430 to determine which templates to generate.

In one embodiment, the template generator 432 receives information regarding impact of elements from the subset on runs belonging to the certain cluster. Based on the information, the template generator 432 selects one or more runs from the certain cluster to be utilized in order to generate the template representing the certain cluster. Thus, template representing the certain cluster is one that is likely to be impacted by elements belonging to the subset. For example, changing values of configuration elements in the subset may have a noticeable impact on the running of instantiations of template representing the certain cluster.

In one embodiment, the computer system includes a monitoring module 421 that is configured to monitor the users 420 running the test scenarios on the software systems that belong to the different organizations and to provide data obtained from the monitoring to the test identifier 422.

In another embodiment, the computer system includes a user interface 434 configured to suggest to the certain user to run an instantiation of the test scenario template.

In one embodiment, the template selector 430 is configured to provide the certain user an indication of the number of different users who acted according to second connections between elements in the subset and the certain cluster. Optionally, the indication is provided via the user interface 434. Optionally, the more different users acted according the second connections, the higher the likelihood that the certain cluster is relevant to the certain user.

In another embodiment, the template selector 430 is configured to provide the certain user an indication of the number of different users who acted according to a specific second connection between a specific element in the subset and the certain cluster. Optionally, the indication is provided via the user interface 434. Optionally, the more different users acted according the specific second connection, the higher the likelihood that the certain cluster is relevant to the certain user.

In one embodiment, the certain software system is a SAP ERP. Optionally, the configurations elements involve database tables. Monitoring the users involves monitoring executed transactions (e.g., queries and returned values). The first connections are connections between database tables and SQL statements, executed in runs of the test scenarios, which access the database tables.

In another embodiment, the certain software system is an Oracle ERP. Optionally, the configuration elements involve customization code. Monitoring the users involves monitoring executed procedures. The first connections are connections between customization code and runs of test scenarios that execute the customization code.

In one embodiment, the template selector 430 is also configured to rank the test scenario template. For example, ranking the template may involve assigning the template a score and/or positioning the template in a certain ordering of templates. Optionally, ranking the template is done according to the sum of the weights of the second connections connecting between the subset and the certain cluster; the higher the sum, the higher the template is ranked. Optionally, ranking the template is done according to the number of different organizations associated with the second connections between the subset and the certain cluster; the larger the number of different organizations, the higher the template is ranked.

It is to be noted that different embodiments may implement components of the computer system illustrated in FIG. 1 in different ways. For example, in some embodiments one or more of the following may be implemented by the same software module and/or software modules running on the same processor: the monitoring module 421, the test identifier 422, the first connection generator 424, the clustering module 425, the second connection generator 426, the weighting module 427, the cluster selector 428, the template selector 430, and the template generator 432. Optionally, one or more of the aforementioned components may be implemented on a remote server, such as a cloud-based server.

In one example, the first connection generator 424 is implemented as part of the test identifier 422. In another example, the weighting module 427 is implemented as part of the second connection generator. In another example, the cluster selector 428 and the template selector 430 are implemented, at least in part, by the same software module.

Figure 2:
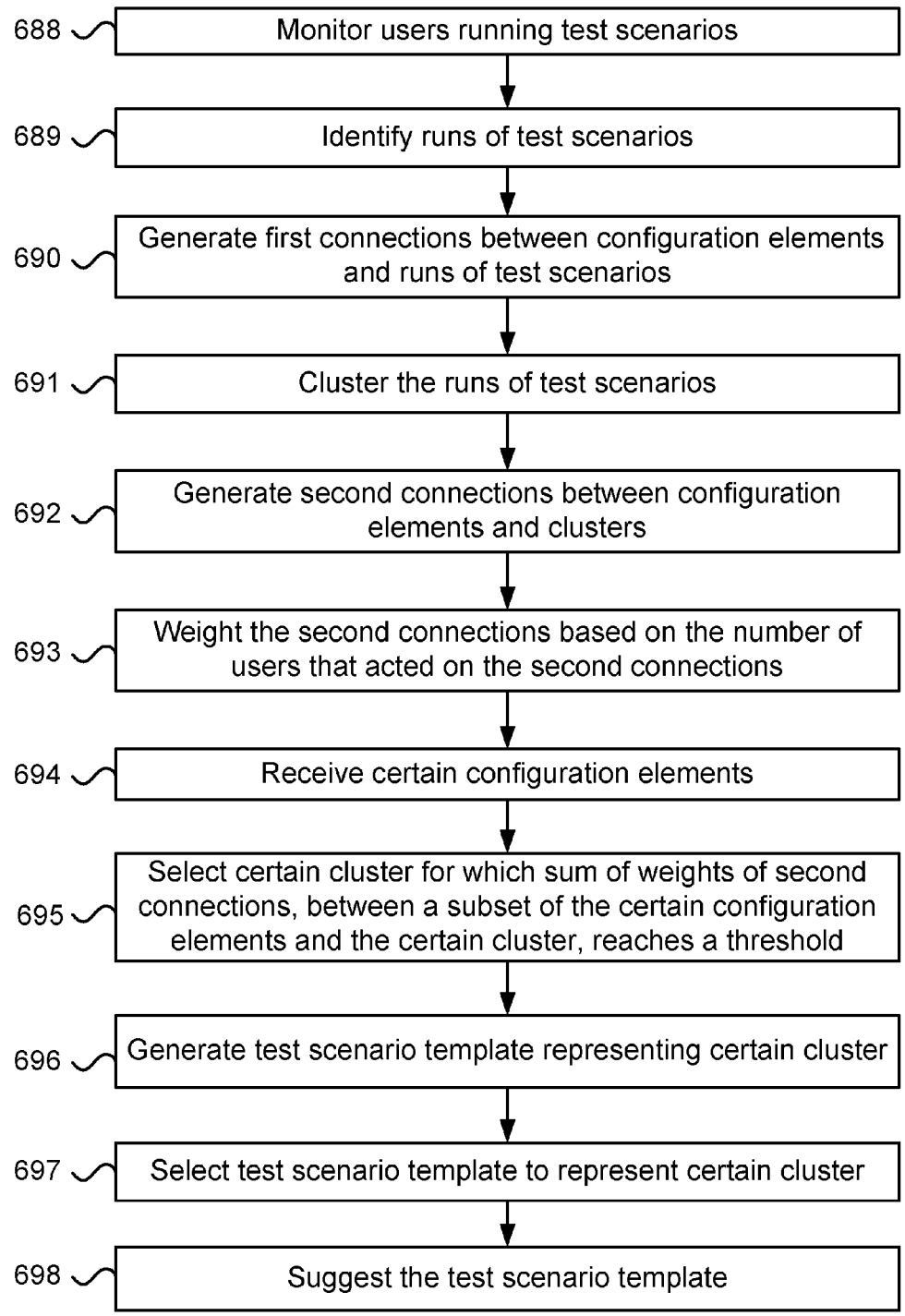
FIG. 2 illustrates one embodiment of a computer implemented method for utilizing data collected from users belonging to different organizations to select a test scenario template relevant for testing configuration elements.

FIG. 2 illustrates one embodiment of a computer implemented method for utilizing data collected from users belonging to different organizations to select a test scenario template relevant for testing configuration elements. The illustrated embodiment includes the following steps:

In step 689, identifying runs of test scenarios run by users belonging to different organizations on software systems belonging to the different organizations; running the test scenarios is useful for testing configuration elements of the software systems.

In step 690, generating first connections between the configuration elements and the runs.

In step 691, clustering the runs of test scenarios to clusters comprising similar runs. Optionally, the clustering is done at least in part, according to configuration elements associated with the runs (as indicated by the first connections).

In step 692, generating, based on the first connections, second connections between the configuration elements and the clusters.

In step 693, weighting the second connections based on number of different users that acted according to each second connection; the larger the number of users that acted according to a connection, the higher the weight of the connection and the higher the likelihood that the connection is relevant for checking its associated configuration element.

Optionally, weighting the second connections is done according to an increasing weight scale which assigns a first instance of a second connection, with a number of users that acted according to it that is greater than number of users that acted according to a second instance of a second connection, a weight that is not lower than weight assigned to the second instance of a second connection; the higher the weight of a second connection between a configuration element and a cluster, the higher likelihood that the cluster contains a run relevant for testing the certain configuration element.

In step 694, receiving the certain configuration elements 429, which are associated with a certain software system, and which are to be tested by a certain user. Optionally, the certain software system is associated with a certain organization that does not belong to the different organizations.

In step 695, selecting a certain cluster based on a subset of the certain configuration elements and the second connections. Optionally, selecting the certain cluster also involves identifying the subset. The selection of the certain subset is based on weights of the second connections. For the certain cluster, sum of weights of second connections, between elements in the subset and the certain cluster, must reach a threshold. Optionally, the threshold is proportional to the number of configuration elements in the subset.

Additionally, each element in the subset should be connected to the certain cluster by a second connection. Optionally, the certain cluster includes a first run associated with a first organization belonging to the different organizations and a second run associated with a second organization belonging to the different organizations. Additionally, the first organization is not the second organization.

And in step 697, selecting for the certain user a test scenario template representing the certain cluster.

In one embodiment, the threshold represents at least two different users that acted according to at least one of the second connections connecting between elements in the subset and the certain cluster. Alternatively or additionally, the threshold may represent at least two different users, associated with at least two different organizations, that acted according to at least one of the second connections connecting between elements in the subset and the certain cluster.

In one embodiment, the computer implemented method may include optional step 688 which involves monitoring the users 420 running the test scenarios on the software systems that belong to the different organizations and providing data obtained from the monitoring to be used for the identifying of the runs.

In one embodiment, the computer implemented method may include optional step 698 which involves suggesting to the certain user to run an instantiation of the test scenario template. For example, suggesting may be done via the user interface 434.

In one embodiment, the computer implemented method includes optional step 696 which involves generating the test scenario template based on one or more runs of test scenarios belonging to the certain cluster. Optionally, the template is generated from one or more runs of test scenarios that are selected from the certain cluster. Optionally, selecting the one or more runs is based on received information relating to impact of configuration elements belonging to the subset on runs of test scenarios belonging to the certain cluster.

In one embodiment, the subset of the certain configuration elements includes an element whose value has changed, and at least one of the second connections connecting between elements in the subset and the certain cluster corresponds to the element whose value has changed.

In one embodiment, the subset contains a single configuration element. Additionally or alternatively, the subset may include all the configuration elements associated with the certain software system.

In one embodiment, the method includes an optional step of providing the certain user an indication of the number of different users who acted according to second connections between elements in the subset and the certain cluster. Optionally, the indication is provided via the user interface 434. Optionally, the more different users acted according the second connections, the higher the likelihood that the certain cluster is relevant to the certain user.

In another embodiment, the method includes an optional step of providing the certain user an indication of the number of different users who acted according to a specific second connection between a specific element in the subset and the certain cluster. Optionally, the indication is provided via the user interface 434. Optionally, the more different users acted according the specific second connection, the higher the likelihood that the certain cluster is relevant to the certain user.

In one embodiment, the clustering of the runs involves clustering the runs according to configuration elements associated with the runs. That is, at least some portion of notion of similarity between two runs of test scenarios is determined according to configuration elements associated with each of the two runs. In one example, the configuration elements associated with each of the two runs are configuration files belonging to the systems on which the respective test scenarios were run. In another embodiment, clustering of the runs involves clustering according to input or output values in the runs, which are directly or indirectly related to the configuration elements.

In one embodiment, weighting the second connections is based on number of different organizations that have users that both belong to the organizations and have acted according to the second connections. For example, second connection that have users from many organizations that acted according to them, receive a higher weight than second connections with the same number of users that acted according to them, but the user come from fewer organizations.

In one embodiment, the computer implemented method includes an optional step of ranking the test scenario template in proportion to the sum of the weights of the second connections connecting between elements in the subset and the certain cluster.

In another embodiment, the computer implemented method includes an optional step of ranking the test scenario template in proportion to number of different organizations associated with the certain second connection.

In one embodiment, a non-transitory computer-readable medium stores program code that may be used by a computer to utilize data collected from users belonging to different organizations to select a test scenario template relevant for testing configuration elements. The computer includes a processor, and the non-transitory computer-readable medium stores the following program code:

Program code for identifying runs of test scenarios run by users belonging to different organizations on software systems belonging to the different organizations. Optionally, running the test scenarios is useful for testing configuration elements of the software systems.

Program code for generating first connections between the configuration elements and the runs of the test scenarios.

Program code for clustering the runs to clusters that include similar runs.

Program code for generating, based on the first connections, second connections between the configuration elements and the clusters.

Program code for weighting the second connections based on number of different users that acted according to each second connection.

Program code for receiving certain configuration elements associated with a certain software system, which are to be tested by a certain user. Optionally, the certain software system is associated with a certain organization that does not belong to the different organizations Program code for selecting a certain cluster based on a subset of the certain configuration elements and the second connections; each element in the subset is connected to the certain cluster by a second connection and sum of weights of second connections, connecting between elements in the subset and the certain cluster, reaches a threshold.

Optionally, the certain cluster includes a first run associated with a first organization belonging to the different organizations and a second run associated with a second organization belonging to the different organizations. Additionally, the first organization is not the second organization.

And program code for selecting for the certain user a test scenario template representing the certain cluster.

In one embodiment, the non-transitory computer-readable medium optionally stores program code for monitoring the users running the test scenarios on the software systems that belong to the different organizations and program code for providing data obtained from the monitoring to be used for the identifying of the runs.

In one embodiment, the non-transitory computer-readable medium optionally stores program code for suggesting to the certain user to run an instantiation of the test scenario template.

In one embodiment, the non-transitory computer-readable medium optionally stores program code for generating the test scenario template based on the second connections connecting between elements in the subset and the certain cluster.

In one embodiment, the non-transitory computer-readable medium optionally stores program code for providing the certain user an indication of the number of different users who acted according to the second connections connecting between the subset and the certain cluster. Optionally, the more different users acted according to the second connections connecting between elements in the subset and the certain cluster, the higher the likelihood that the second connections connecting between elements in the subset and the certain cluster are relevant to the certain user.

In one embodiment, the non-transitory computer-readable medium optionally stores program code for weighting the second connections based on number of different organizations which have users that belong to them that acted according to the second connections.

In one embodiment, the non-transitory computer-readable medium optionally stores program code for ranking the test scenario template in proportion to the weight of the second connections connecting between elements in the subset and the certain cluster.

Figure 5:
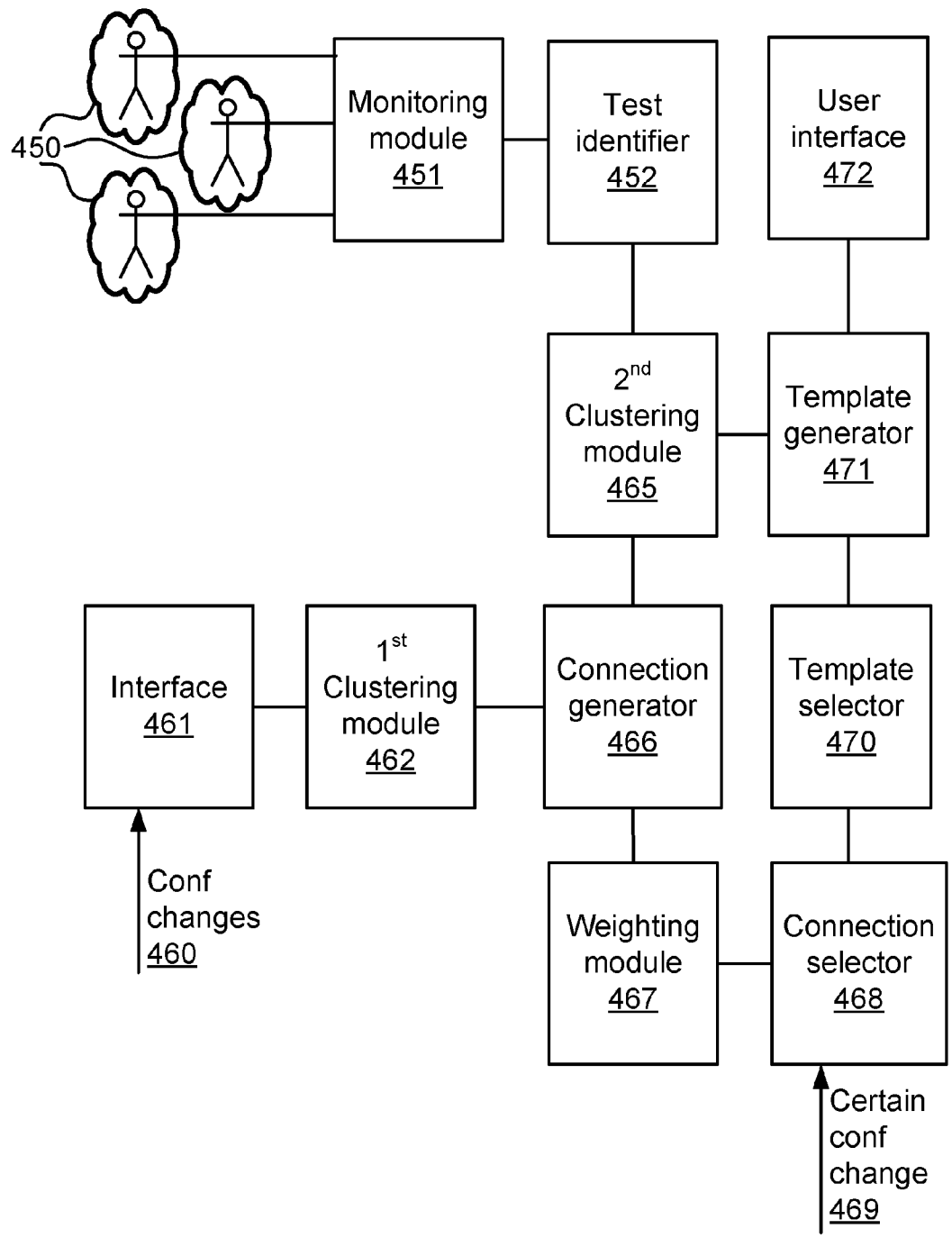
FIG. 5 illustrates one embodiment of a computer system configured select a test scenario template relevant for testing a configuration change.

FIG. 5 illustrates one embodiment of a computer system configured select a test scenario template relevant for testing a configuration change. The illustrated embodiment includes at least a test identifier 452, and interface 461, a first clustering module 462, a second clustering module 465, a connection generator 466, a weighting module 467, a connection selector 468, and a template selector 470.

The test identifier 452 is configured to identify runs of test scenarios by users 450 belonging to different organizations on software systems belonging to the different organizations. Optionally, running the test scenarios is useful for testing configuration changes to the software systems. For example, following configuration changes configuration elements may undergo a change of value. To test the influence of the configuration changes, users may run test scenarios in order that test various aspects of the related software systems and/or behaviors of the software system under various conditions.

The interface 461 is configured to receive data 460 indicative of configuration changes made to the software systems of the different organizations. Optionally, the received data 460 includes a list of configuration changes, such as a list of configuration elements and/or values related elements. Optionally, the data includes configuration elements along with their new values.

In one embodiment, the data 460 received by the interface 461 includes a new configuration file. By comparing the new configuration file to a previous configuration file, the configuration changes are deduced.

In one embodiment, each data item the interface 461 receives relates to configuration changes of a single organization belonging to the different organizations. For example, a data item may be a configuration file associated with a software system belonging to one organization of the different organizations.

The first clustering module 462 is configured to cluster the configuration changes into clusters of similar configuration changes. Optionally, clusters of similar configuration changes include configuration changes that deal with the same, or similar, configuration elements. Optionally, clusters of similar configuration changes include configuration changes that are associated with similar values (e.g., the values are related to certain configuration elements). Optionally, clusters of similar configuration changes include configuration changes that are associated with the same, or similar, configuration elements and also are associated with same, or similar, values.

The second clustering module 465 is configured to cluster the runs to clusters that include similar runs. Optionally, the clustering is based on similarity between the runs of the test scenarios. Optionally, the clustering is based on similarity between configuration elements associated with the runs of the test scenarios. For example, the clustering may utilize similarities between configuration files of systems on which the test scenarios were run, in order to help determine a placement of runs into clusters.

In one embodiment, each of the clusters of similar runs contains runs associated with at least a predetermined number of organizations. For example, each cluster includes runs from at least two different organizations.

The connection generator 466 is configured to generate connections between the clusters of similar configuration changes and the clusters of similar runs. Optionally, the connections are generated, at least in part, based on information indicating for at least some of the runs of test scenarios which configuration changes they are intended to test. In one example, a connection between a cluster of similar configuration changes and a cluster of similar runs may be made if there is a run of a test scenario belonging to the cluster of runs that was run to test a configuration change belonging to the cluster of similar configuration changes. In another example, a connection between a cluster of configuration changes and a cluster of runs may be made if there are at least a predetermined number of runs belonging to the cluster of runs that were run to test one or more configuration changes belonging to the cluster of configuration changes. In yet another example, a connection between a cluster of configuration changes and a cluster of runs may be made if there are one or more runs belonging to the cluster of runs that were run to test a predetermined number of configuration changes belonging to the cluster of configuration changes.

In one embodiment, the first connection generator 466 receives information indicating, for some of the configuration changes, which runs of test scenarios are related to the configuration changes (e.g., which runs were run to test which changes). In one example, runs of test scenarios may include data fields indicating which configuration changes they are intended to test. Optionally, the data fields may be added (e.g., automatically generated) by a designer of the test scenario. In another example, the connection generator 466 receives a table that lists identifiers of runs of test scenarios that were run to test a configuration change.

In another embodiment, the connection generator 466 analyzes runs of test scenarios, and from the analysis the connection generator 466 is able to learn of one or more configuration elements that have changed, and may have been involved in the running of the test scenarios.

In one example, the connection generator 466 utilizes text analysis of a run of a test scenario, such as analyzing code belonging to a test scenario being run, input provided for running the test scenario, and/or output files, such as log files, generated when running the test scenario. The text analysis searches for certain names and/or values that are part of configuration elements (e.g., file paths, business process names) that may have undergone a change.

In another example, the first connection generator 466 utilizes static analysis of code utilized for running a test scenario in order to identify one or more configuration changes that may have been tested by running the test scenario. The static analysis may reveal if certain business processes, programs, and/or transactions are to be executed in various control paths of the code. If the certain business processes, programs, and/or transactions are linked to the one or more configuration changes, then the one or more configuration changes may be linked to runs of the test scenario. For example, a configuration change may indicate that a certain transaction should be performed if updating a database fails; if static analysis reveals that a test scenario may perform the certain transaction under certain conditions, a connection may be made between the configuration change and a run of the test scenario.

In yet another example, the connection generator 466 utilizes dynamic analysis performed while running a test scenario in order to identify one or more configuration changes that may be being tested by running the test scenario. Optionally, a run of the test scenario includes data collected while the dynamic analysis was performed. Analyzing the dynamic analysis data may reveal which transactions, business processes, and/or system resources were involved in the run of the test scenario. If the transactions, business processes, and/or system resources correspond to specific configuration changes, then the connection generator 466 may connect the specific configuration changes to the run of the test scenario.

In one embodiment, the connection generator 466 receives indications regarding one or more configuration changes of interest at a given point of time (e.g., one or more elements that have been added or changed not long before the point of time). Operating under the assumption that runs of test scenarios that were run directly after the point of time are done in order to test the one or more configuration changes, the connection generator 466 connects between the one or more configuration changes and the runs of the test scenarios that were run directly after the point of time.

In one embodiment, the weighting module 467 is configured to weight the connections generated by the connection generator 466 based on number of different organizations associated with each of the connections. An organization may be considered associated with a connection between a cluster of similar configuration changes and a cluster of similar runs if a run of a test scenario, from the cluster of similar runs, is run by a user belonging to the organization to test a configuration change from the cluster of similar configurations changes. In one example, the more organizations associated with a connection, the higher the connection is weighted by the weighting module 467.

In another embodiment, the weighting module 467 may weight connections, at least in part, according to the number of users associated with each of the connections. A user may be considered associated with a connection if the user ran a test scenario, with a corresponding run that belongs to the cluster of similar runs, in order to test a configuration change belonging to the cluster of configuration changes.

It is to be noted that by stating that weighting is done at least in part according to a certain factor it is meant that the weight may be a function of the factor and possibly other factors. For example, the weighting module 467 may compute a weight based both on the number of organizations associated with connections and the number of users associated with the connections.

In yet another embodiment, the weighting module 467 may weight connections, at least in part, according to the number of configuration elements belonging to the cluster of configuration changes that have a corresponding run in the cluster of similar runs (e.g., the corresponding run was run to test one or more of the configuration changes in the cluster). For example, the more configuration changes with corresponding runs in the cluster of similar runs, the higher the weight given to the connection between the cluster of similar runs and the cluster of configuration changes.

In still another embodiment, the weighting module 467 may weight connections, at least in part, according to the number of runs in the cluster of similar runs that were run to test at least one configuration change belonging to the cluster of configuration changes. For example, the more runs in the cluster of similar runs that were run to test one or more configuration changes (belonging to the cluster of similar configuration changes), the higher the connection weight.

The connections selector 468 is configured to receive a certain configuration change 469 of a certain software system. Optionally, the certain software system is associated to a certain organization that does not one of the different organizations. Optionally, the certain configuration change 469 is intended to be tested by a certain user. For example, the certain user needs to run a test scenario that tests effects the certain configuration change 469 may have on the certain software system.

The connection selector 468 is also configured to select a certain connection, weighted above a threshold, between a cluster of similar configuration changes, to which the certain configuration change 469 corresponds, and a certain cluster of similar runs of test scenarios. Optionally, the certain connection that is selected is a connection with maximal weight among connections involving a cluster of similar configuration changes to which the certain configuration change 469 corresponds.

In one example, the certain configuration change 469 may be considered to correspond to a certain cluster of similar configuration changes if the cluster contains the certain configuration change 469. For example, the cluster may contain a configuration element and corresponding value, and the certain configuration change 469 also involves the same element and the same value. In another example, the certain configuration change 469 may be considered to correspond to a certain cluster of similar configuration changes if it is similar to one or more configuration changes belonging to the certain cluster. Optionally, the similarity of the certain configuration change 469 to one or more configuration changes may be determined according to a similarity function which relies on similarities of text and/or values. In yet another example, the certain configuration change 469 may be considered to correspond to a cluster of similar configuration changes, if the first clustering module 462 would have placed the certain configuration change 369 in the cluster had the certain configuration change 469 been among the configuration changes clustered by the first clustering module 462.

In one embodiment, the threshold is a predetermined threshold, e.g., the value of the threshold and/or logic used to compute the threshold are known a priori. Optionally, the value of the threshold depends on the size of the cluster of similar configuration changes corresponding to the certain connection. For example, the larger the cluster, the higher is the threshold. Optionally, the value of the threshold depends on the size of the certain cluster of similar runs. For example, the larger the cluster of the similar runs (i.e., the more runs belong to the cluster), the higher is the threshold.

In one embodiment, the threshold represents at least two different users that acted according to the certain connection. That is, for the purpose of computing the weight of connections, each user is counted only once. Thus, for the certain connection to reach the threshold there needs to be at least a first user that acted upon the certain connection, and at least a second user that acted according to the certain connection. Note that the first user is not the second user.

Herein, a user may said to "act according to a connection" or "act upon a connection", with reference to a connection between a certain cluster of configuration changes and a certain cluster of runs. This means that there is at least one run of a test scenario, which was run by the user and which belongs to the certain cluster of runs. Additionally, the run of the test scenario was run by the user to test at least one configuration change that belongs to the certain cluster of configuration changes.

In another embodiment, the threshold represents at least two different users, associated with at least two different organizations, that acted according to the certain connection. That is, for the purpose of computing the weight of connections, each user is counted only once, and each organization is counted only once. Thus, for the certain connection to reach the threshold there needs to be at least a first user, belonging to a first organization, that acted upon the certain connection, and at least a second user, belonging to the second organization, that acted according to the certain connection. Note that the first user is not the second user, and the first organization is not the second organization.

One advantage of having the weight of the certain connection reach the threshold is that reaching the threshold may indicate a desired level of usage. A high weight of a connection between a cluster of similar configuration changes and a cluster of similar runs may be indicative, in some embodiments, of a large number of users and/or large number of users from different organizations, that utilize runs from the cluster of similar runs to test the similar configuration changes. This may be indicative of the general usefulness of the cluster of similar runs for other organizations too.

The template selector 470 is configured to select, for the certain user, a test scenario template representing the certain cluster. Optionally, usage information received by the template selector 470 indicates numbers of users and/or organizations that utilized templates representing the certain cluster. Thus, the template selector 470 may be able to select a template known to be utilized by a large number of users and/or organizations. Optionally, the template selector 470 may receive a profile of the certain user and select an appropriate template based on the profile. Optionally, the certain cluster of similar runs includes a first run associated with a first organization belonging to the different organizations and a second run associated with a second organization belonging to the different organizations. Additionally, the first organization is not the second organization.

In one embodiment, the template selector 470 may be also configured to provide the certain user an indication of the number of users belonging to the different organizations who acted according to the certain connection. The more users acted according to the certain connection, the higher the likelihood that the certain connection is relevant to the certain user. Additionally or alternatively, the template selector 470 may be also configured to provide the certain user an indication of the number of different organizations that are associated with the certain connection. The more organizations associated with the certain connection, the higher the likelihood that the certain connection is relevant to the certain user.

In another embodiment, the template selector 470 is optionally configured to rank the test scenario template in proportion to the weight of the certain connection. For example, the higher the weight of the certain connection, the higher the test scenario template is ranked. Ranking the template may involve assigning the template a score and/or positioning the template in a certain ordering of templates.

In one embodiment, the computer system optionally includes a template generator 471 that is configured to generate the test scenario template based on one or more runs of test scenarios belonging to the certain cluster. Optionally, the template selector 470 selects the test scenario template representing the certain user from among templates generated by the template generator 471. Optionally, the template selector 470 and the template generator 471 are implemented, in least in part, by the same software component. Optionally, the template generator 471 relies on information obtained from the template selector 470 to determine which templates to generate.

In one embodiment, the computer system includes an optional monitoring module 451 that is configured to monitor the users 450 belonging to the different organization, running the test scenarios on the software systems that belong to the different organizations, and to provide data obtained from the monitoring to the test identifier 451. Optionally, at least some of the test scenarios run by the users 450 are run to test how the configuration changes 460 affect the software systems belonging to the different organizations. Optionally, the monitoring module may be used to monitor users belonging to the certain organization.

In another embodiment, the computer system includes an optional user interface 472 configured to suggest to the certain user to run an instantiation of the test scenario template.

In one embodiment, the certain software system is a SAP ERP. Optionally, the configurations involve database tables. Monitoring the users may involve monitoring of executed transactions (e.g., queries to the database and/or values returned from the database). The connections are connections between clusters of database tables and clusters comprising runs of test scenarios that include SQL statements which access the database tables.

In another embodiment, the certain software system is an Oracle ERP. Optionally, the configurations are customization code. Monitoring the users may involve monitoring executed procedures. The connections are between clusters of customization code and clusters of runs of test scenarios that execute the customization code.

It is to be noted that different embodiments may implement components of the computer system illustrated in FIG. 5 in different ways. For example, in some embodiments one or more of the following may be implemented by the same software module and/or software modules running on the same processor: the monitoring module 451, the test identifier 452, the first clustering module 462, the second clustering module 465, the weighting module 467, the connection selector 468, the template selector 470, and the template generator 471. Optionally, one or more of the aforementioned components may be implemented on a remote server, such as a cloud-based server.

In one example, the weighting module 467 is implemented, at least in part, by software modules belonging to the connection selector 468 and/or the connection generator 466. In another example, the connection generator 466 is implemented, at least in part, by software modules belonging to the first clustering module 462 and/or the second clustering modules 465. In another example, the template selector 470 and the template generator 471 are implemented, at least in part, by the same software module.

Figure 6:
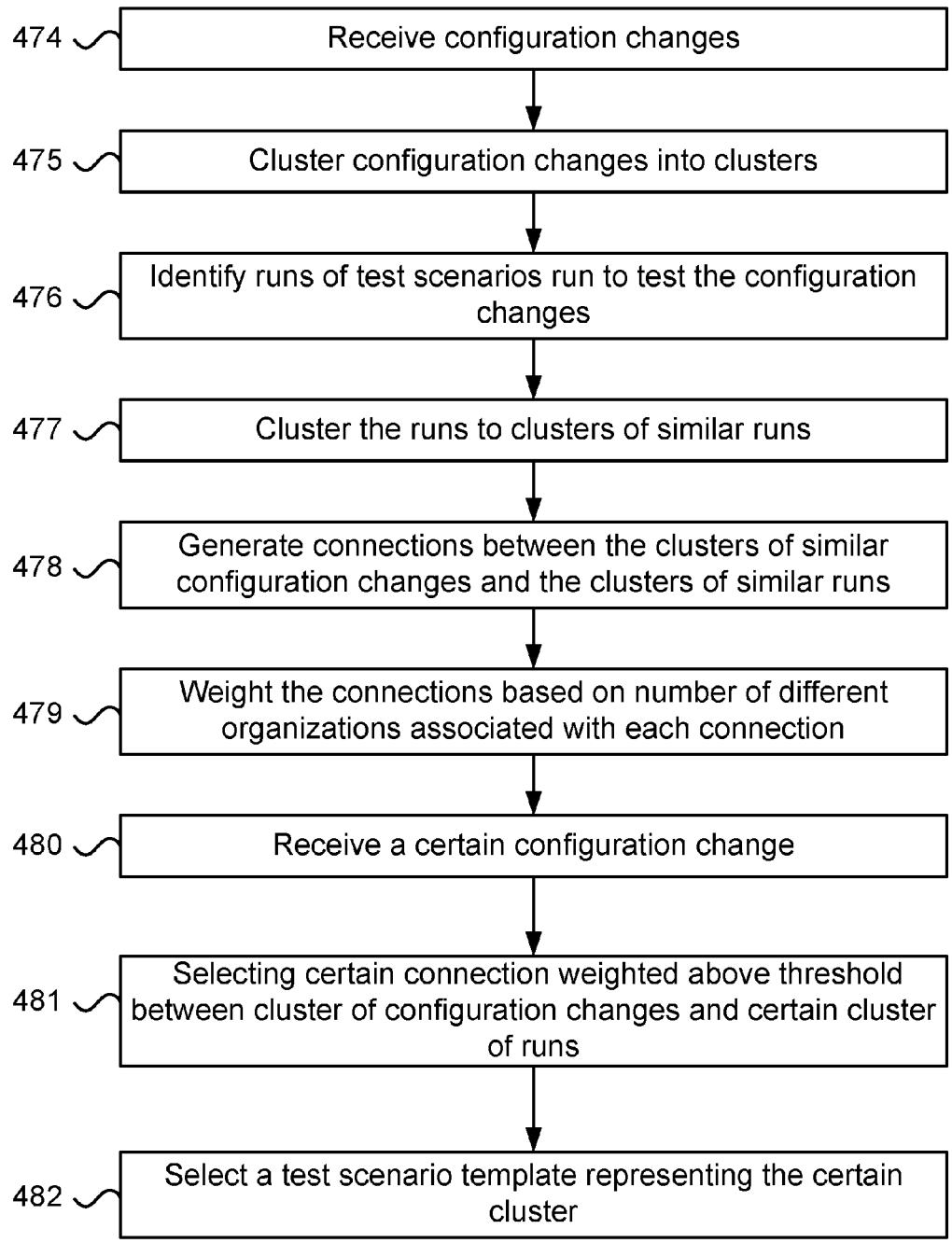
FIG. 6 illustrates one embodiment of a computer implemented method for selecting a test scenario template relevant to a configuration change.

FIG. 6 illustrates one embodiment of a computer implemented method for selecting a test scenario template relevant to a configuration change. The illustrated embodiment includes the following steps:

In step 474, receiving data indicative of configuration changes made to software systems of different organizations.

In step 475, clustering the configuration changes into clusters of similar configuration changes.

In step 476, identifying runs of test scenarios run by users belonging to the different organizations on software systems belonging to the different organizations. Optionally, running the test scenarios is useful for testing configuration elements of the software systems. Optionally, identifying the runs also involves identifying which configuration changes the runs are intended to test.

In step 477, clustering the runs to clusters of similar runs. Herein, "clusters of similar runs" are to be interpreted as "clusters comprising similar runs".

In one embodiment, the clustering of the runs involves clustering the runs according to configuration changes and/or configuration elements that are associated with the runs. That is, at least some portion of notion of similarity between two runs of test scenarios is determined according to configuration changes and/or configuration elements associated with each of the two runs. In one example, the configuration changes associated with each of the two runs are described in configuration files belonging to the systems on which the respective test scenarios were run.

In step 478, generating connections between the clusters of similar configuration changes and the clusters of similar runs.

In step 479, weighting the connections based on number of different organizations associated with each of the connections. An organization is associated with a connection between a cluster of similar configuration changes and a cluster of similar runs if a run of a test scenario, from the cluster of similar runs, is run by a user belonging to the organization to test a configuration change from the cluster of similar configurations changes. Additionally or alternatively, weighting the connections may be based on other factors. For example, such factors may be the number of users associated with each connection, the size of the cluster of similar configuration changes, and/or the size of the cluster of similar runs.

In step 480, receiving a certain configuration change of a certain software system to be tested by a certain user. Optionally, the certain software is associated with a certain organization that is not one of the different organizations.

In step 481, selecting a certain connection, weighted above a threshold, between a cluster of similar configuration changes, to which the certain configuration change corresponds, and a certain cluster of similar runs of test scenarios.

And in step 482, selecting for the certain user a test scenario template representing the certain cluster of similar runs. Optionally, the certain cluster of similar runs includes a first run associated with a first organization belonging to the different organizations and a second run associated with a second organization belonging to the different organizations. Additionally, the first organization is not the second organization.

In one embodiment, the computer implemented method illustrated in FIG. 6 may include an optional step of monitoring the users 450 running the test scenarios on the software systems that belong to the different organizations and providing data obtained from the monitoring to be used for the identifying of the runs.

In one embodiment, the computer implemented method illustrated in FIG. 6 may include an optional step of suggesting to the certain user to run an instantiation of the test scenario template. Optionally, suggesting may done via the user interface 472.

In another embodiment, the computer implemented method illustrated in FIG. 6 may include an optional step of generating the test scenario template based on one or more runs of test scenarios belonging to the certain cluster. Optionally, the template is generated from one or more runs of test scenarios that are selected from the certain cluster. Optionally, selecting the one or more runs is based on received information relating to an impact of configuration changes belonging to the cluster of similar configuration changes on runs of test scenarios belonging to the certain cluster. Optionally, the one or more runs based upon which the template is generated are runs that are highly impacted by configuration changes belonging to the cluster of similar configuration changes.

In one embodiment, the computer implemented method illustrated in FIG. 6 may include an optional step of providing the certain user an indication of the number of different users who acted according to certain connection. Optionally, the indication is provided via the user interface 472. Optionally, the more different users acted according the certain connection, the higher the likelihood that the certain connection is relevant to the certain user. Additionally or alternatively, the certain user may be provided an indication of the number of different organizations associated with the certain connection. Optionally, the indication is provided via the user interface 472. Optionally, the more organizations are associated with the certain connection, the higher the likelihood that the certain connection is relevant to the certain user.

In one embodiment, the computer implemented method illustrated in FIG. 6 includes an optional step of ranking the test scenario template in proportion to the weight of the certain connection. Optionally, the higher the weight of the certain connection, the higher the test scenario template is ranked. Optionally, ranking the template may involve assigning the template a score and/or positioning the template in a certain ordering of templates.

In one embodiment, the computer implemented method illustrated in FIG. 6 includes an optional step of marking the certain configuration change 460 as missing test scenario template if the certain configuration change 460 does not have a certain connection weighted above a threshold.

In one embodiment, a non-transitory computer-readable medium stores program code that may be used by a computer to select a test scenario template relevant to a configuration change. The computer includes a processor, and the non-transitory computer-readable medium stores the following program code:

Program code for receiving data indicative of configuration changes made to software systems of different organizations.

Program code for clustering the configuration changes into clusters of similar configuration changes.

Program code for identifying runs of test scenarios run by users belonging to the different organizations on the software systems belonging to the different organizations; running the test scenarios is useful for testing at least some of the configuration changes.

Program code for clustering the runs to clusters of similar runs.

Program code for generating connections between the clusters of similar configuration changes and the clusters of similar runs.

Program code for weighting the connections based on number of different organizations associated with each of the connections. An organization is associated with a connection between a cluster of similar configuration changes and a cluster of similar runs if a run of a test scenario, from the cluster of similar runs, is run by a user belonging to the organization to test a configuration change from the cluster of similar configurations changes.

Program code for receiving a certain configuration change of a certain software system to be tested by a certain user.

Program code for selecting a certain connection, weighted above a threshold, between a cluster of similar configuration changes, to which the certain configuration change corresponds, and a certain cluster of similar runs of test scenarios. Optionally, the certain cluster of similar runs includes a first run associated with a first organization belonging to the different organizations and a second run associated with a second organization belonging to the different organizations. In addition, the first organization is not the second organization.

And program code for selecting for the certain user a test scenario template representing the certain cluster of similar runs.

In one embodiment, the non-transitory computer-readable medium optionally stores program code for providing the certain user an indication of the number of users belonging to different organizations who acted according to the certain connection; the more users acted according to the certain connection, the higher the likelihood that the certain connection is relevant to the certain user.

In one embodiment, the non-transitory computer-readable medium optionally stores program code for monitoring the users belonging to the different organization running the test scenarios on the software systems that belong to the different organizations and providing data obtained from the monitoring to be used for the identifying of the runs.

In one embodiment, the non-transitory computer-readable medium optionally stores program code for suggesting to the certain user to run an instantiation of the test scenario template representing the certain cluster of similar runs.

In one embodiment, the non-transitory computer-readable medium optionally stores program code for generating the test scenario template representing the certain cluster of similar runs based on one or more runs of test scenarios belonging to the certain cluster of similar runs.

Figure 7:
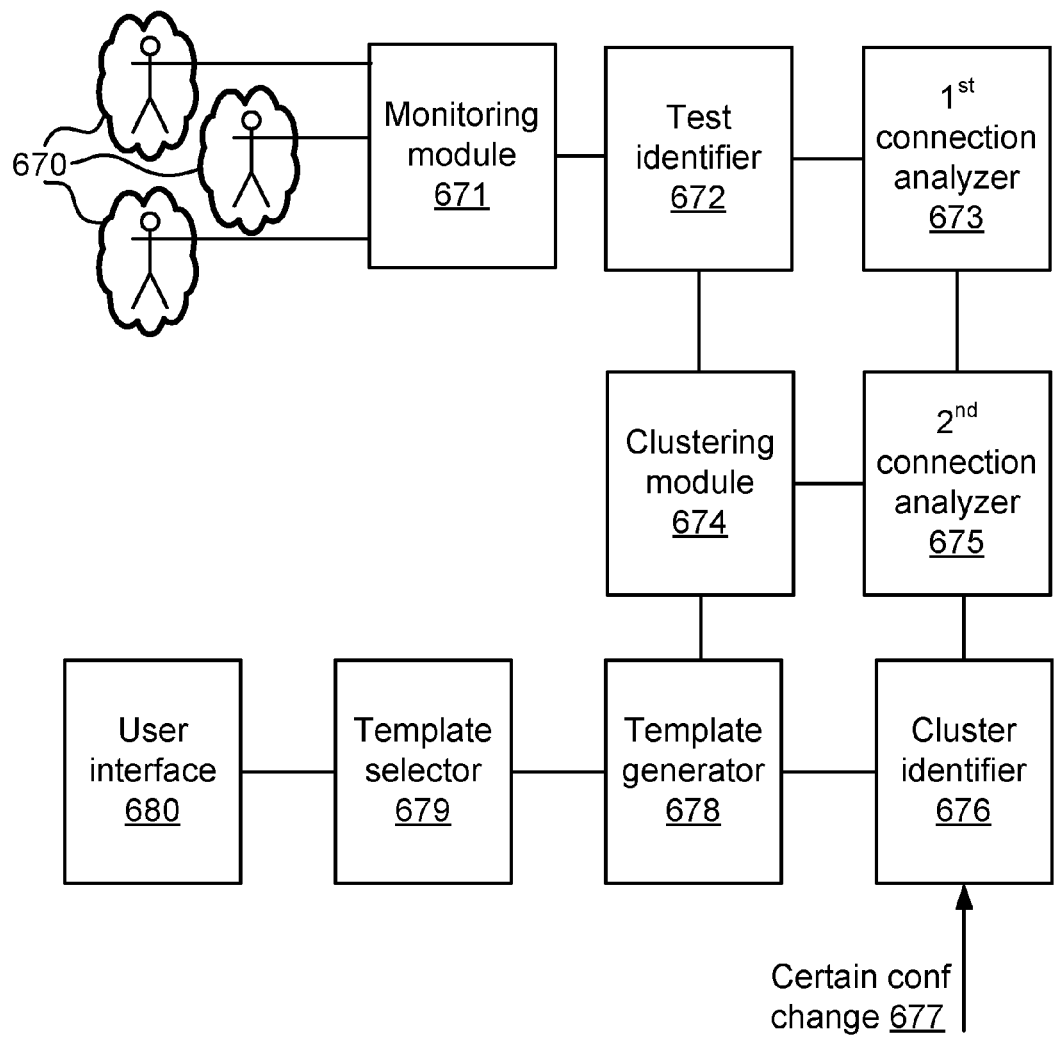
FIG. 7 illustrates one embodiment of a computer system configured select a test scenario template relevant for testing a configuration change.

FIG. 7 illustrates one embodiment of a computer system configured select a test scenario template relevant for testing a configuration change. The illustrated embodiment includes at least a test identifier 672, a first connection analyzer 673, a clustering module 674, a second connection analyzer 675, a cluster identifier 676, a template generator 678, and a template selector 679.

The test identifier 672 is configured to identify runs of test scenarios run by users that belonging to the different organizations and implementing configuration changes on software systems belonging to the different organizations. Optionally, running the test scenarios is useful for testing at least some of the configuration changes. In one example, many configuration elements may undergo a change of value as a result of configuration changes. To test the influence of the configuration changes, users may run test scenarios in order that test various aspects and/or behaviors of their software system in various conditions.

The first connection analyzer 673 is configured to identify first connections between the configuration changes and the runs. Optionally, a connection between a configuration change and a run of a test scenario indicates that running the test scenario may have been useful for testing the configuration change.

In one embodiment, the first connection analyzer 673 receives information indicating, for some of the configuration changes, which runs of test scenarios are related to the configuration changes. In one example, runs of test scenarios may include data fields indicating which configuration changes they are intended to test. Optionally, the data fields are added by a designer of the test scenario. In another example, the first connection analyzer 673 receives a table that lists identifiers of runs of test scenarios that were run to test each configuration change.

In another embodiment, the first connection analyzer 673 analyzes runs of test scenarios, and from the analysis the connection analyzer 673 is able to learn of one or more configuration changes that may have affected a system. For example, the runs may contain evidence indicating that the one or more configuration changes affected the system. Consequently, the one or more configuration changes may be connected, by first connections, to the runs in which they were found.

In one example, the first connection analyzer 673 utilizes text analysis of a run of a test scenario, such as analyzing code belonging to a test scenario being run, input provided for running the test scenario, and/or output files, such as log files, generated when running the test scenario. The text analysis searches for certain names and/or values that are part of configuration changes (e.g., file paths, business process names, and/or values associated with configuration elements). If such names and/or values are found, the corresponding configuration changes may be connected with the run of the test scenario with first connections.

In another example, the first connection analyzer 673 utilizes static analysis of code utilized for running a test scenario in order to identify one or more configuration changes that may be tested by running the test scenario. The static analysis may reveal if certain business processes, programs, and/or transactions are to be executed in various control flows of the code. If the certain business processes, programs, and/or transactions are linked to the one or more configuration changes, then the one or more configuration changes may be connected to runs of the test scenario with first connections. For example, a configuration change may indicate that a certain default transaction should be performed if updating a database fails. If static analysis reveals that a test scenario may perform the certain default transaction under certain conditions, a first connection may be made between the configuration change and a run of the test scenario.

In yet another example, the first connection analyzer 673 utilizes dynamic analysis performed while running a test scenario in order to identify one or more configuration changes that may be tested by running the test scenario. Optionally, the run of the test scenario includes data collected while the dynamic analysis was performed. Analyzing the dynamic analysis data may reveal which transactions, business processes, and/or system resources were involved in the run of the test scenario. If the transactions, business processes, and/or system resources correspond to specific configuration changes (e.g., identifiers of the transaction appear as values related to the specific configuration changes), then the specific configuration changes may be connected to the run of the test scenario via first connections.

In one embodiment, the first connection analyzer 673 receives indications regarding one or more configuration changes of interest at a given point of time. Operating under the assumption that runs of test scenarios that were run directly after the point of time (but within a predefined time frame such as a few hours) are done in order to test the one or more configuration changes, the first connection analyzer 673 may connect between the one or more configuration changes and the runs of the test scenarios with first connections.

The clustering module 674 is configured to cluster the runs of test scenarios identified by the test identifier 672 into clusters of similar runs of test scenarios (which are to be interpreted as clusters comprising similar runs of test scenarios). Optionally, the clustering is based on similarity between the runs of the test scenarios. Optionally, the clustering is based on similarity between configuration elements and/or configuration changes associated with the runs of the test scenarios. For example, the clustering may utilize similarities between configuration files of systems on which the test scenarios were run, in order to help determine a placement of runs into clusters.

The second connection generator 675 is configured to generate, based on the first connections, second connections between the configuration changes and the clusters of similar runs. For example, if a first connection exists between a certain configuration change and a certain run, and in addition, the certain run belongs to a certain cluster, then the second connection analyzer 675 may generate a second connection between the certain configuration change and the certain cluster.

In one embodiment, a second connection is made between a configuration change and a cluster, if there exists at least one first connection between the configuration change and a certain run, and certain run belongs to the cluster. Optionally, in order to generate a second connection between a configuration change and a cluster, the configuration change needs to be linked to the cluster via a number of different runs that reaches a threshold. Optionally, the threshold depends on the size of the cluster, e.g., the larger the size of the cluster, the higher the threshold.

The cluster identifier 676 is configured to receive a certain configuration change 677 of a certain user, and to identify a certain cluster of similar runs which correspond to the certain configuration change 677. The cluster identifier 676 identifies the certain cluster by comparing the certain configuration change 677 with configuration changes that take part in the second connections. Optionally, at least one of the second connections involves the certain cluster. Optionally, the certain configuration change 677 is related to a software system on which the certain user may run test scenarios. Optionally, the certain user is tasked with running a test scenario that is intended to test the certain configuration change 677. Optionally, the certain cluster of similar runs includes a first run associated with a first organization belonging to the different organizations and a second run associated with a second organization belonging to the different organizations. Additionally, the first organization is not the second organization.

In one embodiment, the certain cluster of similar runs corresponds to the certain configuration change 677 if there exists a second connection between the certain configuration change 677 and the certain cluster. Additionally or alternatively, the certain cluster may correspond to the certain configuration change 677 if there exists at least one first connection between the certain configuration change 677 and a run belonging to the certain cluster. Optionally, the certain cluster may correspond to the certain configuration change 677 if there exists at least a predetermined number of first connections between the certain configuration change 677 and one or more runs belonging to the certain cluster.

In another embodiment, the certain cluster of similar runs corresponds to the certain configuration change 677 if there exists a second connection between a configuration change similar to the certain configuration change 677 and the certain cluster. In one example, a configuration change may be considered similar to the certain configuration change 677 if both configuration changes involve the same configuration element, possibly with different values associated with the respective changes. In another example, a configuration change may be considered similar to the certain configuration change 677 if they are determined to be similar according to a similarity function which relies on similarities of text and/or values. In yet another example, a configuration change may be considered similar to the certain configuration change 677, if both would have been placed in a same cluster by a clustering algorithm that clusters configuration changes. Additionally or alternatively, the certain cluster may correspond to the certain configuration change 677 if there exists at least one first connection between a configuration change similar to the certain configuration change and a run belonging to the certain cluster. Optionally, the certain cluster may correspond to the certain configuration change 677 if there exists at least a predetermined number of first connections between one or more configuration changes similar to the certain configuration change 677 and one or more runs belonging to the certain cluster.

The template generator 678 is configured to generate test scenario templates based on runs belonging to the certain cluster. Optionally, the template generates one or more templates, where each template is generated from one or more runs belonging to the certain cluster.

The template selector 679 is configured to select, based on the number of different organizations associated with the templates, a representative test scenario template to represent the certain cluster. Optionally, an organization may be considered associated with a template if a run of a test scenario that was used to generate the template was run by a user belonging to the organization. Optionally, an organization may be associated with a template if a user belonging to the organization runs an instantiation of the template.

In one embodiment, the template selector 679 receives usage information that may indicate numbers of users and/or organizations that utilized templates representing the certain cluster. Based on the received usage information, the template selector 679 may be able to select a template known to be utilized by a large number of users and/or organizations. Optionally, the template selector 679 may receive a profile of the certain user and select an appropriate template based on the profile. For example, the template may include transactions indicated in the profile to be utilized by the certain user.

In one embodiment, the representative test scenario template is generated based on a first run associated with a first organization belonging to the different organizations and a second run associated with a second organization belonging to the different organizations. Additionally, the first organization is not the second organization. Optionally, the certain user does not belong to the first organization and does not belong to the second organization.

In one embodiment, selecting the representative test scenario template for the certain user is guided, at least in part, by impact of the certain configuration change 677 on runs of test scenarios belonging to the certain cluster. Optionally, impact of the certain configuration change 677 is determined, at least in part, according to its influence on an outcome of running test scenarios. For example, if the certain configuration change 677 alters the control flow of the execution of a run (e.g., causes different transactions to be executed), its impact may be considered to be high. In another example, a certain configuration change 677 may cause a system error, which may dramatically change the outcome of a run; in this case too, the impact of the certain configuration change 677 may be considered to be high. In another example, the certain configuration change 677 does not alter the control flow of the execution of a test scenario; in this case, the impact of the certain configuration change on 677 may be considered low. Optionally, the impact of the certain configuration change 677 may be determined by static analysis of test scenarios and/or runs of test scenarios that belong to the certain cluster. For example, static analysis may help determine if there are transactions in the test scenarios that depend on a configuration element involved in the certain configuration change 677 and/or the extent of the dependence. Optionally, the impact may be determined by dynamic analysis of runs of the test scenarios belonging to the certain cluster. For example, the control flow and/or data flow of the runs may be examined to generate a list of system components, transactions, and/or programs that are involved in each run; by comparing the list with the certain configuration change 677, it may be determined which runs are impacted by the certain configuration change 677.

In one embodiment, the template selector 679 may be also configured to provide the certain user an indication of the number of users belonging to the different who ran instantiations of the representative test scenario template; the more users belonging to different organizations that run instantiations of the representative test scenario template, the higher the likelihood that the representative test scenario template is relevant for the certain user. Additionally or alternatively, the template selector 679 may be also configured to provide the certain user an indication of the number of different organizations associated with the representative test scenario template; the more organizations associated with the representative test scenario template, the higher the likelihood that the representative test scenario template is relevant for the certain user. Optionally, indications regarding the number of users that ran instantiations of the representative test scenario template and/or indications of the number of organizations associated with the representative test scenario template are given via the user interface 680.

In another embodiment, the template selector 679 is optionally configured to rank the representative test scenario template in proportion to the number of organizations associated with it. For example, the higher the number of organizations associated with the representative test scenario template, the higher the representative test scenario template is ranked. Ranking the representative test scenario template may involve assigning the representative template a score and/or positioning the representative template in a certain ordering of templates.

In one embodiment, the computer system includes an optional monitoring module 671 that is configured to monitor the users 670 belonging to the different organization, running the test scenarios on the software systems that belong to the different organizations, and to provide data obtained from the monitoring to the test identifier 672.

In another embodiment, the computer system includes an optional user interface 680 configured to suggest to the certain user to run an instantiation of the representative test scenario template.

In one embodiment, the certain configuration change 677 is associated with a certain software system (e.g., the certain configuration change 677 affects the certain software system). Optionally, the certain software system is associated with an organization that is not one of the different organizations. In one example, the certain software system is a SAP ERP, configurations involve database tables, and configuration changes may involve changes to entries in database tables. Monitoring the users involves monitoring executed transactions (e.g., queries and returned values). The second connections are connections between database tables and clusters of runs of test scenarios that include SQL statements which access the database tables. In another example, the certain software system is an Oracle ERP, configurations are customization code, and configuration changes may involve changes to customization code. Monitoring the users involves monitoring executed procedures. The connections are between clusters of customization code and clusters of runs of test scenarios that execute the customization code.

It is to be noted that different embodiments may implement components of the computer system illustrated in FIG. 7 in different ways. For example, in some embodiments one or more of the following may be implemented by the same software module and/or software modules running on the same processor: the monitoring module 671, the test identifier 672, the clustering module 674, the first connection analyzer 673, the second connection analyzer 675, the cluster identifier 676, the template generator 678, and the template selector 679. Optionally, one or more of the aforementioned components may be implemented, at least in part, on a remote server, such as a cloud-based server.

In one example, the first connection analyzer 673 and the test identifier 672 utilize some of the same software modules and/or are realized by the same software components. In another example, the second connection analyzer 675 is implemented at least in part by the cluster identifier 676 and/or the clustering module 674. In another example, the template selector 679 and the template generator 678 are implemented, at least in part, by the same software module.

Figure 8:
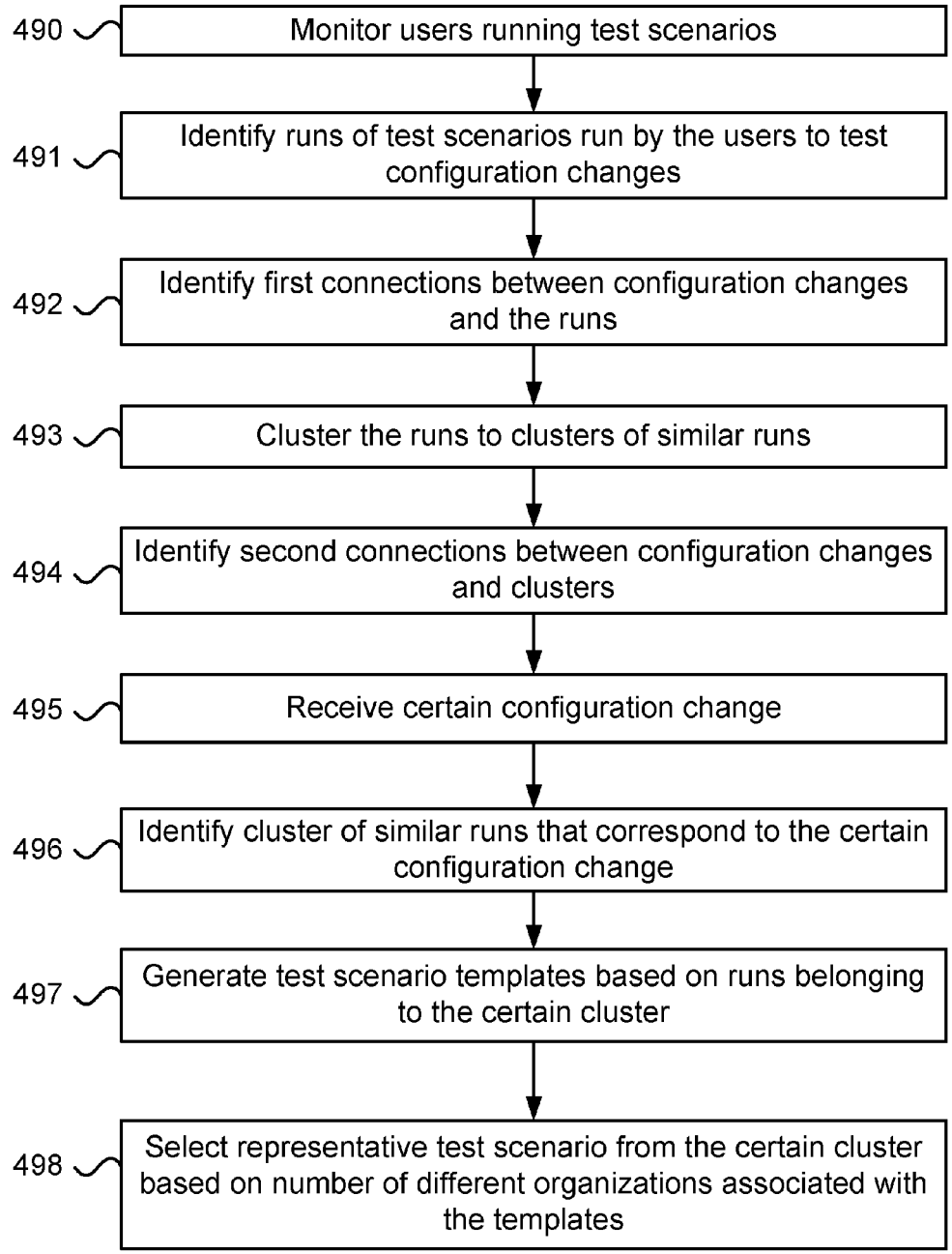
FIG. 8 illustrates one embodiment of a computer implemented method for selecting a test scenario template useful for testing a configuration change.

FIG. 8 illustrates one embodiment of a computer implemented method for selecting a test scenario template useful for testing a configuration change. The illustrated embodiment includes the following steps:

In step 491, identifying runs of test scenarios run by users belonging to different organizations. The users are implementing configuration changes on software systems belonging to the different organizations. Running the test scenarios may be useful for testing at least some of the configuration changes being implemented. For example, running a test scenario on a software system may assist in determining the impact of a configuration change on the software system. Optionally, the impact may indicate whether the configuration change alters a control flow of the test scenario and/or whether an outcome of running the test scenario changes due to implementing the configuration change.

In step 492, identifying first connections between configuration changes and the runs. Optionally, there may be a configuration change that has more than one first connection between the configuration change and one or more runs. Optionally, there may be a configuration change with no first connection between the configuration change and a run.

In step 493, clustering the runs into clusters of similar runs. Optionally, the clustering is done at least in part, according to configuration elements associated with the runs and/or configuration changes associated with the runs. Optionally, the clustering is done, at least in part, based on data included in the runs. Herein, by stating that the clustering is done "at least in part" according to a certain factor, it may mean that similarity of runs is determined in part according to the certain factor. For example, a similarity function used to compute similarity between runs may make its computations according to several factors, of which the certain factor is one.

In step 494, identifying, from the first connections and the clustering (e.g., assignments of runs to clusters), second connections between configuration changes and the clusters. Optionally, a second connection is identified between a configuration change and a cluster if there is at least one first connection between the configuration change and a run belonging to the cluster. Optionally, a second connection is identified between a configuration change and a cluster if there at least a predetermined number of first connections between the configuration change and runs belonging to the cluster. Optionally, a second connection is identified between a configuration change and a cluster if first connections between the configuration change and run belong to the cluster are associated with at least a predetermined number of organizations. A first connection between a configuration change and a run may be considered associated with an organization if a user belonging to the organization ran the run. Optionally, identifying the second connections involves storing the second connections for future used. For example, storing the second connections may involve storing linking information that may link between the at least some of the configuration changes and at least some of the clusters.

In step 495, receiving a certain configuration change of a certain user. Optionally, the certain user belongs to a certain organization that is not one of the different organizations. Optionally, the certain configuration change is to be performed on a software system belonging to the certain organization. Additionally, the certain organization is not one of the different organizations.

In step 496, identifying a certain cluster of similar runs which correspond to the certain configuration change by comparing the certain configuration change with configuration changes that take part in the second connections. A configuration change is considered to take part in a second connection if the second connection is between the configuration change and a cluster of similar runs. Optionally, the certain cluster corresponds to the certain configuration change if there is a second connection between the certain configuration change and the certain cluster. Optionally, the certain cluster corresponds to the certain configuration change if there is a second connection between a configuration change, which is similar to the certain configuration change, and the certain cluster. Optionally, the certain cluster of similar runs includes a first run associated with a first organization belonging to the different organizations and a second run associated with a second organization belonging to the different organizations. In addition, the first organization is not the second organization.

In step 497, generating test scenario templates based on runs of test scenarios belonging to the certain cluster. Optionally, the templates identify transactions executed while running the test scenarios and/or possible values that may be used to execute the transactions.

And in step 498, selecting, based on number of different organizations associated with the templates, a representative test scenario template to represent the certain cluster.

In one embodiment, the representative test scenario is a template is selected such that, from among the templates that may represent the certain cluster, it is associated with a highest number of organizations. That is, there is no other template among the templates that is associated with more organizations than the number of organizations the representative template is associated with.

In another embodiment, selecting the representative test scenario template is done, at least in part, according to the number of users that ran test scenarios belonging to the certain cluster. For example, the representative template is a template with a highest number of different users that ran instantiations of the template. That is, there is no other template with a number of users that ran its instantiations that is larger than the number of users that ran instantiations of the representative template. In another example, the representative template is a template which was generated from runs of test scenarios run by a largest number of users. That is, there is no other template generated by runs, belonging to the certain cluster, which were run by more users that the number of users that ran the runs from which the representative template was generated.

In one embodiment, the computer implemented method illustrated in FIG. 8 may include optional step 490 which involves monitoring the users running the test scenarios on the software systems that belong to the different organizations and providing data obtained from the monitoring to be used for the identifying of the runs.

In one embodiment, the computer implemented method illustrated in FIG. 8 may include an optional step of suggesting to the certain user to run an instantiation of the representative test scenario template. For example, suggesting may done via the user interface 680.

In one embodiment, the computer implemented method illustrated in FIG. 8 may include an optional step of providing the certain user an indication of number of users belonging to different organizations who ran instantiations of the representative test scenario template; the more users belonging to different organizations that run instantiations of the representative test scenario template, the higher the likelihood that the representative test scenario template is relevant for the certain user. Alternatively or additionally, the computer implemented method illustrated in FIG. 8 may include an optional step of providing the certain user an indication of number of different organizations associated with the representative test scenario template; the more organizations associated with the representative test scenario template, the higher the likelihood that the representative test scenario template is relevant for the certain user.

In one embodiment, the certain cluster is a cluster with a number of second connections with the certain configuration change that is maximal; i.e., there is no other cluster for which the number of second connections between the certain configuration change and the other cluster is larger. Alternatively or additionally, the certain cluster may be a cluster with a number of second connections with a configuration change similar to the certain configuration change that is maximal; i.e., there is no other cluster for which the number of second connections between a configuration change similar to the certain configuration change and the other cluster is larger.

In another embodiment, the certain cluster is a cluster, from among clusters that have at least one second connection between the certain configuration change and them, which is associated with the most organizations. That is, there is no other cluster for which there is a second connection between the certain configuration change and the other cluster, and other cluster contain runs associated with more organizations than the number of organizations associated with runs included in the certain cluster. Alternatively or additionally, the certain cluster may be a cluster, selected from among clusters that have at least one second connection between the configuration change similar to the certain configuration change and them, which is associated with the most organizations. That is, there is no other cluster for which there is a second connection between a configuration change similar to the certain configuration change and the other cluster, and other cluster contain runs associated with more organizations than the number of organizations associated with runs included in the certain cluster.

In one embodiment, the computer implemented method illustrated in FIG. 8 may include an optional step of receiving information related to impact of the certain configuration change on runs of test scenarios belonging to the certain cluster and selecting, based on the information related to the impact, the representative test scenario template. For example, the representative test scenario template that is selected is a template impacted the highest by the certain configuration change, from among the templates that represent the certain cluster.

In another embodiment, the computer implemented method illustrated in FIG. 8 may include an optional step of ranking the representative test scenario template in proportion to the number of different organizations associated with the representative test scenario template.

In yet another embodiment, the computer implemented method illustrated in FIG. 8 may include an optional step of marking a configuration change that does not have a second connection as missing a test scenario template.

In one embodiment, a non-transitory computer-readable medium stores program code that may be used by a computer to select a test scenario template useful for testing a configuration change. The computer includes a processor, and the non-transitory computer-readable medium stores the following program code:

Program code for identifying runs of test scenarios run by users belonging to the different organizations implementing configuration changes on software systems belonging to the different organizations. Optionally, running the test scenarios is useful for testing at least some of the configuration changes.

Program code for identifying first connections between configuration changes and the runs.

Program code for clustering the runs into clusters of similar runs.

Program code for identifying, from the first connections and the clustering, second connections between configuration changes and the clusters.

Program code for receiving a certain configuration change of a certain user.

Program code for identifying a certain cluster of similar runs which correspond to the certain configuration change by comparing the certain configuration change with configuration changes that take part in the second connections. Optionally, the certain cluster of similar runs includes a first run associated with a first organization belonging to the different organizations and a second run associated with a second organization belonging to the different organizations. In addition, the first organization is not the second organization.

Program code for generating test scenario templates based on runs belonging to the certain cluster.

And program code for selecting, based on number of different organizations associated with the templates, a representative test scenario template to represent the certain cluster. Optionally, the representative test scenario template is a test scenario template that is associated with the highest number of different organizations.

In one embodiment, the non-transitory computer-readable medium optionally stores program code for selecting the representative test scenario template according to the number of users that run test scenarios belonging to the certain cluster.

In another embodiment, the non-transitory computer-readable medium optionally stores program code for monitoring the users belonging to the different organization running the test scenarios on the software systems that belong to the different organizations and providing data obtained from the monitoring to be used for the identifying of the runs.

In still another embodiment, the non-transitory computer-readable medium optionally stores program code for suggesting to the certain user to run an instantiation of the representative test scenario template representing the certain cluster of similar runs.

In yet another embodiment, the non-transitory computer-readable medium optionally stores program code for providing the certain user an indication of number of users belonging to different organizations who ran instantiations of the representative test scenario template; the more users belonging to different organizations that run instantiations of the representative test scenario template, the higher the likelihood that the representative test scenario template is relevant for the certain user. Additionally or alternatively, the non-transitory computer-readable medium may optionally store program code for providing the certain user an indication of number of different organizations associated with the representative test scenario template; the more organizations associated with the representative test scenario template, the higher the likelihood that the representative test scenario template is relevant for the certain user.

Code Elements

Software systems on which user may run test scenarios often involve large amounts of computer code (e.g., one SAP ERP code base includes about 60,000 compilation units which are linked together into approximately 9,000 programs). It is therefore often required to be able to relate to certain portions of the code (e.g., a portion of code may be one or more lines of code). Herein, a portion of code that may be utilized by a software system is referred to as a code element.

In some embodiments, code elements may be identified by at least one of the following: procedures without specific invocations, classes without specific invocations, database triggers, stored procedures, screens, and/or tables in a database.

In one example, a database trigger is procedural code that is automatically executed in response to certain events on a particular table or view in a database. For example, when a new record (representing a new worker) is added to the employees table, new records should also be created in the tables of the taxes, vacations and salaries. In this example, the new records are created via a database trigger associated with the employee table that caused the automatic creation of the new records in the tables of the taxes, vacations and salaries.

In one example, code elements may include stored procedures. Optionally stored procedures may include code executed by the procedures and/or data related to invocations of the stored procedures, such as locations in the code where the stored procedures are to be invoked and/or values involved in the invocation.

In another example, code elements may include screens, such as data that describes screens presented to a user. The description of screens may include fields presented on the screens, values corresponding to fields, logic executed by interacting with screens (e.g., logic that is executed when a button is pressed), order of presentation of screens, and/or logic that controls presentation of screens to the user.

In yet another example, code elements may include tables in a database, such as data that describes the tables. The description may include column names and/or column types, values in the tables, and/or actions that may be applied to the tables (e.g., statements that operate on the tables).

In one embodiment, the code elements may be delimited by scope. For example, a code element encompasses a certain function, procedure, screen, database table, or program. Alternatively, the code elements may be delimited by size. Thus, for example, code corresponding to a certain transaction may be partitioned into several code elements corresponding to the various functions, procedures, or programs.

In another embodiment, each of the code elements may include code with similar functionality. For example, a certain transaction may have code that includes code with different functionalities, such as handling user input and output (e.g., code corresponding to a screen), code for querying a database, and code for processing information retrieved from the database. The code of the certain transaction may be partitioned into several code elements based on the functionality of the elements; therefore, the code that handles the user input and output may be divided to one or more code elements. Similarly, the code for querying the database may be placed in one or more additional code elements, and the code for processing the retrieved information may be placed in other code elements.

Figure 9:
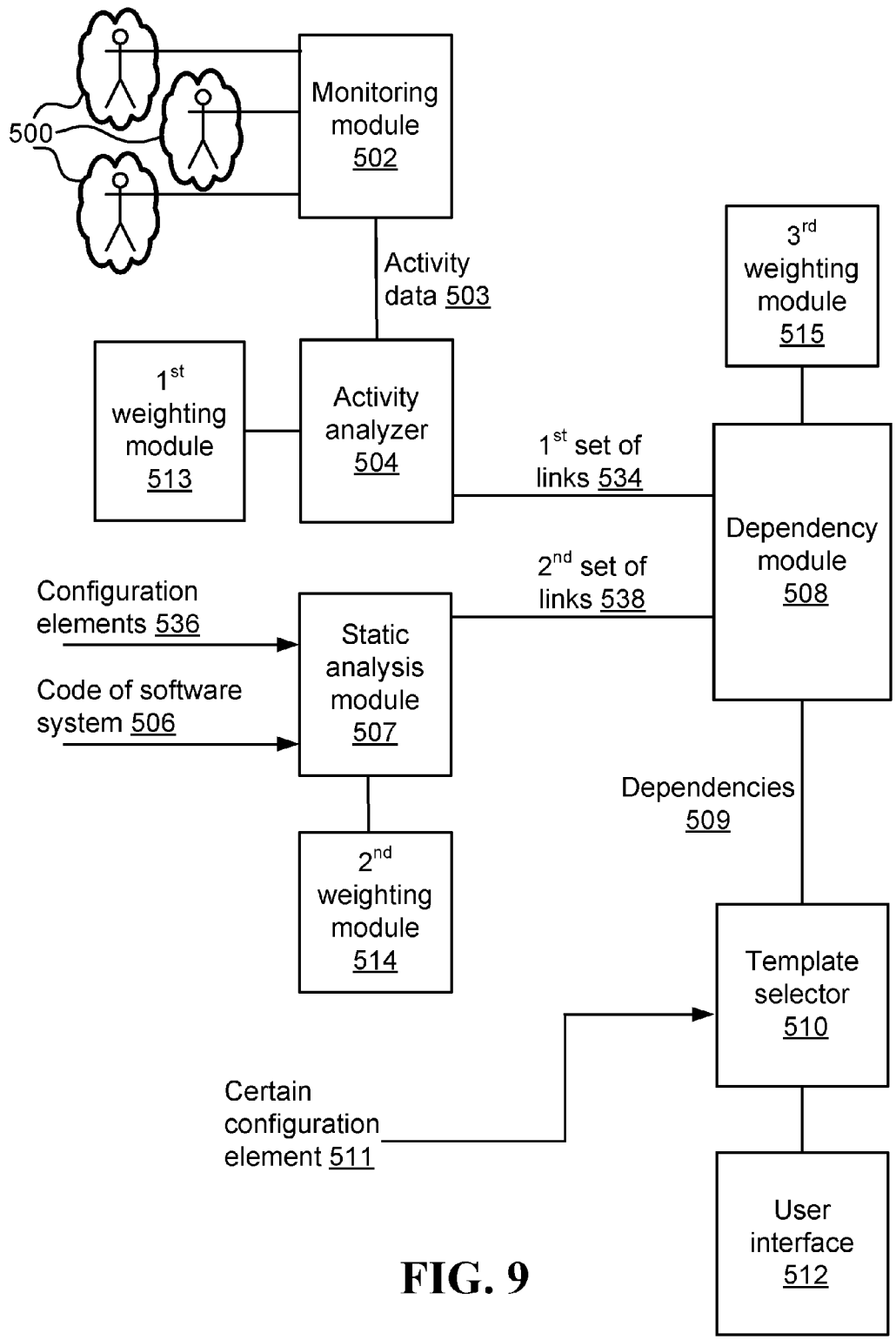
FIG. 9 illustrates one embodiment of a computer system configured to identify dependencies between configuration elements and transactions.
Figure 10:
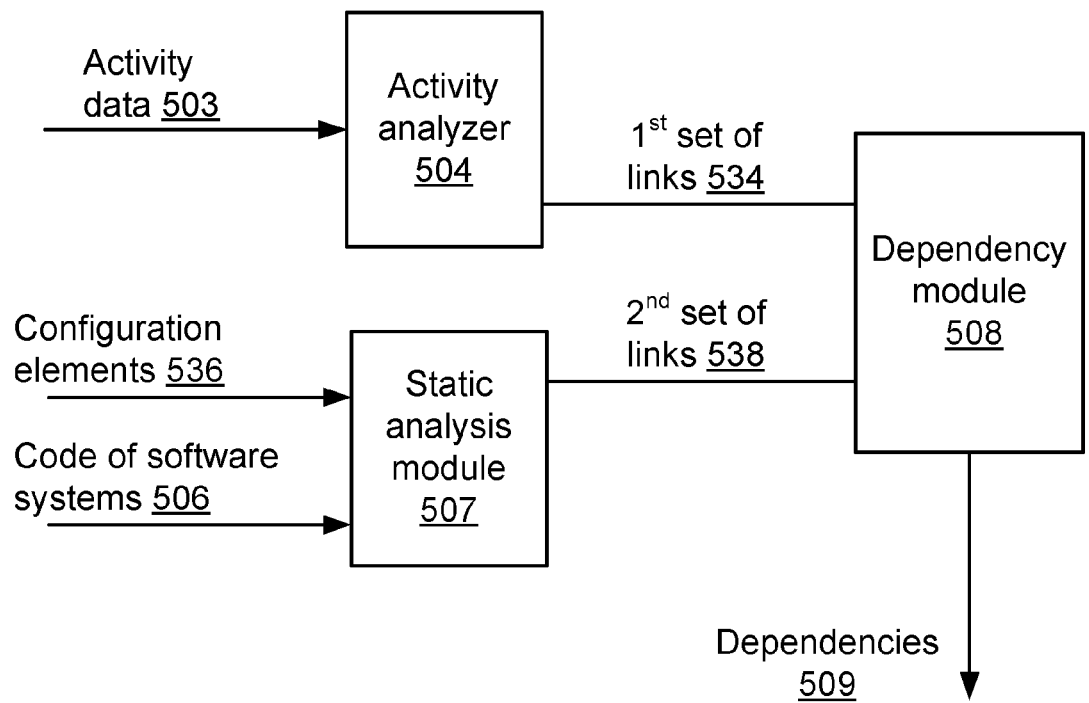
FIG. 10 illustrates one embodiment of a computer system configured to identify dependencies between configuration elements and transactions.

FIG. 9 and FIG. 10 illustrate embodiments of a computer system configured to identify dependencies between configuration elements and transactions. The illustrated embodiments include at least an activity analyzer 504, a static analysis module 507, and a dependency module 508.

The activity analyzer 504 is configured receive activity data 503 obtained by monitoring activity of users belonging to different organizations. Optionally, the activity of the users involves operating software systems associated with the different organizations. In one example, at least some of the activity data 503 may be related to running of test scenarios on the software systems by the users, e.g., the activity data may include run of test scenarios.

In one embodiment, the software systems enable identification of at least some of the transactions executed on the software systems. For example, a log-keeping procedure of a software system may record identifying information regarding transactions performed by a user on the software system. Additionally, at least some of the configuration elements related to the system are identifiable. For example, at least some of the configuration elements are accessible to a user via a menu and/or configuration file in which the presence of certain configuration elements, and/or associated values of the configuration elements, may be determined. Additionally, as explained below, at least some of the configuration elements may be connected to at least some of the transactions via code elements. For example, a certain code element may be linked both to a certain transaction and to a certain configuration element, thus connecting between the certain transaction and the certain configuration element.

The activity analyzer 504 is also configured to generate, based on the activity data 503, a first set of links between the transactions and code elements associated with the transactions; each link in the first set, between a certain transaction and one or more code elements, is based on activity data obtained from at least two different organizations. For example, at least two users from two different organizations were monitored while executing the one or more code elements associated with the certain transaction.

In one embodiment, the activity data 503 includes a list of business processes and/or transactions executed by the users. In one example, the business process and/or transactions may be identified according to their names, identifier codes, and/or descriptions (e.g., a list of fields in a screen involved in a transaction). In another example, the activity data may indicate that a certain group of transactions was executed; e.g., by mentioning that a certain protocol was tested (e.g., adding and removing an employee), it may be inferred that all the transactions involved in the protocol were executed. Optionally, the activity data 503 may include indications of code executed by the users. For example, the indications may be in the form of names of programs, portions of code, hash values of code, and/or outputs that are typically generated by certain code (and thus may indicate that the certain code was executed). Optionally, the activity data 503 includes data that enables synchronization. For example, the activity data may include time stamps and/or program counters (indicating a position in code).

Based on the activity data 503, the activity analyzer 504 can pair between transaction executed by a user at a certain time and corresponding code executed at the time. In one example, the activity data 503 indicates a certain transaction by name that was executed by a user. The activity analyzer 503 receives (as part of the activity data 503 and/or from another source) code corresponding to the certain transaction, and is thus able to form a link between the certain transaction and the code of the certain transaction. Optionally, a single link is formed between the certain transaction and the code of the certain transaction. Alternatively, multiple links may be formed, such as multiple links formed between the certain transaction and various portions of the code of the certain transaction.

In one embodiment, the code elements include data of at least one of the following types: procedures without specific invocations, classes without specific invocations, database triggers, stored procedures, screens, and tables in a database.

The static analysis module 507 is configured to receive the configuration elements 536 and code of a software system 506 which includes code that corresponds to at least one of the following: procedure invocations, user interface statements, and database access statements. Optionally, the code 506 includes statements written in a programming language that define a set of syntactical elements that are analyzed by static analysis tools.

In one embodiment, procedure invocation may include any call to a function, procedure and/or program by a calling program. Optionally, the procedure invocation may include an invocation statement that includes information such as the name of the procedure and/or arguments provided for an invocation of the procedure (e.g., values placed on a stack in memory, to be utilized by the procedure). Additionally or alternatively, the procedure invocation may include code corresponding to the procedure, such as code to be executed by the invoked procedure.

In one embodiment, user interface statements may include any commands and/or programs that result in retrieval, generation, and/or presentation of data to a user via a user interface. Additionally or alternatively, user interface statements may include any commands and/or programs that result in receiving, recording and/or processing of data provided by a user to a system via a user interface. Additionally or alternatively, user interface statements may include data provided by a user to a system via the user interface and/or any data provided by a system to a user via the user interface. Optionally, the user interface may include one or more apparatuses that may receive information from a user, such as a keyboard, touch screen, mouse, microphone, motion tracking apparatus, and/or eye tracking apparatus. Additionally or alternatively, the user interface may include one or more apparatuses that may provide information to a user, such as a screen, an augmented and/or virtual reality display, a speaker, a printer, and/or a haptic feedback device.

In one embodiment, database access statements may include commands and/or programs that result in reading data from a database, writing data to a database, and/or modifying data in a database. Additionally or alternatively, database access statements may include commands and/or programs that change attributes of a database, such as altering columns in a database and/or changing access permissions to certain data in a database. In one example, database access statements may include SQL statements that operate on one or more tables in a database. In another example, database access statements may include CGI scripts that cause a system to retrieve data from a database.

The static analysis module 507 is also configured to generate, based on static analysis of the code 506, a second set of links between 538 the configuration elements 536 and code elements from the code of the software system 506, which are influenced by the configuration elements 536. Optionally, the static analysis module 507 may receive code of multiple software systems and perform static analysis on the code of the multiple software systems in addition to, or as part of, static analysis of the code 506.

There are several approaches that may be utilized by one skilled in the art for performing static analysis in order to identify the links between the configuration elements and code elements influenced by the configuration elements. In one embodiment, data flow analysis is used to detect certain code elements that may be affected by certain configuration elements and/or involve certain configuration elements. For example, if according to the data flow analysis it is determined that a value of a configuration element may be utilized at some point, or under certain conditions, by a code element, the static analysis module 507 may determine that the configuration element influences the code element. Accordingly, a link may be formed by the static analysis module 507 between the code element and the configuration element. In another embodiment, control flow analysis may be utilized to detect certain code elements that may be affected by certain configuration elements. For example, flow analysis of code may reveal that access to a configuration element, and/or a value of the configuration element, may affect the program in certain ways, such as causing certain statements to be executed. Thus, the static analysis module 507 may determine, based on the flow analysis, that the configuration element influences the code corresponding to the certain statements. Based on that determination, the static analysis module 507 may generate links between code elements corresponding to the certain statements and the configuration element.

In some embodiments, the number of configuration elements received by the static analysis module 507 may be very large and/or the code of the software system 506 may be quite extensive. Performing static analysis of the entire body of code 506 with respect to all the configuration elements may be prohibitive. Therefore, in some cases, the static analysis module 507 may perform analysis primarily of a subset of the code 506 and/or consider a subset of the configuration elements. For example, analysis effort may primarily focus on the subset of code and/or the subset of the configuration elements.

In one example, the configuration elements include one or more elements with associated values that have changed. Optionally, determining which elements have associated values that have changed may be done by comparing a current version of configuration elements (e.g., a configuration file) with a previous version of the configuration elements. Optionally, the static analysis module 507 may direct a relatively larger portion of the analysis effort towards elements whose associated value has changed, compared to analysis effort devoted to other configuration elements. Optionally, based on determining which elements have associated values that have changed, the static analysis module 507 can determine which subsets of the code 506 are likely to be affected by the elements with associated values that have changed, and perform its analysis primarily on those subsets of code.

In another example, the static analysis module 507 receives a certain field of operation of a certain organization (e.g., the field of operation may be banking or automotive industry). Based on the field of operation, the static analysis module 507 may determine a subset of the configuration elements that are typically used by organizations that are in the same field of operation. Alternatively or additionally, the static analysis module 507 may determine subsets of the code 506 that are typically utilized by organization in the field of operation. The static analysis module 507 may then focus analysis efforts more on the subset of elements and/or subsets of code.

The dependency module 508 is configured to utilize the first set of links 534 and the second set of links 538 to identify dependencies 509 between the transactions and the configuration elements. Optionally, the dependency module 508 is configured to identify a dependency between a certain transaction and a certain configuration element by identifying a certain code element that is common both to a link from the second set, between the certain configuration element and the certain code element, and a link from the first set, between the certain code element and the certain transaction.

Figure 12:
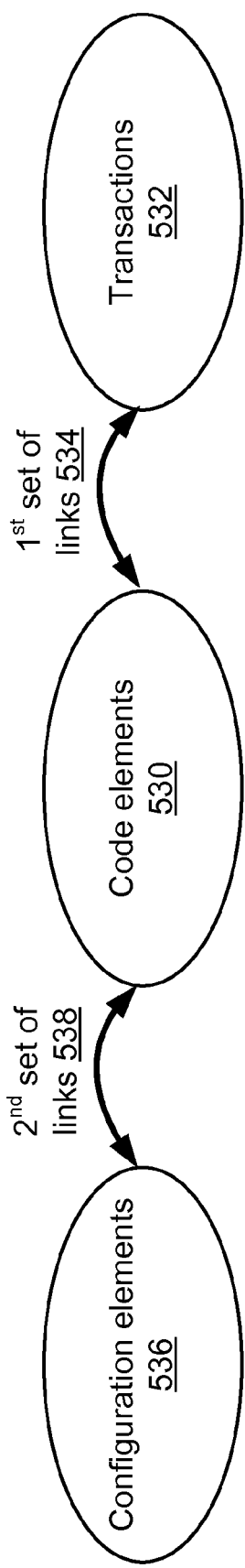
FIG. 12 illustrates one way of forming dependencies between transactions and configuration elements.

FIG. 12 provides a schematic illustration of one way for forming the dependencies between the transactions 532 and the configuration elements 536. In one embodiment, a dependency between a certain transaction and a certain configuration element relies on chaining links involving the second set of links 538 and the first set of links 534. There needs to be at least one link from the second set 538 between a certain configuration element, from among the configuration elements 536, and a certain code element, from among the code elements 530. Additionally, there needs to be at least one link from the first set of links 534 between the certain code element and a certain transaction from the transactions 532. If both links exist, then a dependency between the certain transaction and the certain configuration element may be formed.

In one embodiment, the software systems belonging to the different organizations are SAP ERP system. Optionally, configurations involve database tables, and configuration elements may involve entries and/or attributes in database tables. Monitoring the users involves monitoring of the transactions and indicating which code elements are executed. The second set of links may include links between code elements and SQL statements which access the database tables.

In another embodiment, the software systems belonging to the different organizations are Oracle ERP systems. Optionally, configurations involve customization code. Monitoring the users involves monitoring executed procedures. The second set of links may include links between the executed procedures and the calls to the customization code.

In still another embodiment, the software systems belonging to the different organizations run Java Virtual Machines (JVM). The JVMs enable associations at run-time between Java code and transactions executed on the systems.

In one embodiment, the computer system optionally includes a monitoring module 502 configured to monitor the activity of the users 500 belonging to the different organizations and to provide the activity data 503 to the activity analyzer 504.

In one embodiment, the computer system optionally includes a template selector 510. The template selector 510 is configured to receive a certain configuration element 511 and to select a test scenario template suitable for testing a transaction that is dependent on the certain configuration element 511. Optionally, the certain configuration element 511 relates to a software system belonging to a different organization than one or more organization to which belongs the software system related to the code 506.

The selection by the template selector 510 may be based on the dependencies 509 generated by the dependency module 508. For example, the template that is selected is one that includes a transaction, which according to a dependency described in the dependencies 509 is dependent on the certain configuration element 511. Optionally, the template selector 510 is configured to select the test scenario template based on weight of dependencies. For example, the template that is selected is one that includes a transaction, which according to a dependency described in the dependencies 509 is dependent on the certain configuration element 511, and additionally has the highest weight among dependencies between the certain configuration element 511 and transactions. Additionally, the computer system may include an optional user interface 512 that is configured to suggest to a user to run an instantiation of the test scenario template.

In one embodiment, the template selector 510 selects the test scenario template suitable for testing a transaction that is dependent on the certain configuration element 511 from among templates generated from the activity data 503. Optionally, the templates are generated from runs of test scenarios identified from the activity data 503. Optionally, the runs are clustered into clusters of similar runs, and each template is generated from one or more runs belonging to a same cluster. Optionally, the selection of the template at least in part on the number of different users and/or different organizations associated with runs belonging to the clusters.

In one embodiment, the configuration elements include an element whose value has changed, and the dependency module 508 is configured to identify dependencies between at least one of the transactions and the element whose value has changed. Optionally, the static analysis module 507 determines a change in the behavior of the software system as a result of change of value of the element whose value has changed. For example, the static analysis module 507 may determine if different values of the element may lead to different expected control flows for a program and/or to a different expected data flows for the program. Thus, the static analysis module 507 may determine which code elements are impacted by the configuration element whose value has changed.

In one embodiment, the computer system optionally includes a first weighting module 513 that is configured to weight a link from the first set 534, between a code element and a transaction, according to the number of different organizations associated with the link. An organization may be considered associated with a link between a transaction and a code element, if a user belonging to the organization executed the transaction and during execution of the transaction the code element was executed on a system belonging to the organization. Optionally, the larger the number of organizations associated with a link, the higher the weight of the link when used to identify dependencies between transactions and configuration elements. Optionally, the first weighting module 513 may be implemented as part of the activity analyzer 504, e.g., the weighting module 513 is a software module that is part of the software modules that the activity analyzer 504 utilizes. Additionally or alternatively, the first weighting module 513 may operate on the first set of links 534 generated by the activity analyzer 504. For example, the first weighting module 513 assigns a weight to at least some of the links, while other links may have a default weight. Optionally, the first set of links 534 may be filtered according weights assigned by the first weighting module 513. For example, links that have a weight below a predetermined threshold are not considered by the dependency module 508. A large number of organizations associated with a link may indicate that the link is one that is likely to be true for other organizations (e.g., they are also likely have users that run the same transaction and execute the same code element).

In one embodiment, the first weighting module 513 is configured to weight a link from the first set of links 534, between a code element and a transaction, according to the number of users monitored while having an interaction with the code element that is part of the transaction. Optionally, the larger the number of users having the interaction with the code element, the higher the weight of the link when used to identify dependencies between transactions and configuration elements. A large number of users having an interaction with the code element that is part of the transaction may indicate that other users are also likely to interact with the same code element as part of their executing the transaction.

In one embodiment, the computer system optionally includes a second weighting module 514 that is configured to weight a link from the second set 538, between a configuration element and a code element. Optionally, the link is weighted according to the number of different organizations associated with the link. In this embodiment, an organization may be considered associated with a link between a configuration element and a code element, if a system belonging to the organization is both configured according to the configuration element and executes the code element. For example, the configuration element may be taken from a configuration file belonging to the organization. Additionally, the code element may be taken from the code base of the organization, such as code of a certain software system used by the organization. Optionally, the larger the number of organizations associated with a link, the higher the weight of the link when used to identify dependencies between transactions and configuration elements. A large number of organizations associated with a link may indicate that the link is one that is likely to be true for other organizations (e.g., they are likely to run the same code element involved in the link and/or apply the same configuration element involved in the link). Optionally, the second weighting module 514 may be implemented as part of the static analysis module 507, e.g., the second weighting module 514 is a software module that is part of the software modules that the static analysis module 507 utilizes. Additionally or alternatively, the second weighting module 514 may operate on the second links generated by the static analysis module 507. For example, the second weighting module 514 assigns a weight to at least some of the links, while other links may have a default weight. Optionally, the second links may be filtered according weights assigned by the second weighting module 514. For example, links that have a weight below a predetermined threshold are not considered by the dependency module 508.

In one embodiment, the computer system optionally includes a third weighting module 515 that is configured to weight at least some of the dependencies 509 identified by the dependency module 508. In one example, a dependency between a transaction and a configuration element is to be weighted. The dependency is based on a first link from the first set between the configuration element and a code element, and on a second link from the second set between the code element and the transaction. Optionally, the weight of the dependency may be assigned according to at least one of weight of the first link (e.g., as assigned by the first weighting module 513) and weight of the second link (e.g., as assigned by the second weighting module 514). Optionally, if the first link is missing a weight it is assigned a default weight. Similarly, if the first link is missing a weight it is assigned a default weight. Optionally, the weight assigned to the dependency is a function of the weight of the first link and the weight of the second link. For example, the weight of the dependency is the sum of the weights of the first link and the weight of the second link. In another example, the weight of the dependency is the maximum of the weights of the first link and the weight of the second link. Optionally, the third weighting module 515 may be implemented as part of the dependency module 508, e.g., the third weighting module 515 is a software module that is part of the software modules that the dependency module 508 utilizes. Additionally or alternatively, the third weighting module 515 may operate on the dependencies 509 generated by the dependency module 508.

In one embodiment, a business process includes at least two transactions, and the activity analyzer is configured to generate, based on the activity data 503, a first set of links between business processes and code elements associated with the business processes. Additionally, dependencies identified by the dependency module may be between business processes and the configuration elements.

It is to be noted that different embodiments may implement components of the computer systems illustrated in FIG. 9 and FIG. 10 in different ways. For example, in some embodiments one or more of the following may be implemented by the same software module and/or software modules running on the same processor: the activity analyzer 504, the static analysis module 507, and the dependency module 508. Optionally, one or more of the aforementioned components may be implemented on a remote server, such as a cloud-based server. Optionally, the cloud-based service suggests test scenario templates suitable for users to test certain configuration elements. Optionally, the monitoring module 502 and the template selector 510 are also realized, at least in part, by modules of the cloud-based service that run on cloud-based servers.

Figure 11:
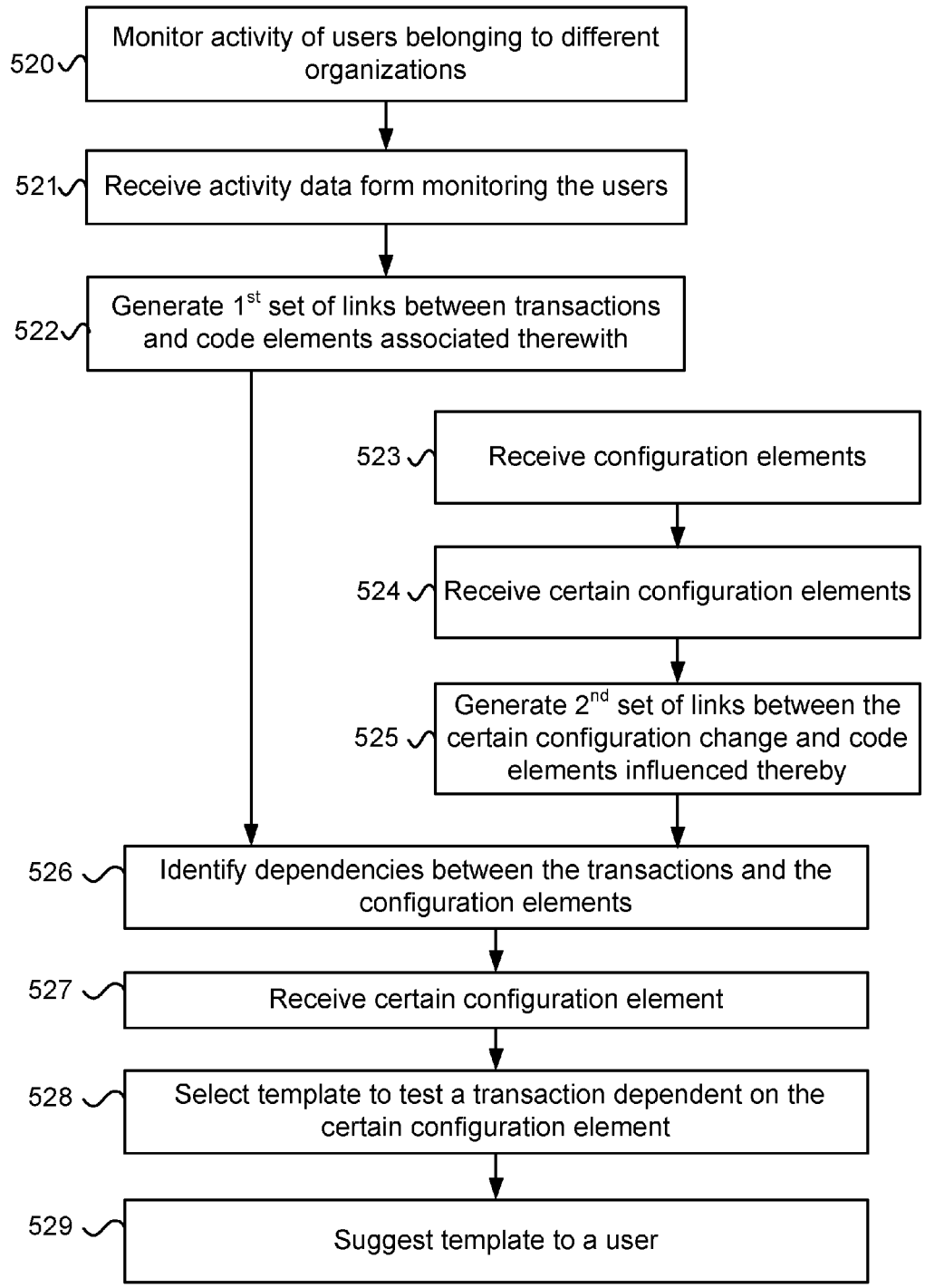
FIG. 11 illustrates one embodiment of a computer implemented method for identifying dependencies between configuration elements and transactions.

FIG. 11 illustrates one embodiment of a computer implemented method for identifying dependencies between configuration elements and transactions. The illustrated embodiment includes the following steps:

In step 521, receiving activity data obtained by monitoring activity of users belonging to different organizations; the users operate software systems associated with the different organization. Optionally, the software systems enable identification of at least some of the transactions executed on the software systems. Additionally, at least some of the configuration elements related to the system are identifiable. This may enable connection between at least some of the configuration elements and at least some of the transactions via code elements.

In step 522, generating, based on the activity data, a first set of links between the transactions and code elements associated with the transactions; each link in the first set is based on activity data obtained from at least two different organizations. Optionally, the code elements include data of at least one of the following types: procedures without specific invocations, classes without specific invocations, database triggers, stored procedures, screens, and tables in a database. Optionally, a business process comprises at least two transactions, and the first set of links corresponds to connections between code elements and business processes.

In step 523, receiving the configuration elements.

In step 524, receiving code of a software system which includes at least one of the following: procedure invocations, user interface statements, and database access statements.

In step 525, generating, based on static analysis of the code, a second set of links between the configuration elements and code elements influenced by the configuration elements. Optionally, the second set of links is generated utilizing static analysis of the code of the software system. Optionally, the static analysis receives as input at least one of the following: procedure invocations, and SQL statements.

And in step 526, identifying dependencies between the transactions and the configuration elements by utilizing the first set of links and the second set of links.

In one embodiment, the configuration elements include an element whose value has changed, and identifying dependencies between the transactions and the configuration elements involves identifying dependencies between one or more of the transactions and the element whose value has changed.

In one embodiment, identifying a dependency between a certain transaction and a certain configuration element is achieved by identifying a certain code element that is common both to a link from the second set, between the certain configuration element and the certain code element, and to a link from the first set, between the certain code element and the certain transaction.

In one embodiment, the computer implemented method illustrated in FIG. 11 includes an optional step of weighting links in the first set according to number of different organizations associated with the links. An organization is associated with a link between a transaction and a code element, if a user belonging to the organization executed the transaction and during execution of the transaction the code element was executed on a system belonging to the organization. The larger the number of different organizations associated a link, the higher the weight of the link when used for the identifying of the certain transaction impacted by the certain configuration change.

In another embodiment, the computer implemented method illustrated in FIG. 11 includes an optional step of weighting a link between a code element and a transaction according to number of users monitored while having an interaction with the code element that is part of the transaction. The larger the number of users having the interaction with the code element, the higher the weight of the link when used for the identifying of the certain transaction impacted by the certain configuration change.

In yet another embodiment, the computer implemented method illustrated in FIG. 11 includes an optional step of weighting a link from the second set, between a configuration element and a code element, according to number of different organizations associated with the link. Optionally, an organization is considered associated with a link between a configuration element and a code element, if a system belonging to the organization is both configured according to the configuration element and executes the code element. Optionally, the larger the number of organizations associated with a link, the higher the weight of the link when used to identify dependencies between transactions and configuration elements.

In still another embodiment, the computer implemented method illustrated in FIG. 11 includes an optional step of weighting a dependency between a transaction and a configuration element, which is based on a first link from the first set between the configuration element and a code element, and on a second link from the second set between the code element and the transaction. Optionally, the weight of the dependency is assigned according to at least one of weight of the first link and weight of the second link.

In one embodiment, the computer implemented method includes optional step 520 which involves monitoring the users belonging to the different organizations in order to obtain the activity data.

In one embodiment, the computer implemented method includes optional step 527 which involves receiving the certain configuration element. Optionally, the computer implemented method also includes step 528 which involves selecting a test scenario template suitable for testing a transaction that is dependent on the certain configuration element received in step 527. Optionally, the test scenario template is selected, at least in part, according to weights of the dependencies. Optionally, the computer implemented method includes optional step 529 which involves suggesting to a user to run an instantiation of the test scenario template. Optionally, the suggestion is made via the user interface 512.

In one embodiment, a non-transitory computer-readable medium stores program code that may be used by a computer to identify dependencies between configuration elements and transactions. The computer includes a processor, and the non-transitory computer-readable medium stores the following program code:

Program code for receiving activity data obtained by monitoring activity of users, belonging to different organizations, running software systems in which the transactions and the configuration elements are identifiable and can be connected via code elements.

Program code for generating, based on the activity data, a first set of links between the transactions and code elements associated with the transactions; each link in the first set is based on activity data obtained from at least two different organizations. Optionally, the code elements include data from at least one of the following types: procedures without specific invocations, classes without specific invocations, database triggers, stored procedures, screens, and tables in a database. Optionally, a business process comprises at least two transactions, and the first set of links corresponds to connections between code elements and business processes.

Program code for receiving the configuration elements.

Program code for receiving code of a software system which comprises at least one of the following: procedure invocations, user interface statements, and database access statements.

Program code for generating, based on static analysis of the code, a second set of links between the configuration elements and code elements influenced by the configuration elements. Optionally, the second set of links is generated utilizing static analysis of the code of the software system. Optionally, the static analysis receives as input at least one of the following: procedure invocations, and SQL statements. Optionally, the configuration elements include an element whose value has changed, and identifying dependencies between the transactions and the configuration elements involves identifying dependencies between one or more of the transactions and the element whose value has changed.

And program code for identifying dependencies between the transactions and the configuration elements by utilizing the first set of links and the second set of links.

In one embodiment, the non-transitory computer-readable medium optionally stores program code for identifying a dependency between a certain transaction and a certain configuration element by identifying a certain code element that is common both to a link from the second set, between the certain configuration element and the certain code element, and a link from the first set, between the certain code element and the certain transaction.

In one embodiment, the non-transitory computer-readable medium optionally stores program code for weighting links in the first set according to number of different organizations associated with the links. An organization may be considered associated with a link between a transaction and a code element if a user belonging to the organization executed the transaction and during execution of the transaction the code element was executed on a system belonging to the organization. The larger the number of different organizations associated a link, the higher the weight of the link for the identifying of the certain transaction impacted by the certain configuration change.

In one embodiment, the non-transitory computer-readable medium optionally stores program code for weighting a link between a code element and a transaction according to number of users monitored while having an interaction with the code element that is part of the transaction. The larger the number of users having the interaction with the code element, the higher the weight of the link for the identifying of the certain transaction impacted by the certain configuration change.

In one embodiment, the non-transitory computer-readable medium optionally stores program code for weighting a link from the second set, between a configuration element and a code element, according to number of different organizations associated with the link. Optionally, an organization is associated with a link between a configuration element and a code element, if a system belonging to the organization is both configured according to the configuration element and executes the code element. The larger the number of organizations associated with a link, the higher the weight of the link when used to identify dependencies between transactions and configuration elements.

In one embodiment, the non-transitory computer-readable medium optionally stores program code for weighting a dependency between a transaction and a configuration element, which is based on a first link from the first set between the configuration element and a code element, and on a second link from the second set between the code element and the transaction. Optionally, the weight of the dependency is assigned according to at least one of weight of the first link and weight of the second link.

In one embodiment, the non-transitory computer-readable medium optionally stores program code for monitoring the users belonging to the different organizations for obtaining the activity data.

In one embodiment, the non-transitory computer-readable medium optionally stores program code for receiving a certain configuration element and selecting a test scenario template suitable for testing a transaction that is dependent on the certain configuration element. Additionally, the non-transitory computer-readable medium may optionally store program code for selecting the test scenario template based on weights of dependencies. Optionally, the non-transitory computer-readable medium may store program code for suggesting to a user to run an instantiation of the test scenario template.

Figure 13:
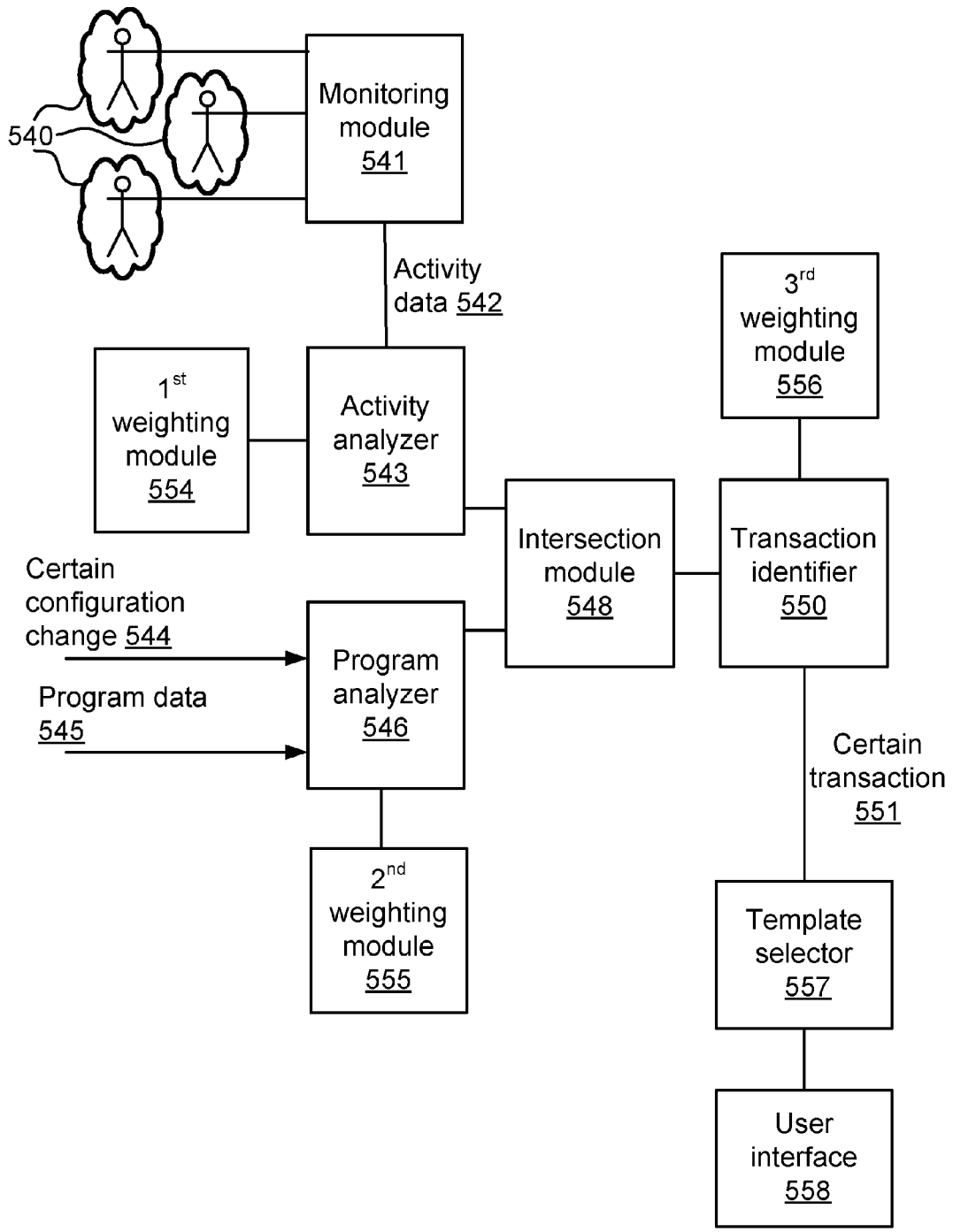
FIG. 13 illustrates one embodiment of a computer system configured to identify a certain transaction likely to be impacted by a certain configuration change.
Figure 14:
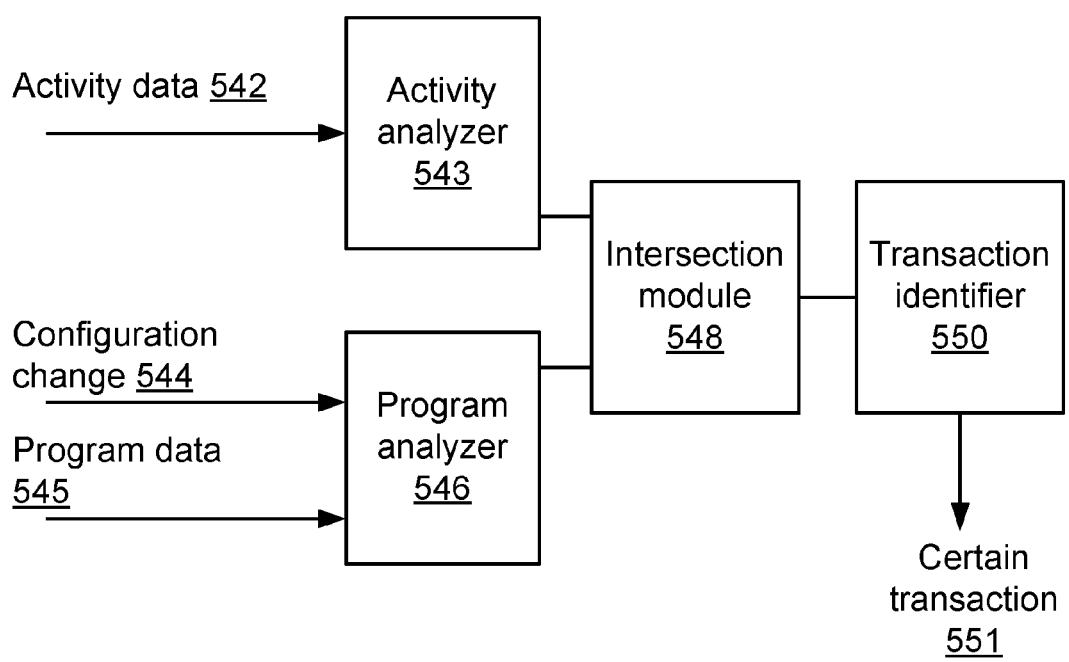
FIG. 14 illustrates one embodiment of a computer system configured to identify a certain transaction likely to be impacted by a certain configuration change.

FIG. 13 and FIG. 14 illustrate embodiments of a computer system configured to identify a certain transaction likely to be impacted by a certain configuration change. The illustrated embodiments include at least an activity analyzer 543, a program analyzer 546, an intersection module 548, and a transaction identifier 550.

The activity analyzer 543 is configured to receive activity data 542 obtained by monitoring activity of users 540 belonging to different organizations. The activity of the users involvers operating software systems associated with the different organizations. Optionally, the activity data 542 includes runs of test scenarios. Optionally, some of the test scenarios were run to test impact of configuration changes on the software systems.

In one embodiment, the software systems enable identification of at least some of the transactions executed on the software systems. For example, a log-keeping procedure may record identifying information regarding transactions performed by a user. Additionally, at least some of the code elements executed by interaction with the system are identifiable. For example, at least some of the code elements involve are run using an interpreter and/or a system that enables association between binary code and/or byte code run on the system and native "high-level" code. In one example, the system may provide access to debug information In one example, the software systems belonging to the different organizations are SAP ERP systems. Optionally, configurations involve database tables, and configuration changes may involve changes to entries and/or attributes in database tables. Monitoring the users involves monitoring of the executed transactions (e.g., queries and returned values).

In another example, the software systems belonging to the different organizations are Oracle ERP systems. Optionally, configuration changes involve customization code and monitoring the users involves monitoring executed procedures.

In still another example, the software systems belonging to the different organizations run Java Virtual Machines (JVM). The JVMs enable associations at run-time between Java code and transactions executed on the systems.

The activity analyzer 543 is also configured to identify, based on the activity data 542, a first set of code elements associated with transactions; each code element in the first set is referred to in activity data of users belonging to at least two different organizations. That is, for each code element in the first set, there are at least two users, each user from a different organization, for which their respective activity data includes an indication that the code element was executed. For example, there is a mentioning in a log file that a certain transaction was run (where the transaction is known to include the code element), or the activity data includes a result that is generated by the code element.

In one embodiment, the activity data 542 includes a list of business processes and/or transactions executed by the users 540. In one example, the business process and/or transactions may be identified according to their names, identifier codes, and/or descriptions (e.g., a list of fields in a screen involved in a transaction). In another example, the activity data 542 may indicate that a certain group of transactions was executed; e.g., by mentioning that a certain protocol was tested (e.g., adding and removing an employee), it may be inferred that all the transactions involved in the protocol were executed. Optionally, the activity data 542 may include indications of code executed by the users 540. For example, the indications may be in the form of names of programs, portions of code, hash values of code, and/or outputs that are typically generated by certain code (and thus may indicate that the certain code was executed). Optionally, the activity data 542 includes data that enables synchronization. For example, the activity data may include time stamps and/or program counters (indicating a position in code).

Based on the activity data 542, the activity analyzer 543 can pair between transaction executed by a user at a certain time and corresponding code elements executed at the time. In one example, the activity data 542 indicates a transaction by name that was executed by a user. The activity analyzer 543 receives (as part of the activity data 542 and/or from another source) code corresponding to the transaction, and from the code, is able to identify code elements to be associated with the transaction. Optionally, a single code element is associated with each transaction. Alternatively, multiple code elements may be associated with a transaction (e.g., each function executed in a transaction is associated with a different code element). Additionally or alternatively, a single code element may be associated with multiple different transactions. For example, a code element corresponding to a certain function may be associated with each different transaction that involves running the certain function.

In one embodiment, the activity analyzer 543 generates data indicative of associations between transactions and the code elements. In one example, the data that associates between transactions and the code elements includes a record for each code element indicating transactions associated with it. In another example, the data that associates transactions and the code elements includes a record for each transaction indicating code elements associated with it. Optionally, code elements may be identified by their actual code, by identifiers (e.g., path and/or file name, function name), and/or by hash values of their code.

In one embodiment, the code elements are include data of at least one of the following types: procedures without specific invocations, classes without specific invocations, database triggers, stored procedures, screens, and tables in a database.

The program analyzer 546 is configured to receive the certain configuration change 544 and program data 545 that includes a description of at least one of the following: procedure invocations, user interface statements, and database access statements. Optionally, the program data 545 is received from the monitoring module Optionally, the certain configuration element 544 relates to a software system belonging to a different organization than organizations to which software systems related to the program code 545 belong. Alternatively, the certain configuration change 544 may related to a software system to which some of the program data 545 belongs.

In one embodiment, procedure invocation may include any call to a function, procedure and/or program by a calling program. Optionally, a description of the procedure invocation may include an invocation statement that includes information such as the name of the procedure and/or arguments provided for an invocation of the procedure (e.g., values placed on a memory stack to be utilized by the procedure). Additionally or alternatively, a description of the procedure invocation may include code corresponding to the procedure, such as code to be executed by the invoked procedure.

In one embodiment, user interface statements may include any commands and/or programs that result in retrieval, generation, and/or presentation of data to a user via a user interface. Additionally or alternatively, user interface statements may include any commands and/or programs that result in receiving, recording and/or processing of data provided by a user to a system via a user interface. Additionally or alternatively, user interface statements may include data provided by a user to a system via the user interface and/or any data provided by a system to a user via the user interface. Optionally, a description of user interface statements may include the statements in a similar format to a format in which they are provided to a computer system and/or received from the computer system. Optionally, a description of user interface statements may include a summary of the statements and/or certain information extracted from the statements. Optionally, the user interface may include one or more apparatuses that may receive information from a user, such as a keyboard, touch screen, mouse, microphone, motion tracking apparatus, and/or eye tracking apparatus. Additionally or alternatively, the user interface may include one or more apparatuses that may provide information to a user, such as a screen, an augmented and/or virtual reality display, speaker, printer, and/or a haptic feedback device.

In one embodiment, database access statements may include commands and/or programs that result in reading data from a database, writing data to a database, and/or modification of data in a database. Additionally or alternatively, database access statements may include commands and/or programs that change attributes of a database, such as altering columns in a database and/or changing access permissions to certain data in a database. In one example, database access statements may include SQL statements that operate on one or more tables in a database. In another example, database access statements may include CGI scripts that cause a system to retrieve data from a database. Optionally, a description of database access statements may include the statements in a similar format to a format in which they are provided to a computer system and/or received from it. Optionally, a description of database access statements may include a summary of the statements and/or certain information extracted from the statements.

The program analyzer 546 is also configured to identify, based on the program data 545, a second set of code elements that are influenced by the certain configuration change 544. Optionally, the program data 545 includes data related to multiple software systems that may belong to one or more different organizations. Optionally, the program analyzer 546 is configured to receive as input the certain configuration change 544 and program data 545 that includes code of a software system, and to perform static analysis in order to identify the second set of code elements. Optionally, the static analysis determines a change in the behavior of the software system as a result of the certain configuration change 544.

Determining which code elements may be influenced by a certain configuration change may be done using various computational approaches. In some embodiments, static analysis methods may be utilized by the program analyzer 546 in order to identify the second set of code elements that may be influenced by configuration changes.

In one embodiment, a code element may be said to be influenced by a configuration change if due to the configuration change, the code element is executed differently on a software system. Optionally, the configuration change involves a certain configuration element whose associated value has changed. Optionally, if an execution of the code element after the configuration change is different than a previous execution of the code element, which took place when the certain configuration element had a different value, then the code element may be considered to be influenced by the configuration change. Optionally, substantial differences, between the execution of the code and the previous execution of the code, are due to the configuration change. For example, in both executions the same input values are provided by a user to a system executing the code element, however, due to the configuration change, the outcomes were different.

In one embodiment, two executions of a code element may be considered different if they follow a different control path, i.e., there is a certain command that is executed in one execution that was not executed in the other. Optionally, two executions of a code element may be considered different if they generate different values, i.e., there is a certain value generated in one execution which was not generated in the other.

There are several approaches that may be utilized by one skilled in the art for performing static analysis in order to identify code elements that may be influenced by a configuration change. In one embodiment, data flow analysis is used to detect certain code elements that may be affected by a configuration change. For example, according to the data flow analysis it may be determined that a configuration element whose value has changed may be utilized at some point, or under certain conditions, by a code element. Consequently, the program analyzer 546 may determine that the configuration element and/or a configuration change that changes a value associated with the configuration element, may influence the code element. In another embodiment, control flow analysis may be utilized to detect certain code elements that may be affected by certain configuration changes. For example, flow analysis of code may reveal that a configuration change, which involves a new value to a configuration element, may affect the program in certain ways; for example, causing the program to access the new value may cause certain new statements to be executed. Thus, the program analyzer 546 may determine, based on the flow analysis, that the configuration change influences code elements corresponding to the certain statements. Additional details and examples of the use of static analysis for determining impact of configuration changes may be found in Dor et al. "Customization change impact analysis for ERP professionals via program slicing", in the Proceedings of the 2008 international symposium on Software testing and analysis, ACM, 2008.

In some embodiments, the program analyzer 546 identifies multiple code elements that may be influenced by the certain configuration change 544. For example, by using static and/or dynamic analysis methods the program analyzer 546 may generate a large list of code elements that may to varying degrees be influenced by the certain configuration change 544. The list may need to undergo additional refinement, e.g., by external software and/or human experts in order to select a subset of code elements that are influenced by the certain configuration change 544.

In some embodiments, the amount of program data 545 may be very large and/or the number of configuration changes and/or the number of configuration elements involved in the configuration changes may be large. Analyzing the entire body of program code 545 with respect to the configuration changes may be prohibitive. Therefore, in some cases, the program analyzer 546 may perform analysis primarily of a subset of the program code 545 and/or consider a subset of the configuration changes.

In one example, the program analyzer 546 may focus a relatively larger portion of the analysis effort towards configuration elements corresponding to the certain configuration change 544. This may be done as opposed to investing essentially similar efforts towards configuration elements that have not changed. Optionally, based on determining which configuration elements have associated values that have changed (e.g., they are involved in the certain configuration change 544), the program analyzer 546 can determine which subsets of the program code 545 are likely to be affected by the certain configuration change 544, and perform analysis primarily on the subsets of code.

In another example, the program analyzer 546 receives a certain field of operation of a certain organization (e.g., the field of operation may be banking or automotive industry). Based on the field of operation, the program analyzer 546 may determine a subset of the code elements that are typically used by organizations that are in the same field. The program analyzer 546 may then focus analysis efforts more on the subset of the code.

In one embodiment, the program analyzer 546 generates data that associates between the certain configuration change 544 and code elements influenced by it. In one example, data that associates between configuration changes and code elements includes a record for each code element indicating configuration changes that influence it. In another example, data that associates between configuration changes and code elements includes a record for each configuration change indicating code influenced by it. Optionally, code elements may be identified by their actual code, by identifiers (e.g., path and/or file name, function name), and/or by hash values of their code.

The intersection module 548 is configured to calculate an intersection between the first set of code elements and the second set of code elements. Optionally, the intersection is computed explicitly. For example, the code elements in the first set are compared to the code elements in the second set, and code elements common to both sets are placed in the intersection. In another example, the intersection is calculated by comparing identifiers and/or hash values of the code elements in the first and second sets. Optionally, the intersection module 548 receives data that associates between the certain configuration change 544 and code elements influenced by it and/or data indicative of associations between transactions and the code elements.

In one embodiment, an intersection between the first and second sets of code elements is computed as needed. For example, given a code element in the first set, the second set may be examined in order to determine whether the code element also appears in it. In one example, code elements are identified by identifiers and/or hash values of the code elements; thus, looking up a certain code element in one of the sets may be done efficiently.

The transaction identifier 550 is configured to identify the certain transaction 551 likely to be impacted by the certain configuration change based on a common code element belonging to the intersection. Optionally, the common code element is a code element that is associated with the certain transaction 551, based on analysis of the activity analyzer 543. Additionally, the common code element is influenced by the certain configuration change 544, according to analysis of the program analyzer 546. Thus, based on the common code element, it may be inferred that the certain transaction 551 is likely to be influenced by the certain configuration change 544.

In one embodiment, the intersection module 548 and transaction identifier 550 are realized by the same software module. For example, the intersection may be computed implicitly by the transaction identifier 550 according to data received from the activity analyzer 543 and/or the program analyzer 546; the transaction identifier 550 may generate a list of transactions likely to be influenced by the certain configuration 544 (e.g., a list of widely used transactions), and further refine the list based on information related to common code elements received from the activity analyzer 543 and/or the program analyzer 546.

In one embodiment, the computer system optionally includes a monitoring module 541 configured to monitor the activity of the users 540 belonging to the different organizations and to provide the activity data 542 obtained from the monitoring to the activity analyzer 543.

In one embodiment, the computer system optionally includes a template selector 557. The template selector 557 is configured to receive the transaction 551 and to select a test scenario template suitable for testing the certain transaction 551. Optionally, the selection by the template selector 557 may be based on weight assigned to code elements belonging to the first set, the second set, and/or the intersection. Optionally, the weight is assigned to the code element by a first weighting module 554, a second weighting module 555, and/or a third weighting module 556. For example, the template selector 557 may a template which includes a code element that receives a high weight.

In one embodiment, the template selector 557 selects the test scenario template suitable for testing the certain transaction 551 from among templates generated from the activity data 542. Optionally, the templates are generated from runs of test scenarios identified from the activity data 542. Optionally, the runs are clustered into clusters of similar runs, and each template is generated from one or more runs belonging to a same cluster. Optionally, the selection of the template at least in part on the number of different users and/or different organizations associated with runs belonging to the clusters.

In one embodiment, the computer system optionally includes a first weighting module 554 that is configured to weight code elements in the first set according to a number of users monitored while having an interaction with the code element as part of a transaction (e.g., users that ran a class, accessed a screen, or updated a database). The larger the number of users having an interaction with a code element, the higher the weight of the code element when used to identify the certain transaction likely to be impacted by the certain configuration change. Optionally, a large weight of a code element may indicate that the code element is widely used by many users, and thus is likely to be relevant to other users.

In one embodiment, the first weighting module 554 is configured to weight code elements in the first set according to a number of different organizations associated with the code elements. An organization may be considered associated with a code element, if a user belonging to the organization interacts with the code element on a system belonging to the organization. The larger the number of different organizations associated a code element, the higher the weight of the code element when used to identify the certain transaction likely to be impacted by the certain configuration change. Optionally, a large weight of a code element may indicate that the code element is widely used by many organizations, and thus is likely to be relevant to other organizations.

In one embodiment, the first weighting module 554 may be implemented as part of the activity analyzer 543, the intersection module 548, and/or the transaction identifier 550. For example, the first weighting module 554 is a software module that is part of software modules utilized by the activity analyzer 543, the intersection module 548, and/or the transaction identifier 550. Optionally, the code elements of the first set may be filtered according weights assigned by the first weighting module 554. For example, code elements that have a weight below a predetermined threshold are not considered by the intersection module 548.

In one embodiment, the computer system optionally includes a second weighting module 555 configured to weight code elements in the second set according to number of different organizations associated with the code elements. Optionally, an organization may be considered associated with a code element, if program data associated with the organization includes the code element. The larger the number of different organizations associated a code element, the higher the weight of the code element when used to identify the certain transaction likely to be impacted by the certain configuration change. Optionally, a large weight of a code element may indicate that the code element is widely used by many organizations, and thus is likely to be relevant to other organizations. Optionally, the second weighting module 555 may be implemented as part of the program analyzer 546, the intersection module 548, and/or the transaction identifier 550. For example, the second weighting module 555 is a software module that is part of software modules utilized by the program analyzer 546, the intersection module 548, and/or the transaction identifier 550. Optionally, the code elements of the second set may be filtered according weights assigned by the second weighting module 555. For example, code elements that have a weight below a predetermined threshold are not considered by the intersection module 548.

In one embodiment, the computer system optionally includes a third weighting module 556 that is configured to weight code elements belonging to the intersection based on at least one of weights of code elements in the first set and weights of code elements in the second set. Optionally, the weight assigned to a code element belonging to the intersection is a function of a first weight assigned to the code element by the first weighting module 554 and/or a second weight assigned to the code element by the second weighting module 555. For example, the weight of the code element may be the sum of the first and second weights. In another example, the weight of the code element is the maximum of the first and second weights. Optionally, the third weighting module 556 may be implemented as part of the intersection module 548 and/or the transaction identifier 550. For example, the third weighting module 556 is a software module that is part of software modules utilized by the intersection module 548 and/or the transaction identifier 550.

In one embodiment, a business process includes at least two transactions, and the activity analyzer 543 is configured to identify, based on the activity data 542, a first set of code elements associated with the business processes. Additionally, transaction identifier 550 may identify a certain business process that is likely to be impacted by the certain configuration change 544.

Figure 15:
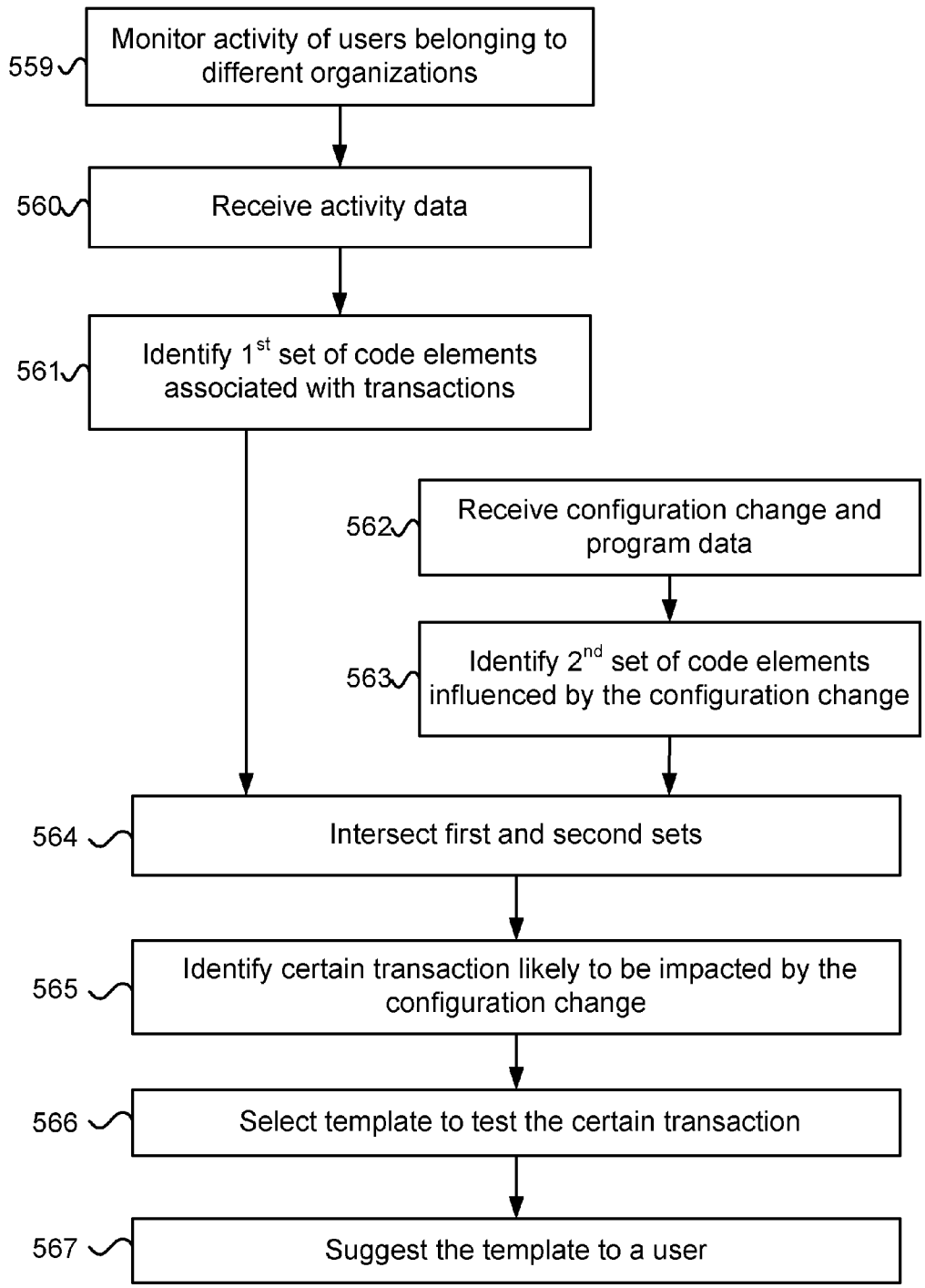
FIG. 15 illustrates one embodiment of a computer implemented method for identifying a certain transaction likely to be impacted by a certain configuration change.

FIG. 15 illustrates one embodiment of a computer implemented method for identifying a certain transaction likely to be impacted by a certain configuration change. The illustrated embodiment includes the following steps:

In step 560, receiving activity data of users belonging to different organizations. The users operate software systems associated with the different organizations, and at least part of the activity data is related to the operation of the software systems by the users. Optionally, the software systems enable identification of at least some of the transactions executed on the software systems. Additionally, at least some code elements executed by interaction with the system are identifiable. For example, at least some of the code elements involve are run using an interpreter and/or a system that enables association between binary code and/or byte code run on the system and native "high-level" code.

In step 561, identifying, based on the activity data, a first set of code elements associated with transactions. Each code element in the first set is referred to in activity data of users belonging to at least two different organizations.

In step 562, receiving the certain configuration change and program data that includes a description of at least one of the following: procedure invocations, user interface statements, and database access statements.

In step 563, identifying, based on the program data, a second set of code elements that are influenced by the certain configuration change.

In one embodiment, the first and second sets of code elements comprise code elements of at least one of the following types: procedures without specific invocations, classes without specific invocations, database triggers, stored procedures, screens, and tables in a database.

In one embodiment, the identifying of the second set of code elements involves running static analysis on the certain configuration change and code of a software system. Optionally, the static analysis determines a change in the behavior of the software system as a result of the certain configuration change.

In step 564, intersecting between the first set of code elements and the second set of code elements, And in step 565, identifying the certain transaction likely to be impacted by the certain configuration change based on a common code element belonging to the intersection.

In one embodiment, the computer implemented method illustrated in FIG. 15 includes an optional step of weighting code elements in the first set according to number of different organizations associated with the code elements. Optionally, an organization is associated with a code element, if a user belonging to the organization executed the code element on a system belonging to the organization. Optionally, the larger the number of different organizations associated with a code element, the higher the weight of the code element for the identifying of the certain transaction impacted by the certain configuration change.

In another embodiment, the computer implemented method illustrated in FIG. 15 includes an optional step of weighting code elements in the first set according to number of users monitored having an interaction with the code elements as part of transactions. The larger the number of users having the interaction with the code elements, the higher the weight of the code element for the identifying of the certain transaction impacted by the certain configuration change.

In yet another embodiment, the computer implemented method illustrated in FIG. 15 includes an optional step of weighting code elements in the second set according to number of different organizations associated with the code elements. Optionally, an organization is associated with a code element, if program data associated with the organization includes the code element. The larger the number of different organizations associated a code element, the higher the weight of the code element for the identifying of the certain transaction impacted by the certain configuration change.

In still another embodiment, the computer implemented method illustrated in FIG. 15 includes an optional step of weighting code elements belonging to the intersection based on at least one of weights weight code elements in the first set and weights of code elements in the second set.

In one embodiment, the computer implemented method includes optional step 566 which involves selecting a test scenario template suitable for testing the at least one of the transactions. Additionally, the computer implemented method may include optional step 567 which involves suggesting to a user to run the selected test scenario template.

In one embodiment, the computer implemented method includes optional step 559 which involves monitoring the activity of the users belonging to the different organizations in order to obtain the activity data.

In one embodiment, a non-transitory computer-readable medium stores program code that may be used by a computer to identify a certain transaction impacted by a certain configuration change. The computer includes a processor, and the non-transitory computer-readable medium stores the following program code:

Program code for receiving activity data of users belonging to different organizations; the users operate software systems associated with the different organizations.

Program code for identifying, based on the activity data, a first set of code elements associated with transactions; each code element in the first set is referred to in activity data of users belonging to at least two different organizations.

Program code for receiving the certain configuration change and program data includes a description of at least one of the following: procedure invocations, user interface statements, and database access statements.

Program code for identifying, based on the program data, a second set of code elements that are influenced by the certain configuration change.

Program code for intersecting between the first set of code elements and the second set of code elements.

And program code for identifying the certain transaction impacted by the certain configuration change based on a common code element belonging to the intersection.

In one embodiment, the non-transitory computer-readable medium optionally stores program code for weighting code elements in the first set according to number of different organizations associated with the code elements. An organization may be considered associated with a code element, if a user belonging to the organization executed the code element on a system belonging to the organization. Optionally, the larger the number of different organizations associated with a code element, the higher the weight of the code element for the identifying of the certain transaction impacted by the certain configuration change.

In one embodiment, the non-transitory computer-readable medium optionally stores program code for weighting code elements in the first set according to number of users monitored while having an interaction with the code elements as part of transactions. Optionally, the larger the number of users having the interaction with the code elements, the higher the weight of the code element for the identifying of the certain transaction impacted by the certain configuration change.

In one embodiment, the non-transitory computer-readable medium optionally stores program code for weighting code elements in the second set according to number of different organizations associated with the code elements. An organization may be associated with a code element, if program data associated with the organization comprises the code element. Optionally, the larger the number of different organizations associated a code element, the higher the weight of the code element for the identifying of the certain transaction impacted by the certain configuration change.

In one embodiment, the non-transitory computer-readable medium optionally stores program code for weighting code elements belonging to the intersection based on at least one of weights weight code elements in the first set and weights of code elements in the second set.

In one embodiment, the non-transitory computer-readable medium optionally stores program code for selecting a test scenario template suitable for testing the at least one of the transactions, and program code for suggesting to a user to run the selected test scenario template.

In one embodiment, the non-transitory computer-readable medium optionally stores program code for monitoring the activity of the users belonging to the different organizations in order to obtain the activity data.

Monitoring Users and Identifying Runs

Some of the disclosed embodiments involve software systems that may be characterized as being data-oriented large-scale software systems. Examples of data-oriented large-scale software systems include Enterprise Resource Planning (ERP), such as from the following trademarks: SAP, Oracle Application, The Sage Group, Microsoft Dynamics, and SSA Global Technologies; billing systems (also known as revenue management) such as from the following trademarks: Amdocs, Comverse Inc., and Convergys Corporation; service management systems; and portfolio management systems. Installing, upgrading, and/or maintaining such systems require running many tests in order to validate the systems' behavior.

In this disclosure, users are often referred to as being monitored. This monitoring typically concerns activity of the user on a software system being tested. A monitored user may be a human (e.g., performing a certain test) and/or a system module (e.g., a module initiating the running of a certain procedure).

In one embodiment, a test scenario refers to a functional and/or a technical specification for testing a business process and/or one or more transactions. A test scenario may specify how to test one or more business processes, business requirements, test conditions, logical data, and/or expected results of tests.

In one embodiment, runs of test scenarios are identified and/or obtained based on data collected from monitoring users. For example, monitoring of a user may involve collection of data related to inputs provided by a user to a system, along with the transactions that were run, and results of the transactions. This data may be used to identify runs of test scenarios that describe test steps taken by a user and a result of executing the test steps on the software system.

In another embodiment, monitoring a user is done in order to obtain activity data of a user on a software system. The activity data may include data related to inputs provided by the user and/or other sources to the software system, outputs generated by the software system, and/or intermediate values generated by the software system (e.g., temporary files generated by the system, network traffic of the system, and/or content of memory belonging to the system). Optionally, the activity data may be utilized in order to identify runs of test scenarios.

In some embodiments, users perform at least part of their interaction with a software system via a user interface that includes a display that displays screens. Optionally, a screen may refer to a presentation of a certain form through which a user may access, modify and/or enter data. Optionally, a screen includes one or more fields. Optionally, a field may have a certain name and/or identifier. Optionally, a field may have an associated value, which may be referred to herein as a "field value". The field value may or may not be presented on the screen. Optionally, the user is able to edit certain field values, while other field values may not be editable by the user. Optionally, certain field values may be required values, which the user must enter before completing a screen. Optionally, field values from a screen may correspond to one or more database entries. For example, a screen displaying customer details (e.g., name, address, telephone number) may correspond to a record of the customer in a customer database.

In one embodiment, monitoring users involves monitoring certain transactions and/or business processes that were executed by the users, as part of running test scenarios. Optionally, monitoring users may involve monitoring which programs executed by the users, along with invocation values of the users and/or return values of the programs.

In one embodiment, monitoring a user may involve recording and/or processing inputs the user provides to the software system (e.g., via a keyboard, mouse click, visual cue). Additionally or alternatively, the inputs may include digital data transmitted to the system (e.g., a file of digital data). In another example, monitoring a user may involve recording and/or processing outputs generated by the software system. Such outputs may include, values presented on a screen, written in a file, printed, and/or provided in the form of auditory cues. The outputs may be presented to the user and/or provided to other recipients. In yet another example, monitoring a user may involve utilization of internal state data of the software system; data that may not have been directly provided by the user and may also not be directly provided to the user (e.g., memory content, database activities, and/or network traffic).

In some embodiments, users performing tests may be given instructions and/or scripts describing some of the steps involved in a certain test (e.g., which procedures to run, what buttons to push, and/or what values to provide the system). Optionally, such instructions and/or scripts may be given in electronic form (e.g., a computer file or instructions on a screen) and may be recorded and/or processed as part of monitoring a user.

As described in some embodiments in this disclosure, monitoring a user running test scenarios on a software system may be performed by a monitoring module. Optionally, the monitoring module is, and/or utilizes, a software module that interacts with the software system on which the test scenarios are run, in order to obtain data related to activity of the user on the software system. Optionally, the monitoring module is implemented, at least in part, as part of the software system. For example, the monitoring module may include one or more programs that are part of a distribution of the software system. Additionally or alternatively, the monitoring module may be implemented, at least in part, separately from the software system. For example, the monitoring module may include programs that are not part of the software system (e.g., not included in a distribution of the software system). In another example, the monitoring module may include programs that run on hardware that does not run the programs belonging to the software system; e.g., the monitoring module may run programs on different servers than servers on which the software system runs programs. Optionally, the monitoring module is implemented, at least in part, on hardware remote from hardware that runs the software system. For example, a software system may run on hardware located at a certain organization, while the monitoring module may run, at least in part, on remote cloud-based servers that are not associated with the certain organization.

In some embodiments, the monitoring module may receive data from the software system that is intended for the monitoring module (e.g., the software system may explicitly send the monitoring module data describing activity on the software system). Additionally or alternatively, the monitoring module may intercept and/or examine data of the software system that is not intended primarily for the monitoring module. For example, the monitoring module may sniff network traffic that involves message exchange between modules of the software system as part of the normal operation of the software system.

In some embodiments, a run of a test scenario may include identifiers of business processes, transactions, and/or system commands that were executed while running the test scenario. Additionally or alternatively, a run of a test scenario may include values that were provided to a software system (e.g., input values in a screen), values generated by the software system (e.g., outputs from a transaction), and/or internal values of the software system (e.g., intermediate values generated by a transaction). Additionally or alternatively, a run of a test scenario may include state information about systems involved in running the test scenario (e.g., the state of certain system resources, and/or performance data such as CPU load or network congestion), and/or information about a user running the test scenario (e.g., organization affiliation, department, job title, permissions). Optionally, a certain test step, transaction, command or procedure is said to be described and/or included in a run of a test scenario if the run of the test scenario indicates that the certain test step, transaction, command, or procedure was executed as part of running the test scenario. Optionally, examining the run of the test scenario may reveal a value associated with the certain test step, transaction, command, or procedure. Additionally, examining the run of the test scenario may reveal a behavior of the system with respect to the certain test step, transaction, command, or procedure. For example, a run of a test scenario may indicate whether or not a certain transaction, involved in the running of the test scenario, produced an error message.

In one embodiment, identifying a run of a test scenario from data obtained from monitoring one or more users is done as part of the process of monitoring the users. For example, a user may be monitored for a session, which is a certain period of time that corresponds to running of a certain test scenario. Each session may start when the running of the certain test scenario starts (e.g., when a first screen is presented to a user), and may end when the running ends (e.g., after the user enters a last value involved in the test scenario). Thus, any data recorded during the session may be easily identified as belonging to a run of the certain test scenario.

In one embodiment, the action of monitoring a user and the action of identifying a run of a test scenario from data obtained from the monitoring are performed separately. For example, monitoring may generate bulk data corresponding to activity of one or more users. Identifying runs in the bulk data may require parsing the data to identify certain portions of interest, such as transactions executed by each of the users and/or inputs and outputs of each of the users. In one example, identifying runs involves detecting in the data obtained from monitoring signals that denote a start and/or end of a run. Optionally, the signals may be explicit, such as explicit tags in the data that denote a start of running a test and/or end of running a test scenario. Alternatively or additionally, the signals may be implicit. For example, a user entering data after not doing so for a while may signal a start of a run; while having a user stop entering data, and not entering further data for a prolonged period may signal an end of a run. In another example, the fact that a user performs a certain transaction may signal a start of a run, such as entering data in a screen labeled "begin new client record". Similarly, certain transactions may signal an end of a run, such as entering data in a screen labeled "finalize new client". In yet another example, identifying a run of a test scenario may involve selecting certain types of data and/or amounts of data that are to be included in the run. For example, while monitoring a user may involve collection of various types of data, in a certain system, runs of test scenarios may include only descriptions of screens presented to a user while interacting with the certain system. Thus, in this example, identifying runs may involve identifying and retaining descriptions of screens.

The process of identifying runs of test scenarios of a certain user may utilize, in some embodiments, data collected from other users. For example, determining boundaries of a test scenario, such as determining at what screen a run of the test scenario typically starts, and at what screen it ends, may be based on examination of data obtained from multiple users. In the examination of the data, certain common screens that appear in data from multiple users may be detected, and runs of test scenarios may be restricted to begin and/or end with a description of at least one of the common screens. Alternatively or additionally, identifying runs of test scenario run by a certain user, may involve examination of data obtained primarily from monitoring the certain user.

As described in some embodiments in this disclosure, identifying runs of test scenarios run by users on software systems may be performed by a test identifier. In some embodiments, the test identifier receives data from the monitoring module. Optionally, the test identifier and monitoring module are realized by the same software module and/or same hardware. In one example, one program may perform at least some of the operations involved in monitoring the users and identifying the runs. In another example, programs that perform at least some of the operations involved in monitoring the users and identifying the runs of test scenarios, run on the same servers.

In one embodiment, the monitoring module runs, at least in part, on hardware that is different from hardware on which at least some of the actions of the test identifier are performed. For example, a monitoring module that monitors users belonging to a certain organization may run, at least in part, on servers belonging to the certain organization. However, a test identifier, which receives data from the monitoring module, may run on remote servers belonging to, or controlled by, a different organization, such as an organization that provides analysis services to the certain organization.

Crowd Testing Data

Some aspects of this disclosure involve utilization of runs of test scenarios run by users belonging to, or associated with, different organizations. Optionally, a group of users running test scenarios may be referred to as a "crowd" or "crowd users". Optionally, crowd users do not run test scenarios in a coordinated effort, such as users belonging to different organizations that do cooperate to run test scenarios to test a certain software system that belongs to a certain organization, or users making a coordinated effort to test certain aspects of their software systems. Rather, as typically used in this disclosure, the users belonging to the different organizations run test scenarios to test software systems of their respective organizations, and do so essentially independently of each other.

In some embodiments, a first organization and second organization are considered different organizations if the first organization has a different ownership structure (e.g., a different composition of shareholders) than the second organization. Additionally or alternatively, two organizations may be considered different organizations if they have different employees, and/or different members of management.

In one embodiment, a user may be considered to belong to an organization and/or may be considered to be associated with the organization, if the user has a certain relationship with the organization such as being an employee of the organization, a member of the organization, and/or contracted to work for the organization. Additionally or alternatively, a user may belong to an organization, and/or be associated with the organization, if the worker performs work that is directly or indirectly done on behalf of the organization. For example, an employee of a first organization may be considered associated with a second organization if the employee runs, as part of her duties, tests that involve a system of the second organization. As used herein, the terms "associated" and "belongs" may be used interchangeably when referring to a user being associated with an organization or a user belonging to an organization.

Some aspects of this disclosure involve utilization of runs of test scenarios run on software systems belonging to different organizations and/or associated with the different organization. Optionally, a software system may be considered to belong to a certain organization and/or may be considered to be associated with a certain organization if the software system runs, at least in part, on hardware belonging to the organization and/or paid for by the organization (e.g., software running on cloud-based servers billed to the organization). Additionally or alternatively, a software system may be considered to belong to an organization and/or be associated with the organization if a user from the organization runs test scenarios, which run at least in part, on the software system. As used herein, the terms "associated" and "belongs" may be used interchangeably when referring to a software system being associated with an organization or a software system belonging to an organization.

Some embodiments in this disclosure involve monitoring multiple users belonging to different organizations. In some embodiments, each user belongs to a single organization. For example, 100 different users may belong to 30 different organizations; some organizations may have a single user that belongs to them, while other organizations have multiple users that belong to them. In some embodiments, users may belong to more than one organization. For example, 100 different users may belong to 150 different organizations; in this example, some of the users belong to more than one different organization.

In the embodiments, some of the systems on which test scenarios are run may be data-oriented large-scale software systems. Optionally, the software systems are packaged applications having multiple modules. Optionally the software systems may be considered similar to each other if the software systems use in a similar manner one or more modules of the same type (possibly having different versions). Additionally or alternatively, the software systems may be considered similar if they contain one or more modules with a similar function (e.g., modules that manage sales, stocking, or human resources).

In some embodiments, analyzing runs of test scenarios obtained from monitoring running of test scenarios by a crowd of users, on software systems of multiple organizations, may help gain certain insights that may not be easily attained from analysis obtained from runs associated with a single organization. For example, runs of test scenarios obtained from monitoring a crowd may help gain insight into the general applicability of certain test scenarios and/or test steps for testing certain components of the systems, such as modules, business process, and/or transactions. Based on the fact that multiple organizations run test scenarios to test certain components, it may be postulated that a different organization should also run similar test scenarios; this may be especially true if the different organization is in the same field of operations as the multiple organizations.

In some embodiments, analyzing runs of test scenarios obtained from monitoring running of test scenarios on systems of multiple organizations may also help gain insight into the commonality of certain aspects of the systems, as indicated by their reoccurrence in the runs. Such insight may be used, in some embodiments, to deduce whether a certain aspect is particular to a single organization, or a small number of organizations from the multiple organizations. Alternatively, it may be deduced, the certain aspect may be rather general and may be associated with a relatively large portion of the multiple organizations. For example, runs of test scenarios associated with multiple organizations may include a field which is given a value in each run of the test scenarios. If a certain value is entered in a large proportion of the runs (the same certain value is entered in each run of the large proportion or runs), then the value may be considered a default value or a general value. In this case, knowing the certain value may not assist much to identify a specific organization which is associated with a run from which the certain value was taken. However, if a certain value appears only in runs of a single organization, or in a small proportion of the runs, then the value may be considered a unique and/or proprietary value. In this case, knowing the certain value may assist to identify a specific organization which is associated with a run from which the certain value was taken. Thus, in some embodiments, monitoring runs of test scenarios associated with multiple organizations may help discover non organization-specific default values that can be used for running test scenarios of other organizations. Additionally, the same analysis may help identify what data in the runs may be considered proprietary.

Configuration Elements and Changes

In one embodiment, the software systems may include many modules that can be configured to suit an organization's needs. Configuring a system may involve various aspects of a software system, modules belonging to the software system, and/or business processes run on the software system. Optionally, in some embodiments, configuring a system is done, at least in part, using configuration files, setup file, and/or customization code that are read by the system and may be altered by an organization to suit the organization's needs. In one example, configuring a SAP ERP system involves entering, editing, and/or removing values from configuration tables. Optionally, the tables may define various aspects of fields (e.g., name and type) for certain data tables users may access via the ERP system. In another example, an Oracle™ database system is configured using Oracle form personalization, which is a standard feature provided by Oracle™ and supported by Oracle™ to customize the forms. Forms personalization enables changing properties of fields, such as hiding fields, making fields mandatory, creating zoom functionality, and/or dynamic changes of lists of values. In one embodiment, customizations refer to user-generated code, such as "user exit" in SAP, and customization code in Oracle.

In some embodiments, a configuration element is one or more details (e.g., a line in a configuration file, a field name, a function name), which can be used to configure behavior of a software system. In one example, a configuration element may define certain aspects of data structures used by the system (e.g., column names in a table) and/or type of values in a column belonging to a table. In another example, a configuration element may determine behavior of a system, such as defining what functions should be called under certain conditions (e.g., what to do with a printing job).

In one embodiment, a change to a configuration element may be referred to as a "configuration change". Optionally, a configuration change may include one or more actions that involve adding a configuration element, deleting a configuration element, and/or editing a configuration element. Optionally, a configuration change may require running one or more test scenarios in order to verify that the configuration change caused a desired effect and/or in order to verify that the configuration change did not cause an undesired effect.

In one embodiment, a configuration element may have an associated value. For example, a configuration element called "default field width" may have an associated value 20. Optionally, a change to an associated value of a configuration element may be referred to as a "configuration change". Optionally, a configuration change may involve adding an associated value to a configuration element, deleting an associated value from a configuration element, and/or editing an associated value of a configuration element.

In some embodiments, there may be various ways in which configuration elements and/or configuration changes may be identified. Identifying a configuration element enables a software system and/or a user to determine what configuration element is being referred to. Similarly, identifying a configuration change enables the software system and/or a user to determine what configuration element being changed and/or what change is done to an associated value of the configuration element.

In one example, a configuration change is identified by a code, such as a hash code or an identification number. Optionally, the code also identifies an associated value of the configuration element and/or a change to an associated value of the configuration element. In another example, a configuration change and/or a configuration element may be characterized by a new configuration file (e.g., a new setup file for the system). Optionally, a comparison between a new configuration file and a previous configuration file may characterize configuration changes, that involve changes to configuration elements and/or associated values of configuration elements.

In one embodiment, configuration elements and/or configuration changes may be clustered into clusters of similar configuration elements and/or configuration changes. Optionally, clusters of similar configuration elements include configuration elements that deal with the same, or similar, system modules, business processes and/or database tables. Optionally, clusters of similar configuration changes include configuration changes that deal with the same, or similar, configuration elements. Optionally, clusters of similar configuration changes include configuration changes that are associated with similar values.

In one embodiment, configuration elements and/or configuration changes are clustered utilizing text clustering approaches. For example, clustering is performed on configuration files that include the configuration elements and/or configuration changes. Those skilled in the art may identify various text clustering algorithms that may be utilized to cluster configuration elements into clusters of similar configuration elements. Optionally, configuration elements and/or configuration changes may be considered similar if configuration files that include the configuration elements and/or the configuration changes are considered similar (e.g., they belong to a same cluster).

In another embodiment, clustering configuration elements and/or configuration changes may be done based on values associated with the configuration elements. Optionally, clusters of similar configuration elements and/or configuration changes may include same or similar configuration elements and/or configuration changes, which have similar associated values in several ways. In one example, portions of configuration files that include multiple configuration elements and/or configuration changes are converted to vector representation; each vector dimension corresponds to a certain configuration element and the value entered in the vector dimension corresponds to an associated value of the certain configuration element. Those skilled in the art may recognize various algorithmic approaches that may be utilized to cluster vectors representing the portions of the configuration files (e.g., k-means or hierarchical clustering).

Clustering Runs of Test Scenarios

In some embodiments, runs of test scenarios may be clustered. Clustering the runs may involve assigning a run of a test scenario to at most one cluster (e.g., "hard clustering" or partitioning). Alternatively, the clustering may involve assigning a run of a test scenario to one or more clusters. For example, the clustering may be "soft clustering" in which a run of a test scenario may belong to various clusters, possibly with different probabilities or levels of association to each cluster. Optionally, clusters of runs contain runs that are similar to each other.

In one embodiment, runs of test scenarios may be partitioned into clusters based on one or more values from the runs of test scenarios. For example, runs that involve a same start and/or end test step may be placed in the same cluster (e.g., runs that start from the same screen ID and end with an error are placed in the same cluster). In another example, runs that have a certain field (e.g., customer bank account number) are placed in the same cluster.

Clusters of runs of test scenarios may have different characteristics in different embodiments. In one embodiment, a cluster of runs of test scenarios should be of a size that reaches a predetermined threshold. Optionally, the predetermined threshold is greater than one. For example, each cluster should contain at least 3 runs. Optionally, the predetermined threshold is proportional to the number of runs being clustered. For example, each cluster may be required to contain at least 0.1% of the runs of test scenarios being clustered.

Clusters of runs may also be constrained according to the source of the runs belonging to the clusters. In one embodiment, a cluster of runs of test scenarios must include runs of at least a first predetermined number of different users and/or of users belonging to at least a second predetermined number of organizations. Optionally, the first predetermined number is greater than one and/or the second predetermined number is greater than one. In one example, the first predetermined number is 10, and the second predetermined number is 2; thus, each cluster includes at least 10 runs, and not all those runs are associated with the same organization. In another example, the first predetermined number is 5, and the second predetermined number is 5; thus, each cluster needs to contain runs associated with at least 5 organizations.

In one embodiment, ensuring that clusters of runs have certain characteristics, such as a certain size and/or include runs of a certain source, is done by a clustering algorithm that generates the clusters. For example, the clustering algorithm may ensure that each cluster includes runs of test scenarios of at least a predetermined number of users. Alternatively or additionally, ensuring that clusters of runs have certain characteristics may be done after clustering. For example, after clusters are generated, they may be filtered to remove clusters that have a size that is smaller than a predetermined threshold.

In one embodiment, clustering of runs of test scenarios may involve procedures that rely on some runs being similar based on a criterion of similarity. Optionally, a cluster of runs may include similar runs. Optionally, by similar runs it is meant that two runs are similar to each other according to the criterion. Optionally, by similar runs it is meant that at least a certain percentage of the runs belonging to a cluster are similar to each other according to the criterion. For example, a cluster may be considered to include similar runs if 90% of the pairs of runs in the cluster are similar according to the criterion. Optionally, by similar runs it is meant that runs belonging to the cluster are all similar to a representative of the cluster, such as one of the runs belonging to the cluster or an average run of the cluster (e.g., a centroid of the cluster).

The criterion according to which similarity between runs may be established, may have several forms. For example, the criterion for similarity between runs may be that similar runs include at least one of: essentially the same fields, similar combinations of fields, similar execution of transactions, similar user interactions, similar requests, similar test steps, and/or similar calls to procedures. Optionally, similarity between runs of test scenarios may be determined based on properties of their respective test scenarios of which the runs are instantiations; for example, by comparing the test steps used in each test scenario.

In one example, various runs of essentially the same test scenario (e.g., essentially the same testing script) are considered similar. In another example, runs of different test scenarios (e.g., using slightly different testing scripts), may be considered similar if certain similarity criteria are met (e.g., similar fields types or names, similar field values, similar screen content and/or layout, and/or similar return values in the runs). In yet another example, runs of test scenarios are considered similar, if the test scenarios from which they were instantiated are similar (e.g., involve similar screens, similar fields, and/or similar field values).

In one example, at least part of the runs of test scenarios involve software that runs on remote servers such as cloud-based servers. Monitoring a user running a test scenario may involve monitoring the content of the network traffic, such as information exchanged between an input and/or output device of the user and a cloud-based server. In this example, runs of test scenarios may be considered similar if the network traffic associated with them is similar (e.g., it follows a similar exchange sequence, and/or content of the network traffic is similar).

In one embodiment, clustering runs of test scenarios to clusters that include similar runs may be based on counting the number of similar fields used in corresponding screens that are included in the test scenarios; the larger the number of similar fields in the test scenarios, the more similar the runs of the test scenarios are considered to be. Optionally, fields may be considered similar if they include the same type of data. Additionally or alternatively, fields that have the same values are considered similar to each other. In one example, fields that include both the same type of data and the same values are considered more similar to each other than fields that have the same type of data (but different values).

In one embodiment, a type of data of a field is determined according to the context of the field in the screen. For example, if a field is preceded on a screen by the words "amount" or "sum due", the field is considered to be numerical; while if the field is preceded on a screen by the words "address" or "ship to", it is considered to be a string. Additionally or alternatively, the type of data of a field may be determined according to the features of the data structure representing the data. For example, if the field stores data in a variable that holds integers or floating-point values, the type of data is considered to be numerical. However, if the field stores data in an array, or vector of characters, the data type is considered to be a string. Additionally or alternatively, the type of data of a field may be determined according to meta data associated with a screen or database associated with the field. For example, a description of a column, in a database table which is to receive data from a field may be indicative of the type of data. In another example, meta data tags (e.g., XML tags) associated with a screen may indicate the type of data.

In another embodiment, clustering of runs of test scenarios to clusters that include similar runs of test scenarios may be based on similarity between orders of displaying similar fields in corresponding screens. The closer the order of presentation of similar fields in test scenarios, the more similar runs of the test scenarios are considered to be. In one example, test scenarios are represented, at least in part, as a sequence of field types, and/or fields IDs. The similarity between two runs of test scenarios may be determined to be inversely proportional to the number of editing steps that need to be taken to transform one sequence of identifiers to another ("edit distance"); the lower the edit distance between representations of two runs, the more similar they are considered to be (and so are their corresponding runs).

In yet another embodiment, clustering of runs of test scenarios to clusters that include similar runs may be based, at least is part, on similarity between executed procedures that are described in the runs. For example, the larger the overlap in the corresponding sets of procedures performed by each test scenario, the more similar runs of the test scenarios are considered to be. Optionally, the clustering may be further based on the order of the execution of the procedures; the closer the order of execution of procedures in different test scenarios, the more similar runs of the test scenarios are considered to be. In cases in which test scenarios involve execution of essentially the same procedures in essentially the same order, the similarity between runs of the test scenarios may be considered to be high.

In still another embodiment, the clustering of runs of test scenarios to clusters that include similar runs of test scenarios may be based on transactions described as executed in the runs of the test scenarios. For example, test scenarios may be characterized by the individual commands run by the system as part of the test scenario. Runs of test scenarios in which similar commands are executed may be considered similar for the purpose of clustering. Optionally, a cluster of runs that contains runs that have a certain proportion of common transactions executed in all runs in the cluster is considered a cluster of similar runs. For example, if at least 50% of the transactions involved in each run in a cluster appear in all other runs in the cluster, the cluster is considered to be a cluster of similar runs.

Logged activities related to running test scenarios may also be utilized for the purpose of clustering and/or determining similarity between runs of test scenarios. For example, clustering of runs of test scenarios to clusters that include similar runs may be based on one or more of the following logged activities: a list of users who ran the test scenarios, an analysis of access to a database, messages returned from the executed transactions (e.g., valid, warning, or error messages), fields which returned values in the transactions, and/or procedures utilized by the test scenario (e.g., as identified by logs of run time analysis). The clustering may be done according to there being similarity, involving one or more of the aforementioned logged activities, between test scenarios whose runs are assigned to the same cluster. Optionally, logged activities may be represented as feature values that may be put in a vector corresponding to a run. For example, if a certain activity is performed during a run, a vector corresponding to the run has 1 in a certain position, and otherwise there is a 0 in the certain position.

Similarity of runs of test scenarios may be determined, in some embodiments, according to the test scenarios and/or templates from which the runs were instantiated. Optionally, similarity of the test scenarios and/or templates may define similarity of the runs that were instantiated from the test scenarios and/or templates; thus, runs that were instantiated from similar test scenarios and/or templates are placed in the same clusters (e.g., by the clustering module performing the clustering of the runs). Alternatively, similarity of the test scenarios and/or templates may be used as features that assist in determining similarity of runs.

In one embodiment, runs that were instantiated from the same test scenarios and/or the same templates may be considered similar. Optionally, two test scenarios and/or two templates are considered the same if they involve execution of the same test steps, screens, and/or transactions. In one embodiment, two test steps are considered the same if they perform the same exact task and include the same exact associated data, while in another embodiment the two test steps are considered the same if they perform the same task but possibly involving different associated data. For example, a first test step that involves entering a new product that is a screwdriver (with details relevant to a screwdriver) may be considered in the latter embodiment as being the same as a second test step that involves entering a new product that is a hammer (with details relevant to a hammer); however, according to the former embodiment, the first and second test steps may not be the same. Similarly, screens that include field names and field values may be considered the same in one embodiment if the field names and the field values are the same; in another embodiment, the screens may be considered the same if the field names are the same. The same logic may also be applied to transactions; in some examples transactions may be considered the same if they are completely identical, while other transactions may be considered similar if they include some of the same and/or similar elements (e.g., the transactions involve similar screens).

In another embodiment, similarity of test scenarios and/or templates is determined by comparing and/or counting similar elements in the test scenarios and/or templates. If the number and/or proportion of the similar elements reaches a predetermined threshold, then runs instantiated from the test scenarios and/or templates may be considered similar and placed by clustering in the same cluster of runs. For example, if more than 50% of the screens included in two templates are similar, then runs instantiated from the two templates may be placed by clustering in the same cluster.

In yet another embodiment, test scenarios and/or templates from which runs were instantiated may be utilized to generate feature values, which are used to determine similarity of the runs to each other. For example, a vector of features representing a run may include values extracted from a template and/or test scenario from which the run was instantiated.

Clustering of runs of test scenarios to clusters of similar runs may be based on data associated with the runs. Such data may include data describing conditions under which a run was executed. For example, the data may describe aspects of the system (e.g., data involving modules, hardware, and/or software versions). In another example, such data may pertain to a test runner, such as the role (or assumed role) of the tester in an organization, level of skill of the tester, and/or permissions granted to the tester.

In some embodiments, clustering of runs of test scenarios to clusters of similar runs is done, at least in part, according to descriptions related to the systems on which the test scenarios were run. For example, such descriptions may include configuration elements (e.g., configuration files, customization code and/or setup files). Additionally or alternatively, the descriptions may include configuration changes (e.g., addition, deletion, and/or modifications) to the configuration elements. Thus, for example, runs of test scenarios concerning modules with similar configuration files (e.g., the customization files indicate similar default procedures and/or database accesses) may be placed in the same cluster. In another example, runs of test scenarios executed as a response to similar configuration changes (e.g., as determined by the original and/or changed values involved in the configuration changes), may be placed in the same cluster based on their similar configuration changes.

In some embodiments, runs of test scenarios may be represented as vectors of features that may be converted to numerical values. For example, certain dimensions in the feature vectors may correspond to the presence or absence of certain fields, procedures, test steps, and/or transactions in a test scenario (e.g., a value of '1' is given to a feature if a field has a certain value in the test scenario, and '0' otherwise. Alternatively, a value of '1' is given to a certain feature if a certain procedure is called in the test scenario, and '0' otherwise). In another example, certain dimension in the feature vectors contain values of a certain field from a run (e.g., time, data, or price), or are derived from processing one or more field values (e.g., averaging the delivery time from multiple entries of individual delivery times entered in a screen). In yet another example, certain values in a feature vector are assigned numerical values according to categories to which values from the runs belong. For example, a sale may be categorized as "domestic" or "foreign", and accordingly be given a value of "1" or "2" in the feature vector.

Feature vector representations may be utilized in order to compute a degree of similarity between feature vectors of runs of test scenarios. For example, in cases where the feature vectors contain numerical values (or can be converted to numerical values), the distance similarity between vectors representing test scenarios may be computed using one or more of the following established distance metrics: Euclidean distance of various norms, vector dot product, cosine of angle between vectors, Manhattan distance, Mahalanobis distance, Pearson correlation, and Kullback-Leibler divergence.

In one embodiment, a cluster of similar runs includes runs that are represented by similar vectors. Optionally, similar vectors may be characterized in various ways. In one example, similar vectors are vectors whose average pairwise similarity is above a predetermined threshold (e.g., the threshold may be 0.5). Optionally, the average pairwise similarity is determined by computing the average of the dot product of each pair of vectors. In another example, similar vectors are vectors that are all similar to a certain representative vector; e.g., the vectors all within a sphere of a certain Euclidean distance from the representative.

Those skilled in the art may recognize that various clustering algorithms and/or approaches may be used to cluster runs of test scenarios into clusters that include similar runs of test scenarios. For example, the clustering may be done using hierarchical clustering approaches (e.g., bottom-up or top-down approaches) or using partition-based approached (e.g., k-mean algorithms). In addition, some of the test scenarios may have assigned clusters while others may not. In such a case, a semi-supervised clustering approach may be used such as an Expectation-Maximization (EM) algorithm.

In one embodiment, the clustering of the runs of test scenarios to clusters that include similar runs may be done utilizing a classifier that is trained to assign test scenarios to predetermined classes. Optionally, the classifier is trained on labeled training data that includes training data that includes representations of runs of test scenarios (e.g., feature vectors) and labels corresponding to clusters to which the runs are assigned. If the labels in the training data are assigned according to some (possibly arbitrary) notion of similarity between test scenarios, clusters of test scenarios that have the same label assigned by the classifier are likely to contain runs that are similar according to the notion of similarity.

Optionally, runs of test scenarios are labeled according to the module they involve (e.g., "sales", "human resources", "manufacturing"), the type of activities involved in the scenario (e.g., "accessing database", "data entering", "report generating"), fields in the test scenario (e.g., "customer ID", "part number"), properties of the test scenario (e.g., "fast", "many steps", "expensive", "includes private data"), and/or results of a run of the test scenario (e.g., "ok", "error", "access denied—permissions"). Optionally, labels may be constructed from multiple attributes. For example, a run of a test scenario may be labeled as "involve sales, no private data, access corporate database".

Optionally, labels assigned to runs of test scenarios may be generated and/or assigned manually (e.g., by a tester running a test), and/or automatically, e.g., by a procedure that analyzes a test scenario to detect attributes describing it (e.g., what modules and/or procedures it involves).

Those skilled in the art may recognize that there are many algorithms, and/or machine learning-based approaches, that may be used to train a classifier of runs of test scenarios using labeled training data. For example, some examples of the algorithms that may be used include logistic regression, decision trees, support vector machines, and neural network classifiers.

In some embodiments, clusters of runs of test scenarios may be assigned a cohesion rank that describes how close to each other are runs belonging to the cluster. A cohesion rank of a cluster may describe various aspects related to the closeness of runs of test scenarios belonging to a cluster. In one example, similarity of runs of test scenarios is related to the fields included in the screens of the test scenarios; some of the fields may be common to the screens involved in runs belonging to the cluster, and some may not. The cohesion rank may be proportional to the number of fields that are common in the runs belonging to the cluster (e.g., they belong to at least 50% of the runs in the cluster). The cohesion rank can be between two runs of test scenarios or between groups of runs of test scenarios. Optionally, the cohesion rank may be expressed via cluster metrics such as average distance from the cluster centroid or the ratio between the average radius of a cluster (intra-cluster distance) and the average distance between clusters (inter-cluster distance).

Clusters generated in the embodiments (e.g., clusters of runs of similar test scenarios) may be filtered in various ways. Optionally, the filtering may be done in order to reduce the number of clusters that need to be considered and/or retain clusters with a certain desirable property. Optionally, a test scenario template generated from a filtered cluster and/or representing a filtered cluster is not suggested to a user. Alternatively or additionally, a filtered cluster is not utilized for generating a test scenario template and/or does not have a test scenario template to represent it. Optionally, clusters are filtered according to their size. For example, clusters of runs of test scenarios that contain less than a predetermined number of runs are filtered. Optionally, clusters are filtered according to the number of their associations. For example, runs of test scenarios in a cluster may be associated with certain organizations (e.g., each run may be associated with an organization). Clusters containing runs that are associated with too few different organizations may be considered too homogenous and filtered.

Test Scenario Templates

A test scenario template may include various test steps that need to be performed by a user in order to test certain aspects of a system being tested. Optionally, in some embodiments, a test scenario template may be lacking one or more values that need to be provided in order to run a test scenario based on the test scenario template. In such a case, a user running a test scenario based on the template may be required to enter the one or more values that need to be provided, in order to complete the template of the test scenario; alternatively, the one or more values and be calculated and/or guessed. In one example, a test scenario template may describe a test scenario in which an order process is completed; the template may be lacking a customer name and product ID, and in order to run an instantiation of the template, a user may be required to enter the lacking details. In another example, a template may be of a test scenario in which rush shipping is performed; a screen presented to the user may already have the rush shipping box checked, but the user may still need to add details such the client account number and shipping address.

In one embodiment, a template may include certain values from which a user may be required to choose in order to run a test scenario instantiated from the template. For example, a template may have various values for a discount (e.g., 10%, 20%, or 50%); a user needs to choose from in order to complete a transaction that is part of the template. Optionally, the values the user may need to choose from are derived from one or more runs of test scenarios that were used to generate the template. For example, the aforementioned values of the discount are the most popular values found to be used in runs of test scenarios from which the template was generated.

In some embodiments, one or more runs of test scenarios may be used in order to generate a test scenario template to represent them. Optionally, the test scenario template is generated by a template generator module. In one example, the runs of test scenarios may belong to a cluster. Optionally, the test scenario template may identify, for its corresponding cluster, one or more transactions used by test scenarios belonging to the cluster. Additionally or alternatively, the test scenario template may identify a way of using transactions that are part of the test scenarios whose runs belong to the cluster. For example, a template may define the order of programs that are to be called, the type of actions that are to be taken by a user (e.g., what fields to fill, what buttons to push), and/or provide default values to at least some of the fields (e.g., enter default values to some fields that appear on screens that are part of test scenarios generated from the template). Additionally or alternatively, a test scenario template may identify one or more possible values that may be used to run a transaction identified by the template.

It is to be noted that phrases such as "identifies a transaction" involves any type of transaction identification, such as a transaction identification number, a name of a transaction, a description of a transaction, a screenshot of a transaction, computer code of a transaction, and/or any other method that enables a human and/or a computer to link between a possible value and a transaction. Additionally, identifying a transaction may involve noting a transaction identification. In one example, noting a transaction identification involves storing the transaction identification; for example, a template may store transaction identification numbers that are to be executed when running an instantiation of the template. In another example, noting a transaction identification involves providing the transaction identification. For example, upon a query, scanning a template may generate and/or transmit names of transactions that are stored in it.

Generating the template may involve utilizing information from a plurality of runs of test scenarios. For example, one or more test steps, commands, and/or values may be copied from at least one of the plurality of runs of the test scenarios and placed in the template. Additionally or alternatively, information contained in at least some of the plurality of runs may be analyzed in order to determine certain test steps, commands, and/or values are to be used in the template. Note that not all information in the plurality of run of the test scenario needs to be utilized to generate the test scenario template. For example, a test scenario template may include a proper subset of test steps included in certain runs. In another example, certain runs, such as certain runs in a cluster, may be disregarded when generating a template based on other runs in the same cluster.

In some embodiments, template generation may be based on information obtained from one or more test scenarios. Optionally, instantiations of the one or more test scenarios are runs of test scenarios obtained and/or identified from activity data of users. In one example, a test scenario may include a script comprising test steps, and one or more test steps from the script are included in the template. Note that the script may be one various types of media; for example, a hard copy document (e.g., paper), an electronic document (e.g., a Microsoft Word™ or a PDF document), and/or a list of computer commands (e.g., a script for an automatically run test scenario). In another example, a test scenario may include certain values that may be altered by a user running instantiations of the test scenario (e.g., the certain values may be default values). In this example, to generate the template it may be desirable to utilize a certain value from a test scenario, rather than a user-provided value from a run that is an instantiation of the test scenario.

A test scenario template may be generated based on data coming from several sources. In one embodiment, a template is based on automatic test scenarios (e.g., scripts run automatically by a program without any essential human intervention). Additionally, the template may also be based on the runs of the same test scenario. Thus, certain values in the template may come from the test scenarios, while other values may come from the runs. In another example, a template may be based on runs coming from different organizations. The template may contain certain screens coming from a first organization (e.g., as they appeared in runs associated with the first organization), while other screens in the template may come from runs associated with a second organization.

In one embodiment, a test scenario template is generated from a first run of a test scenario run by a first user and a second run of a test scenario run by a second user belonging to a second organization. Optionally, the first and second runs were obtained from monitoring of the first and second users, respectively. Additionally, the first organization may be different from the second organization and the first user is not the second user. The test scenario template generated from the first and second run identifies a transaction used in the first and second runs and one or more possible values for running the transaction. Optionally, additional runs of test scenarios, besides the first and second runs, are used to generate the test scenario template.

In one embodiment, at least one of the possible values for running a transaction in a template generated from first and second runs may be derived from values obtained from the first and/or second runs. Optionally, the at least one of the possible values for running the transaction does not appear in each of the first and second runs. For example, the at least one of the possible values is an average of a first value from the first run, and a second value form the second run, and the first value does not equal the second value. Optionally, the test scenario template includes a combination of the possible values that may be used to run the test scenario template, and the combination does not appear in any of the first and second runs. For example, a combination of possible values involves fields $f_1$ and $f_2$; the first run has values $v_1$ and $u_1$ for the fields $f_1$ and $f_2$, respectively, and the second run has values $v_2$ and $u_2$ for the fields $f_1$ and $f_2$, respectively. In addition, $v_1$ does not equal $v_2$ and $u_1$ does not equal $u_2$. In this example, if the test scenario template has a value $v_1$ for $f_1$ and $u_2$ for $f_2$, then it contains a combination of possible values that does not appear in any of the first and second runs.

In one embodiment, the first and second runs upon which a template is based, may each be manual, semi-automatic, or automatic runs of test scenarios. In one example, a test scenario template is generated from a first run of a first test scenario which is a manual test scenario and a second run of a second test scenario which is an automatic test scenario. In another example, a test scenario template is generated from a first run of a first test scenario and a second run of a second test scenario, and both the first and second runs are automatic.

In another embodiment, the first test scenario and second test scenario are the same test scenario. Thus, the first run and the second run are instantiations of the same test scenario. In this case, despite being runs of the same test scenario, the first and second runs may be different (e.g., due to different inputs provided by a user during their running). Alternatively, the first test scenario and second test scenario may be different test scenarios. Thus, the first run and the second run are runs of different test scenarios; however, the first and second runs may be similar due to similarities (despite being different) between the first and second test scenarios and/or similarities in inputs provided by the user while running the first and second runs).

In one embodiment, generating a test scenario template involves receiving multiple runs (e.g., runs belonging to a cluster of similar runs), and selecting at least a first run and a second run, from among the multiple runs, upon which the template is to be based. Optionally, the first and second runs are selected such that they belong are runs of different users and/or runs of users belonging to different organizations.

Optionally, the first and second runs are runs that exhibit, on average a high similarity to the multiple runs (e.g., they are similar to a cluster centroid). Optionally, the first and second runs are selected such that other of multiple runs have a similarity to either the first run or the second run that reaches a predetermined threshold. Optionally, the first and second runs are selected according to a profile, such as a profile of a certain user. Optionally, the profile indicates transactions and/or values typically utilized by the certain user, and the first and second runs that are selected involve transactions and/or values that appear in the profile.

In one embodiment, generating a test scenario template from a cluster of runs of test scenarios involves identifying a representative run of a test scenario for the cluster, and using the representative run of a test scenario as basis for the at least one template.

In one embodiment, generating a test scenario template from a run of a test scenario may involve utilizing information from the run of the test scenario. For example, one or more test steps, commands, and/or values may be copied from the run and placed in the template. Additionally or alternatively, information contained in the run may be analyzed in order to determine certain test steps, commands, and/or values are to be used in the template. Note that not all information in the run of the test scenario needs to be utilized to generate the test scenario template. For example, the template may include a proper subset of test steps included in the run of the test scenario. Optionally, certain information in the run which may be deemed proprietary is not utilized for the template. Additionally or alternatively, certain information in the run which may be deemed proprietary is removed from the template.

In another embodiment, generating a test scenario template from runs of test scenarios (e.g., the runs belong to a cluster of similar runs of test scenarios), may involve utilizing values of a field, as they appear in runs, in order to set the value of the field in the test scenario template.

In one embodiment, the value for the field in the test scenario template is selected from the values of the field in the runs of test scenarios in the cluster. For example, the value of the field in the template is set according to the value of the field in a randomly selected run of a test scenario from the cluster.

In one embodiment, the value for the field in the test scenario template is generated by a function with one or more parameters that are set according to the values of the field in the runs of test scenarios in the cluster. Optionally, the value generated by the function is not a value found in any of the runs belonging to the cluster. For example, in order to fill the field "age" in the template, a distribution of the values of "age" in runs in the cluster may be learned, and then the value in the template may be set according to the expectation of the learned distribution or randomly drawn according to the distribution. In this example, the resulting value of age' may not be an actual value that appears in any of the runs belonging to the cluster.

Test scenario templates may be suggested to a user so that the user may run an instantiation of the templates on a system to which the user belongs and/or is associated with. Optionally, a template may be generated from one or more runs of test scenarios associated with various organizations to which the user does not belong.

In some embodiments, a user is suggested to run a test scenario template by presenting the user with a suggestion on a user interface. For example, the user interface may be a screen (e.g., monitor, image projected on a screen, and/or augmented/virtual reality display). In another example, the user interface may involve a speaker. Optionally, the user may interact with a system via the user interface in various ways; for example, touch (e.g., via a touch screen), typing (e.g., on a physical and/or virtual keyboard), a hand-operated control device (e.g., a mouse), and/or voice commands. Optionally, the user is given an opportunity to modify via the user interface, data related to the instantiation and presented on the user interface; for example, the user may modify default values, set according to the template, and presented on a screen that is presenting while running an instantiation of the template. Optionally, the user interface may initiate an instantiation of a test scenario template; for example, the user interface may present a first screen of the test scenario template and prompt the user to take a certain action to advance execution of the template.

In one embodiment, a user is recorded while running a certain test scenario. If it is identified that the certain test scenario is similar to a test scenario template (e.g., the certain test scenario involves similar test steps, transactions, and/or values as those involved in the template), it may be suggested to the user to run an instantiation of the test scenario template. Optionally, a suggestion to the user to run an instantiation of the template is made via a user interface.

In another embodiment, a profile of a user is utilized to suggest to the user to run a test scenario template appropriate to the user based on information included in the profile. In one example, the profile may include various information regarding the user and/or an organization to which the user belongs, such as information regarding modules, business processes, and/or transaction utilized by the user and/or organization. In another example, the profile may include runs of the user and/or users belonging to a certain organization, and/or data derived from the runs. In addition to the profile, and/or instead of it, the suggestion of a template to the user may be done according to other factors such as coverage of templates, importance of templates, ranking of templates, and/or connectivity factors of templates, as described in more detail below.

Coverage

In order to validate that certain system elements operate correctly after installation, customization, a change, and/or an upgrade is done to the system—it is often the case that many test scenarios need to be run. In order to validate the system's performance, it is desirable that the test scenarios that are run should cover many elements that may be related to, and/or affected by, the installation, customization, change, and/or upgrade. For example, the elements may include various transactions that may exhibit undesired behavior due to the certain configuration change and/or upgrade; each executed test scenario may be able to be used to test a subset of the transactions that are likely to be affected by the change, and/or update, in order to determine if unwanted system behavior occurs that involves one or more transactions. Therefore, the coverage offered by a set of test scenarios (or test scenario templates), such as which modules, business processes, and/or transactions are evaluated by running a set of test scenarios, becomes an important consideration when selecting which test scenarios to run. Ideally, it would be desirable to obtain as large coverage as possible with test scenarios, however, often restrictions stemming from limited resources for running test scenarios have also to be taken into account.

In one embodiment, coverage refers to a percent of business processes, used by an organization, that are sufficiently tested by test scenarios in relation to the total number of business processes used by an organization or a certain user. For example, if 40% of the business processes run by users of an organization are sufficiently tested by certain test scenarios, then the coverage of the certain test scenarios is 40%. In some cases in order for a module, business process, and/or transaction to be sufficiently tested, more than one aspect of the module, business process, and/or organization needs to be tested. This may involve running multiple tests in order to cover the more than one aspect. For example, different combinations of input data for the same screen need to be provided in order to test various aspects of a certain business process.

In one embodiment, a required coverage for a certain user that runs test scenarios, is received and utilized for suggesting test scenario templates for the user. For example, the required coverage may list certain transactions that need to be evaluated with test scenarios run by the user, and optionally the number of test scenarios that need to be run to evaluate at least some of the transactions. Alternatively or additionally, the required coverage may indicate what percentage of a system's transactions need to be evaluated by the test scenarios. In another example, the required coverage may indicate which business processes, screens, and/or specific fields need to be evaluated by running test scenario.

In one embodiment, achieving a required coverage is done by evaluating a large number of test scenario templates and estimating coverage achieved by individual templates and/or subsets of templates. Following the evaluation, a subset of templates that includes at least one template is suggested to the user in order to achieve the required coverage. Optionally, the suggested subset that includes at least one template is a subset with an essentially minimal number of templates and/or involves performing an essentially minimal number of test steps. It is to be noted that by an "essentially minimal" number it is meant a number close to the absolute minimal possible, for example up to 10% more than the absolute minimum. In some cases, the absolute minimal number of templates may be determined by an exhaustive evaluation of all possible subsets of templates; however, this may prove intractable if a large number of templates are involved.

In one embodiment, calculating the required coverage for a certain user is based on a usage information of a certain user. For example, by analyzing the usage information a list may be prepared of certain modules, business processes, and/or transactions the user frequently utilizes. This list can then be used to guide a search for a certain subset of test scenario templates that tests aspects of items on the list which need to be tested.

Finding a minimal sized subset of template obtaining a desired coverage need not require exhaustive search in every case. Those skilled in the art may recognize that there are structured methods for evaluating a search space of subsets of templates such as branch-and-bound approaches, or A* searches that enable finding the essentially minimal subset without necessarily evaluating all subsets of templates. In addition heuristic search methods may be used, such as simulated annealing, genetic algorithms, and/or random walks in order to quickly find subsets with a small number of templates (but not necessarily minimal). Additionally, optimization algorithms that involve constraint satisfaction may be used to efficiently find an essentially minimal subset.

In one embodiment, a goal of a search for a subset of templates that achieves a certain coverage is to find a subset of templates, which involves a minimal amount of testing time on the user's part. Achieving the required coverage for the certain user involving the shortest testing time for the user may be done by estimating time to achieve a required coverage for the certain user by many templates (e.g., in a search performed in the space of possible subsets of templates). And after evaluating the time it takes to run each of the many templates and/or subsets of templates, suggesting the certain use utilize a subset that includes at least one of the templates, that both achieves the required coverage and requires an essentially minimal time to complete. In this case, the suggested templates are likely to be templates relevant to scenarios that are expected to be used by the certain user, and are likely to be spread to approximately achieve a uniform coverage of the scenarios with the suggested templates.

In some cases, it is useful to refer to a coverage of a test scenario template with respect to a test scenario. In one embodiment, a template is said to cover a certain test scenario if it involves essentially the same test steps as the test scenario. Additionally or alternatively, coverage of a template with respects to a test scenario may be the percentage of test steps of the test scenario that are included in the template. Similarly coverage of a subset of templates with respect to a test scenario may refer to the test steps in the test scenario that are included in at least one of the templates in the subset.

Importance of a test scenario for a certain user may also be an objective that guides the suggestion of a template to the certain user. In one embodiment, test scenario templates that cover a test scenario are estimated to be important are suggested to the certain user before other templates that are estimated to be less important.

There are various ways in which importance of a test scenario may be evaluated. In one example, the importance of a certain test scenario is determined by frequency in which the certain test scenario is used relative to frequency in which other test scenarios are used. Thus, a test scenario often run by the certain user may be deemed significantly more important than a test scenario rarely run by the certain user. In another example, importance of a certain test scenario is determined by characteristics of users that run the certain test scenario, compared to characteristics of users that run other test scenarios. For instance, if a certain test scenario is run primarily by users that hold high positions in an organization's hierarchy, it is likely that the certain test scenario is more important than another test scenario that is used primarily by users on the lower rungs of the organization's hierarchy. In yet another example, importance of a certain test scenario is determined by a financial value associated with the certain test scenario compared to a financial value associated with other test scenarios. For example, a test scenario that involves retaining an unsatisfied customer may be given a high financial value for the organization compared to another transaction which involves sending customers a notice that their order is still pending.

Profile of a User

A profile of a user may include data related to the user, an organization to which the user belongs, and/or activity of the user on a software systems, such as software systems associated with the organization. Optionally, at least some of the data in a profile may be considered proprietary data. Optionally, the proprietary data may identify details regarding the user and/or an organization related to the profile, such as an organization to which the user belongs. In one example, a profile may include proprietary data about the user (e.g., age, address, languages, skills), and/or proprietary data related to a role of the user in the organization (e.g., job title, placement of user in organizational chart, and/or permissions and/or privileges of the user). In another example, the profile may include proprietary data related to the organization to which the user belongs (e.g., field of operation, name and sizes of departments, products and/or services provided by the organization, permissions and/or accounts of the organization, and/or customers and/or suppliers of the organization). In yet another example, proprietary data included in a profile of a user may be indicative of activity of the user. In this example, the activity may have been previously observed and/or recorded (e.g., by monitoring of the user). Additionally or alternatively, the activity may be predicted based on characteristics of an organization to which the user belongs, the position the user holds in the organization, and/or other attributes of the user (e.g., permissions and/or accounts of the user).

In one embodiment, a profile of a user includes data that is indicative of test scenarios relevant to the user and/or templates of test scenarios relevant to the user. For example, the profile may include attributes such as modules used by the user, transactions used by the user (e.g., identifiers of transactions and the number of times they were executed), and/or characteristics derived from activity of the user (e.g., accesses to databases, quantities of network data generated, reports generated by the user). Optionally, a profile of a user may include runs of test scenarios of the user, and/or results of a summary and/or analysis of runs of test scenarios of the user. For example, the profile may include a list of the transactions that are executed often in runs of test scenarios of the user. Optionally, a profile of a user may include information indicative of test scenario templates utilized by a user (e.g., templates which the user ran instantiations of).

A profile of a user may be used in order to suggest to the user to utilize a certain test scenario template. Optionally, the template may be selected from among one or more test scenario templates generated from clusters of runs of test scenarios. For example, given a profile that indicates that a user performs many transactions involving database updates, the system may recommend for the user a template generated from a cluster that contains runs of test scenarios that involve database updates. In another example, if the profile of a user contains samples of runs of test scenario run by the user, the system may suggest to the user to use a template generated from a cluster that contains test scenarios that are similar to a test scenario from which a run in the profile was instantiated. In yet another example, a profile includes state information regarding an organization to which a user belongs, such as the time zone and location of a certain site. This information may be used to suggest a certain template for a user testing a software system at the site. For example, a template that involves a report of a vacation of a user in advance may be relevant to an organization site located in France, but not for a site in the US (where such a practice may not be typically required).

In one embodiment, a profile of a user includes permissions of a user. For example, if a profile indicates that a user has permission to approve vacations, the user may be suggested to run a test scenario instantiated from a template that includes such a task. However, if the user does not have such a permission, then the certain template is irrelevant for the user. In another example, a profile describes a position of the user in the organization hierarchy. In this example, a first user may belong to the marketing department, and thus has permission to enter a new potential client in to the system. A second user may belong to the sales department, and thus can send an offer to a client. Thus, based on the profiles of the users, the system may suggest relevant templates for the users: to the first user a template that involves entering client data, and to the second user a template that involves making an offer to a client, and not vice versa.

In some embodiments, a profile may belong to an organization. For example, it may describe a generic user belonging to the organization. Optionally, a profile of an organization may be utilized to perform initial filtering of test scenario templates for users belonging to the organization. For example, according to a profile of an organization, the organization may not be authorized to run a test scenario instantiated from a certain template (e.g., due to lack of permission). This may make the template irrelevant for each and every user belonging to the organization. However, if the organization is authorized to run an instantiation of the test scenario template, according to the profile of the organization, then a profile of an individual user belonging to the organization may need to be checked in order to determine if the template is relevant to the individual user (e.g., to check whether the user has permission to run a test scenario instantiated from the template). In another example, a profile may indicate a method in which the organization conducts business. For instance, the profile may indicate a policy of making payments for goods. Thus, if the profile indicates that the organization always pays after receiving goods, a template that describes advanced payment for goods is not relevant for any user in that organization.

In one embodiment, a profile of a user may include usage data of an organization to which a user belongs. For example, the profile may describe which modules are relevant to organization. Based on the profile, a user will be suggested templates that are relevant to the organization. Similarly, the profile may describe actions that users belonging to the organization may have permission to perform. For example, if users of an organization are not authorized to access a certain database, a user belonging to the organization will not be provided with a template that includes an access to the certain database.

In some embodiments, a profile of a user and/or an organization may represent usage of transactions by the user and/or users belonging to the organization. Optionally, a profile that represents usage of transactions may be represented in various ways. The profile may include a list of runs of test scenarios, clusters of runs, and/or transactions utilized by the user. Optionally, the usage data may be represented as a vector in which each dimension may correspond to a certain transaction, cluster of runs, and/or template. In one example, if a user utilized a transaction, a value of the vector in a corresponding dimension is 1, otherwise it is 0. In another example, a value of a dimension in the vector that corresponds to a certain cluster of runs is set according to the number of runs in the cluster that were run by the user. Thus, the more the user used transactions with corresponding runs in the certain cluster, the higher the corresponding value in the vector.

Having a vector representation for at least some of the values in a profile makes it easier, in some embodiments, to compare between profiles (e.g., to find similar vectors representing similar profiles of users). Additionally, vector representation of profiles may make it easier to perform mathematical operations, such as vector dot-product or matrix factorization.

A profile of a user may be utilized to customize a test scenario template for the user. For example, by filtering the test scenario template in order for it to be more appropriate for the user. In one embodiment, a profile of the user may be used to determine which test steps, from among the test steps described in a test scenario template, are relevant for the user, and optionally remove test steps that are irrelevant. For example, a profile of the user may indicate that the user does not confirm shipments. A test scenario template, suggested to the user may include several test steps that culminate with a test step involving confirming shipment. In such a case, the last test step may be removed in order to make the test scenario template more appropriate for the user. In one example, a template may include values related to international shipping; however, if the profile of the user indicates that the user runs transactions that only involve domestic shipping, certain values concerning international aspects of the transactions may be removed from the template (e.g., destination country, currency conversion rates). In another example, a template that includes a transaction that is part of an employee evaluation process may include values related managerial assessment of the employee. If the profile of the user indicates that the user is not a manager, then those details may be irrelevant for the user. In this case, the user may receive a template that only includes transactions in which self assessment of the employee are performed. In another embodiment, a profile of the user may be used to determine which values utilized in a test scenario template may be appropriate for the user. Optionally, values deemed irrelevant to the user may be removed from the test scenario template suggested to the user. Optionally, the user may be requested to provide relevant values instead of the removed irrelevant values. For example, a profile of a user may indicate that the user deals exclusively with domestic customers having domestic addresses. However, a test scenario template may include default values that correspond to foreign addresses. In such a case, the foreign addresses may be removed, and the user may be requested to provide examples of domestic addresses.

Cleaning Proprietary Data

In one embodiment, a test scenario template generated from one or more runs of test scenarios does not include proprietary data captured during the stage of monitoring users that ran the test scenarios. Optionally, the one or more runs of test scenarios belong to a cluster and the test scenario template is generated as a representative of the cluster.

In one embodiment, determination of whether certain data, which appears in a run of a test scenario and/or is obtained from processing data from the run, is proprietary data is based on the repetitiveness of the data in runs of test scenarios. For example, if a certain value appears in only a small proportion of the runs, in runs of a small number of users, and/or runs associated with a small number of organizations, the certain value may be considered proprietary. Conversely, if a certain value is the same in many runs, or in runs of at least a certain proportion and/or number of the users, and/or is associated with at least a certain proportion and/or number of organizations, that value may be considered to be non-proprietary. Optionally, a predetermined proportion is used as a threshold to determine if a certain value is proprietary or not. For example, if a number of different users which ran runs of test scenarios that included the certain value is less than the predetermined threshold, the value is considered proprietary for those users who had runs that included the value. Otherwise, it may be considered non-proprietary (since many users had the value in one of their runs). It is to be noted, that "predetermined" refers to both a fixed value known a priori (e.g., a threshold of 10 users) and/or a value derived from known logic (e.g., 10% of the users).

In one embodiment, data for which one or more of the following is true may be considered proprietary data associated with an organization and/or proprietary data belonging to the organization: the data describes an aspect of the organization and/or a user belonging to the organization; the data appears in a database of the organization; the data appears in a run of a test scenario associated with the organization and/or is derived from the run; and/or the data is generated by a software system associated with the organization. For example, any data on a server belonging to an organization may be considered proprietary data associated with the organization. In another example, any data derived from analysis of runs of test scenarios associated with an organization may be considered proprietary data of the organization. Additionally or alternatively, data for which one or more of the following is true may be considered proprietary data of user and/or proprietary data belonging to the user: the data describes an aspect of a user; the data describes an organization to which the user belongs; the data appears in a database of the user; and/or the data appears in a run of a test scenario run by the user.

It is to be noted that as used herein, a phrase like "proprietary data" may refer to proprietary data of an organization and/or proprietary data of a user. Additionally, phrases like "proprietary values" and "proprietary data" may be used interchangeably in this disclosure.

In one example, proprietary values are removed from a test scenario template generated from a certain cluster (i.e., one or more runs belonging to the certain cluster were utilized to generate the template). Optionally, the proprietary values are removed by a data cleaner module that operates on the generated template. Additionally or alternatively, removal of proprietary data may be done by other modules belonging to the system, such as a template generator, a customization module, a ranking module, and/or a user interface. Optionally, removing the proprietary values involves selecting a value from the template, and removing the selected value from the template if the selected value appears in less than a first predetermined number of runs of test scenarios in the certain cluster. Additionally or alternatively, the selected value may be removed if it appears in runs belonging to the certain cluster that are associated with less than a second predetermined number of different organizations. In this example, both the first predetermined number and the second predetermined number are greater than one. Optionally, the first predetermined number and/or the second predetermined number are proportional to the number of user with runs belonging to the certain cluster and/or the number of organizations associated with runs belonging to the certain cluster. For example, the first predetermined number may be set to be the maximum of two and 10% of the users with runs in the certain cluster.

Determining whether data is proprietary may utilize a profile of a user and/or a profile of an organization. For example, any data that appears in a profile of a user and/or an organization may be considered proprietary and thus not allowed to be included in a template. In another embodiment, the profile may indicate certain data is proprietary (e.g., by placing it a an exclusion list which prohibits utilization of the data in templates).

In one embodiment, testing whether certain data is proprietary is done by querying a database (e.g., a database that contains samples of proprietary data). Additionally or alternatively, the certain data may be submitted to a procedure that evaluates the data to determine whether the data is likely to be proprietary. For example, the procedure may perform semantic and/or syntactic analysis of the data to check whether the certain data has a certain meaning and/or contains certain patterns that indicate that it is likely to be proprietary. For example, the procedure may scan the certain data for strings like "bank account", "address", and/or "social security number".

In another embodiment, a user may provide feedback on certain data which indicates whether the certain data is proprietary. For example, the user may review values of data fields prior to running a test scenario and indicate which values the user considers proprietary. Additionally or alternatively, while a test scenario is running, the user may mark certain data as proprietary (e.g., data the user considers should not be seen by the user or other users). Optionally, the user may provide feedback the certain data via a user interface on which the user is running the test scenario.

In yet another embodiment, determining whether a certain value may be proprietary may be assisted by noting the source, location, and/or data structure that contains the certain value. For example, in certain systems, a value that appears in a checkbox on a screen is likely to be a default value of the system, and thus not likely to be proprietary. However, free text fields on screens are more likely to contain data entered by a user, and are thus likely to be proprietary. In a another example, in which the certain value appears in a drop-down menu in a screen, it might be necessary to determine from the context whether values in the drop-down menu are proprietary or not. Additionally, certain systems may be built in such a way that makes it relatively easy to determine which data is proprietary and which is not. For example, in SAP ERP meta data, which typically includes general (non-proprietary) data, is clearly marked.

In one embodiment, a value in a test scenario template that is considered proprietary is removed from the template. Optionally, the proprietary data is removed by a data cleaner module, a template generator module, a customization module, and/or another module and/or combination of modules. In one example, a value may be deleted from a template; consequently, the template may contain an indication of missing data (corresponding to the deleted value); prior to running a test scenario based on the template and/or during the run of the test scenario, the missing data needs to be provided (e.g., the user is prompted to provide it). Alternatively, a value in a test scenario template that is considered proprietary may be removed from the template by replacing it with a default or "dummy" value.

In one embodiment, proprietary data is not included in a template. For example, a module generating a template and/or a module customizing a template, check whether certain values are proprietary (e.g., by checking whether a certain flag related to the certain values is raised, or by submitting the certain values to a procedure for evaluation). If the certain values are deemed to be proprietary, they are not included in the template.

Proprietary data may be removed from runs of test scenarios at different stages. In one embodiment, the proprietary data is removed from runs of test scenarios as the runs are recorded and/or identified. For example, a "scrubbed" version of runs, which does not contain certain proprietary data, may be the data that is provided to components of the system (e.g., a clustering module and/or template generator). Optionally, determining what proprietary data is may relate to general statistics (e.g., utilization of certain elements and/or values by a certain proportion of organizations).

In another embodiment, proprietary data is removed from runs after clustering of the runs is performed. Optionally, determining what data in the runs should be considered proprietary utilizes the fact that after clustering, clusters contain similar runs. In one example, the fact that runs belong to clusters may enable the identification of certain values that are shared by many runs (which may indicate that the certain values are not proprietary), or shared by a few runs (which may indicate that the certain values are proprietary).

In some embodiments, test scenario templates are generated from one or more runs of test scenarios belonging to a certain cluster. Optionally, the templates are generated in such a way that they are not likely to include data that may be easily traced to specific runs in the certain cluster, users that ran runs belonging to the certain cluster, and/or organizations associated with runs belonging to the certain cluster. In these embodiments, generating a template may involve selecting a value from a run of a test scenario belonging to the certain cluster, checking whether the value appears in at least a first predetermined number of the runs in the certain cluster; checking whether the value appears in runs in the certain cluster that are associated with at least a second predetermined number of different organizations; and if both conditions are positive, enabling the test scenario template to utilize the selected value. Optionally, if at least one of the conditions is negative the test scenario template is not allowed to utilize the selected value.

In one embodiment, removing proprietary data from a test scenario template generated from one or more runs of test scenarios involves removing most output fields from the runs. Consequently, most of the information generated in the runs may be removed. In one example, most of the information output in the runs is considered proprietary, and is therefore removed. Optionally, as a result of removing most of the output fields, the test scenario template does not include expected values for most test steps. Optionally, running an instantiation of the test scenario template may require a user to provide values in most of the test steps.

Customizing a Test Scenario Template

Test scenario templates generated from runs of test scenarios of users belonging to different organizations may not be ideal for a certain user from a certain organization. For example, the templates may include information such as values that do not suite the certain user and/or the certain organization, and/or include certain test steps that are irrelevant for the certain user and/or the certain organization. It therefore may be beneficial to customize test scenario templates for a certain user and/or a certain organization. Optionally, customizing a test scenario template may be done as part of generating the template (e.g., by the template generator), by another module such as a customization module, or a combination of modules.

In some embodiments, customizing a test scenario template involves adding to the test scenario template one or more values that are relevant to a certain user and/or a certain organization. Optionally, the one or more values that are added replace existing values in the template that may be less appropriate for the certain user and/or the certain organization. Optionally, at least some of the values added to the template by the customizing replace proprietary data that has been removed from the template (e.g., by a data cleaner module).

In some embodiments, customizing a test scenario template is done using proprietary data related to a certain user and/or a certain organization. The proprietary data may be directly related to the certain user and/or the certain organization, such as internal organizational data of the certain user and/or the certain organization, and/or data obtained by monitoring the certain user and/or users belonging to the certain organization. Additionally or alternatively, the proprietary data may be of a different user and/or different organization, and based on similarity to the certain user and/or certain organization the proprietary data is assumed to be useful for customizing the template.

Proprietary data used to customize a test scenario template may have various sources. In one embodiment, proprietary data relevant to a certain user, for whom a test scenario template is customized, is obtained by providing the test scenario template to a different user, prompting the different user to provide a missing value, and recording an input value provided by the different user. Alternatively, the same process may be performed with the certain user, i.e., the test scenario template is provided to the certain user, the certain user is prompted to provide a value, and the value provided by the certain user.

In another embodiment, the proprietary data relevant to the certain user for whom the test scenario template is customized is obtained by guiding a user to provide the proprietary data while semiautomatically executing an instantiation of the test scenario template. Optionally, the user providing the proprietary data is the certain user. Providing proprietary data via semiautomatic execution may involve filling a value into a field missing a value in an instantiation of the test scenario template. This may be done by selecting a value from a database related to the certain user and testing whether the selected value is congruous with the field. If the selected value is congruous with the field, filling the field with the selected value. Otherwise, prompting the first user to provide a value for the field missing a value. Optionally, selecting the value utilizes a heuristics-based algorithm that is run on data from multiple organizations. For example, the selection of the value may be based in part on determining how often the value is used by other organizations. Additionally or alternatively, providing proprietary data via semiautomatic execution may involve filling a value into a field missing a value in an instantiation of the test scenario template by identifying users similar to the certain user. Following that, selecting a value from runs of test scenarios of the users similar to the certain user and then testing whether the selected value is congruous with the field. If the selected value is congruous with the field, the field may be filled with the selected value. Otherwise, the certain user may be prompted to provide a value for the field missing a value.

In one embodiment, proprietary data relevant to a certain user, for whom a test scenario template is customized, is obtained by marking locations of values that were removed from the test scenario template, and directing attention of a user to provide data appropriate for the marked locations. Optionally, the user is the certain user for whom the template is customized. Optionally, the values removed from the test scenario template were removed by a data cleaner module.

One source of proprietary data useful for customizing a test scenario template for a certain user may be a profile of the certain user. For example, such a profile may be provided to a module that performs customization of the template. Data in the profile, such as proprietary information related to the user and/or the organization may be inserted into the template. For example, a profile of the certain user may include the user's name, address, job title, and/or employee number; these values may be inserted in their appropriate positions in a customized template in order to save the certain user the time and effort of inserting them when running an instantiation of the template. In another example, the profile of the certain user may include a list of customers the user works with, parts the user frequently orders, and/or contact information of clients the user frequently interacts with. These values may be automatically inserted into a template in order to customize it and make it more relevant to the certain user.

In one embodiment, a profile of a user that is used to customize a test scenario template is a profile of a generic user of an organization. In this case, customizing the template may utilize information that does not identify a specific user. For example, to customize a template the system may use activity data from the profile such as a list of modules that are frequently run, but not use data such as an employee name of a real employee.

Another source of proprietary data useful for customizing a test scenario template for a certain user may be a data generator related to the certain user and/or a certain organization to which the certain user belongs. For example, the data generator may be a program that extracts values from a database related to the certain organization. The database may hold "real world" information such as actual customer orders, which can be used to generate tests that are more relevant.

In one embodiment, customizing a test scenario template for a first user utilizes a customization module and involves obtaining proprietary data relevant to the first user and substituting a non-empty subset of proprietary data removed from the template with the obtained data. Optionally, the obtained data undergoes processing prior to being entered into the template.

In one example, the proprietary data relevant to the first user is obtained from a previously monitored run of test scenario associated with the first user; for instance, the run of the test scenario may have been run by the first user, run by a user associated to an organization to which the first user belongs, and/or a user with a similar organizational role as the first user (e.g., both users are sales managers).

In another example, the proprietary data relevant to the first user is obtained from parsing a manual test scenario associated with the first user in order to obtain a value associated with the first user. For example, the manual test scenario may be a script for running a test that is intended to be used by the first user, a user associated to an organization to which the first user belongs, and/or a user with a similar organizational role as the first user. After obtaining the value associated with the first user, a non-empty subset of the removed proprietary data from the template is substituted with the obtained value.

In yet another example, the proprietary data relevant to the first user is obtained from analyzing a database of the software system associated with the first user to obtain a value associated with the first user. The database may include data on and/or be accessed by the first user, a user associated to an organization to which the first user belongs, and/or a user with a similar organizational role as the first user. After obtaining the value associated with the first user, a non-empty subset of the removed proprietary data from the template is substituted with the obtained value.

In one embodiment, the customization module is also configured to: provide the customized test scenario template to a second user, prompt the second user to provide a missing value, and record an input value provided by the second user. Optionally, the first user and the second user are the same user.

Values used for customization of templates may be obtained, in some embodiments, by exploiting wisdom of the crowd. This "wisdom" may be gained by analyzing runs of users from different organization in order to find certain patterns and common values. In one example, many organizations have a dummy customer entry for testing; for example, a customer named "test". Thus, entering "test" as a user is likely to allow a test scenario to run, so a customization module may try using the customer "test" in a template being customized. In another example, SAP catalog numbers usually start from 1000, and 1000 usually describes a catalog number for tests and not a real number. Thus, when customizing a template, if a catalog number is needed, the value 1000 may be tried. In both of these examples, the knowledge of which default values may be gained by examining runs of users from different organizations. This allows a customization module to discover from the crowd certain values that may not be apparent to whomever is customizing the template.

In embodiments described in this disclosure, after generating a test scenario template from one or more runs of test scenarios (e.g., using a template generator), the template might undergo further processing such as removal of proprietary data, customization, ranking, and/or the template may be suggested to the user. Optionally, the one or more runs of test scenarios belong to a certain cluster of similar runs of test scenarios. FIG. 16A to FIG. 16G illustrate some, but not all, combinations of system modules that may be used in embodiments described in this disclosure to process the template and/or suggest the template to a user.

Figure 16A:
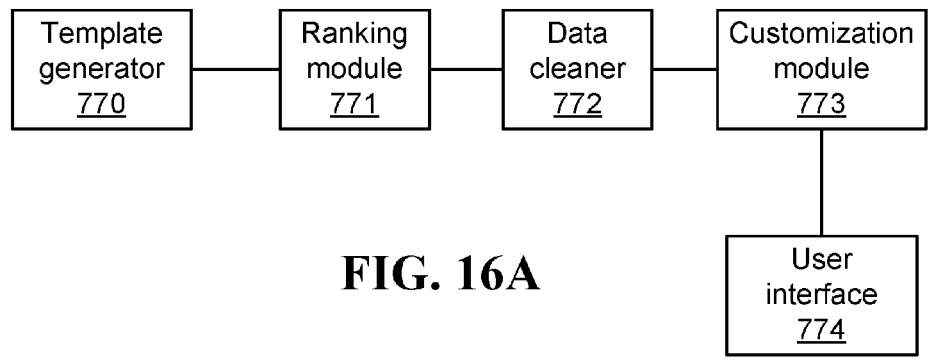
FIG. 16A illustrates a combination of system modules that may be used in embodiments described in this disclosure.

FIG. 16A illustrates a combination of system modules that may be used in embodiments in which a template generator 770 generates a test scenario template from one or more runs of test scenarios. The template is provided to a ranking module 771 that may rank the template, for example, by assigning it a score proportional to its relevancy to a certain user. Optionally, the ranking module 771 receives a profile of a certain user and/or a certain organization and utilizes data from the profile, in order to rank the template. Following that, a data cleaner 772 receives the template and may remove proprietary data from the template. Optionally, the data cleaner 772 receives a profile related to a certain user and/or a certain organization, and utilizes the profile to remove certain proprietary data from the template. After removing proprietary data from the template, the template from which proprietary was removed is provided to a customization module 773 that customizes the template by adding certain data to the template. Optionally, the customization module 773 receives a profile of a certain user and/or a certain organization and adds data from the profile, which relevant to the certain user and/or organization, to the template. The customized template from which proprietary data was removed is then provided to a user interface 774. Optionally, the user interface 774 presents to a user a suggestion to run an instantiation of the customized template from which proprietary data was first removed.

It is to be noted that in this disclosure, though modules may be illustrated in figures as separate elements, in some embodiments, they may be implemented as a single element that performs the functionality of modules. For example, the software module that implements the template generator 770 may also perform the tasks of the data cleaner 772. In another example, the customization module 773 and the data cleaner 772 are realized by the same software programs.

Figure 16B:
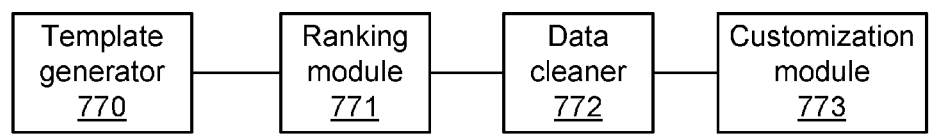
FIG. 16B illustrates a combination of system modules that may be used in embodiments described in this disclosure.

In other embodiments, after being processed by various modules, a template generated by the template generator need not be provided to a user interface. For example, it may be stored in the system for further use. FIG. 16B illustrates a similar portion of a system to the system illustrated in FIG. 16A, however in this system after being subjected to ranking, removal of proprietary data, and customization, a template is not presented to a user via a user interface.

Figure 16C:
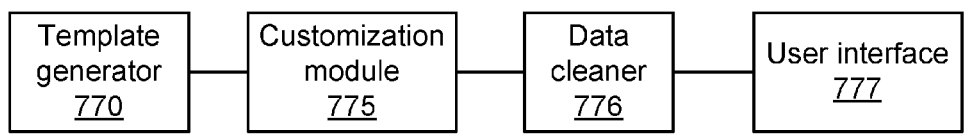
FIG. 16C illustrates a combination of system modules that may be used in embodiments described in this disclosure.
Figure 16D:
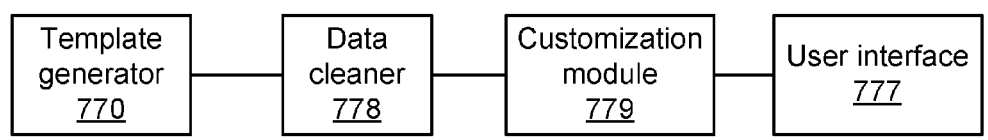
FIG. 16D illustrates a combination of system modules that may be used in embodiments described in this disclosure.

The order in which a template may undergo processing by system modules may differ between embodiments. For example, FIG. 16C illustrates a combination of system modules which includes the template generator 770 which provides a template for customization by a customization module 775. Following the customization, a data cleaner 776 removes proprietary data from the template. The template is then provided to a user interface 777, for example, in order to be suggested to a user. FIG. 16D illustrates a similar system, however in it a template generated by the template generator 770 is first provided to a data cleaner 778. After removing proprietary data from the template, the template is provided to a customization module 779. The customized template may then be presented to a user via the user interface 777.

Figure 16E:
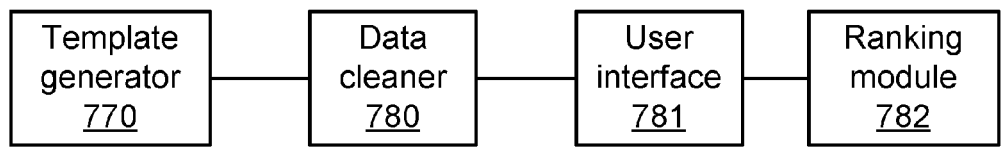
FIG. 16E illustrates a combination of system modules that may be used in embodiments described in this disclosure.
Figure 16F:
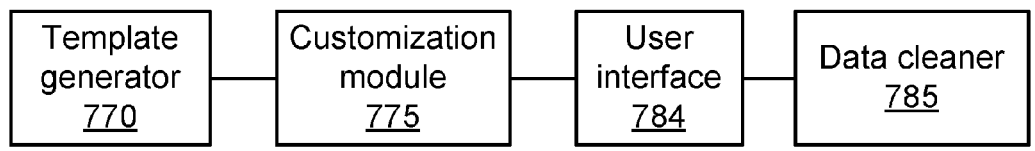
FIG. 16F illustrates a combination of system modules that may be used in embodiments described in this disclosure.

In some embodiments, a user interface is not necessarily used to suggest templates to a user; it may be utilized by other system modules to perform their task. FIG. 16E illustrates a combination of system modules that may be utilized in embodiments, in which a ranking module 782 and a data cleaner 780 interact with a user interface 781. For example, the data cleaner 780 may present a template generated by the template generator 770 to a user on the user interface 781, in order for the user to mark and/or approve certain proprietary data the data cleaner found in the template. Additionally, the ranking module 782 may present a ranking of the template in order for the user to verify the ranking and/or edit it. Optionally, the user may then determine what is to be done with the template (e.g., should the user run it, save it for later, and/or discard it). FIG. 16F illustrates a combination of system modules that may be utilized in embodiments, in which a customization module 775 utilizes a user interface to perform customization of a template. For example, data that was added to a template generated by the template generator 770 is presented to a user on a user interface 784 for approval and/or editing. Following that, the template may be subjected to removal of proprietary data by a data cleaner 785. For example, the proprietary data may be added by the user via the user interface 784.

Figure 16G:
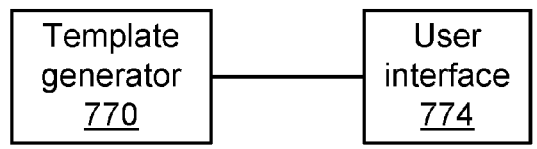
FIG. 16G illustrates a combination of system modules that may be used in embodiments described in this disclosure.

In some embodiments, a template that is generated by a template generator does not undergo additional processing by system modules. For example, as illustrated in FIG. 16G, after being generated by the template generator 770, the template may be sent to the user interface 774 (e.g., to be suggested to a user).

While some of the above embodiments may be described in the general context of program components that execute in conjunction with an application program that runs on an operating system on a computer, which may be a personal computer, those skilled in the art will recognize that aspects may also be implemented in combination with other program components. Program components may include routines, programs, modules, data structures, and other types of structures that perform particular tasks or implement particular abstract data types. Moreover, the embodiments may be practiced with other computer system configurations, such as: cloud computing, a client-server model, grid computing, peer-to-peer, hand-held devices, multiprocessor systems, microprocessor-based systems, programmable consumer electronics, minicomputers, and/or mainframe computers. The embodiments may also be practiced in a distributed computing environment where tasks are performed by remote processing devices that are linked through a communication network. In a distributed computing environment, program components may be located in both local and remote computing and/or storage devices. Some of the embodiments may also be practiced in the form of a service, such as infrastructure as a service (IaaS), platform as a service (PaaS), software as a service (SaaS), and/or network as a service (NaaS).

Embodiments may be implemented as a computer implemented method, a computer system, and/or as a non-transitory computer-readable medium. The non-transitory computer-readable medium comprises program code which provides, or participates in providing, instructions to a processor. The non-transitory computer-readable medium may be implemented, for example, via one or more of a volatile computer memory, a non-volatile memory, a hard drive, a flash drive, a magnetic data storage, an optical data storage, and/or any other type of a tangible computer memory to be invented that is not transitory signals per se. The program code may be updated and/or downloaded to the non-transitory computer-readable medium via a communication network such as the Internet.

Herein, a predetermined value, such as a predetermined threshold, may be a fixed value and/or a value determined any time before performing a calculation that compares a certain value with the predetermined value. A value may also be considered to be a predetermined value when the logic, used to determine whether a threshold that utilizes the value is reached, is known before start of performing computations to determine whether the threshold is reached.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A computer system configured to select a test scenario template relevant for testing a configuration change, comprising:
    at least one processor and memory; the at least one processor and the memory cooperating to function as:
    an interface configured to receive data indicative of configuration changes made to software systems of different organizations, wherein each organization of the different organizations has a different composition of shareholders;
    a first clustering module configured to cluster the configuration changes into clusters of similar configuration changes;
    a test identifier configured to identify runs of test scenarios run by users belonging to the different organizations on the software systems belonging to the different organizations; wherein running the test scenarios is useful for testing at least some of the configuration changes;
    a second clustering module configured to cluster the runs to clusters of similar runs;
    a connection generator configured to generate connections between the clusters of similar configuration changes and the clusters of similar runs;
    a weighting module configured to weight the connections based on number of different organizations associated with each of the connections; wherein an organization is associated with a connection between a cluster of similar configuration changes and a cluster of similar runs if a run of a test scenario, from the cluster of similar runs, is run by a user belonging to the organization to test a configuration change from the cluster of similar configurations changes;
    a connection selector configured to receive a certain configuration change of a certain software system, which is to be tested by a certain user;
    the connection selector is further configured to select a certain connection, weighted above a threshold, between a cluster of similar configuration changes, to which the certain configuration change corresponds, and a certain cluster of similar runs of test scenarios; and
    a template selector configured to select for the certain user a test scenario template representing the certain cluster of similar runs.

2. The computer system of claim 1, wherein the certain cluster of similar runs comprises a first run associated with a first organization belonging to the different organizations and a second run associated with a second organization belonging to the different organizations; and wherein the first organization is not the second organization.

3. The computer system of claim 1, wherein the certain software is associated with a certain organization that is not one of the different organizations.

4. The computer system of claim 1, further comprising a monitoring module configured to monitor the users running the test scenarios on the software systems that belong to the different organizations and to provide data obtained from the monitoring to the test identifier.

5. The computer system of claim 1, wherein the template selector is further configured to provide the certain user an indication of number of users belonging to the different organizations who acted according to the certain connection; whereby the more users acted according to the certain connection, the higher the likelihood that the certain connection is relevant to the certain user.

6. The computer system of claim 1, wherein the at least one processor and memory further cooperate to function as a

87 template generator configured to generate the test scenario template after clustering the runs of the test scenarios into the clusters of similar runs.

7. The computer system of claim 1, wherein the certain software system is a SAP ERP, the configurations are database tables, and the connections are connections between clusters of database tables and clusters comprising runs of test scenarios that include SQL statements which access the database tables.

8. The computer system of claim 1, wherein the certain software system is an Oracle ERP, the configurations are customization code, and the connections are between clusters of customization code and clusters of runs of test scenarios that execute the customization code.

9. The computer system of claim 1, wherein the template selector is further configured to rank the test scenario template in proportion to the weight of the certain connection.

10. The computer system of claim 1, wherein the threshold represents at least two users, associated with at least two different organizations, which acted according to the certain connection.

11. A computer implemented method for selecting a test scenario template relevant to a configuration change, comprising:
receiving data indicative of configuration changes made to software systems of different organizations;
clustering the configuration changes into clusters of similar configuration changes;
identifying runs of test scenarios run by users belonging to the different organizations on the software systems belonging to the different organizations;
wherein running the test scenarios is useful for testing at least some of the configuration changes, and wherein each organization of the different organizations has a different composition of shareholders;
clustering the runs to clusters of similar runs;
generating connections between the clusters of similar configuration changes and the clusters of similar runs;
weighting the connections based on number of different organizations associated with each of the connections; wherein an organization is associated with a connection between a cluster of similar configuration changes and a cluster of similar runs if a run of a test scenario, from the cluster of similar runs, is run by a user belonging to the organization to test a configuration change from the cluster of similar configurations changes;
receiving a certain configuration change of a certain software system to be tested by a certain user;
selecting a certain connection, weighted above a threshold, between a cluster of similar configuration changes, to which the certain configuration change corresponds, and a certain cluster of similar runs of test scenarios; and
selecting for the certain user a test scenario template representing the certain cluster of similar runs.

12. The computer implemented method of claim 11, wherein the certain cluster of similar runs comprises a first run associated with a first organization belonging to the different organizations and a second run associated with a second organization belonging to the different organizations; and wherein the first organization is not the second organization.

13. The computer implemented method of claim 11, wherein the certain software belongs to a certain organization that is not one of the different organizations.

14. The computer implemented method of claim 11, further comprising generating the test scenario template representing the certain cluster of similar runs based on one or more runs of test scenarios belonging to the certain cluster of similar runs.

15. The computer implemented method of claim 11, wherein the clustering of the runs comprises clustering the runs according to configuration elements associated with the runs.

16. The computer implemented method of claim 11, wherein the certain software system is a SAP ERP, the configurations are database tables, and the connections are connections between clusters of database tables and clusters comprising runs of test scenarios that include SQL statements which access the database tables.

17. The computer implemented method of claim 11, wherein the certain software system is an Oracle ERP, the configurations are customization code, and the connections are between clusters of customization code and clusters of runs of test scenarios that execute the customization code.

18. A non-transitory computer-readable medium for use in a computer to select a test scenario template relevant to a configuration change; the computer comprises a processor and the non-transitory computer-readable medium comprising:
program code for receiving data indicative of configuration changes made to software systems of different organizations;
program code for clustering the configuration changes into clusters of similar configuration changes;
program code for identifying runs of test scenarios run by users belonging to the different organizations on the software systems belonging to the different organizations; wherein running the test scenarios is useful for testing at least some of the configuration changes, and wherein each organization of the different organizations has a different composition of shareholders;
program code for clustering the runs to clusters of similar runs;
program code for generating connections between the clusters of similar configuration changes and the clusters of similar runs;
program code for weighting the connections based on number of different organizations associated with each of the connections; wherein an organization is associated with a connection between a cluster of similar configuration changes and a cluster of similar runs if a run of a test scenario, from the cluster of similar runs, is run by a user belonging to the organization to test a configuration change from the cluster of similar configurations changes;
program code for receiving a certain configuration change of a certain software system to be tested by a certain user;
program code for selecting a certain connection, weighted above a threshold, between a cluster of similar configuration changes, to which the certain configuration change corresponds, and a certain cluster of similar runs of test scenarios; and
program code for selecting for the certain user a test scenario template representing the certain cluster of similar runs.

19. The non-transitory computer-readable medium of claim 18, further comprising program code for weighting the connections according to an increasing weight scale which assigns a first instance of a connection, associated with a first number of organizations that is greater than a second number of organizations associated with a second connection, a weight that is not lower than weight assigned to the second connection; whereby the higher the weight of a connection between a cluster of configuration changes and a cluster of runs, the higher likelihood that the cluster of runs contains a run relevant for testing the certain configuration change.

20. The non-transitory computer-readable medium of claim 18, further comprising program code for monitoring the users belonging to the different organization running the test scenarios on the software systems that belong to the different organizations and providing data obtained from the monitoring to be used for the identifying of the runs.

\* \* \* \* \*